US012468106B2

(12) United States Patent
Van Baelen et al.

(10) Patent No.: US 12,468,106 B2
(45) Date of Patent: Nov. 11, 2025

(54) TELECOMMUNICATIONS MODULE ARRANGEMENTS

(71) Applicant: COMMSCOPE CONNECTIVITY BELGIUM BVBA, Kessel-Lo (BE)

(72) Inventors: David Jan Irma Van Baelen, Winksele (BE); Heidi Bleus, Genk (BE); Geert Antoon Parton, Lubbeek (BE); Willem Lea Marcel De Vis, Merchtem (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 501 days.

(21) Appl. No.: 17/797,999

(22) PCT Filed: Feb. 4, 2021

(86) PCT No.: PCT/EP2021/052708
§ 371 (c)(1),
(2) Date: Aug. 5, 2022

(87) PCT Pub. No.: WO2021/156389
PCT Pub. Date: Aug. 12, 2021

(65) Prior Publication Data
US 2023/0093250 A1    Mar. 23, 2023

Related U.S. Application Data

(60) Provisional application No. 63/030,003, filed on May 26, 2020, provisional application No. 62/971,313, filed on Feb. 7, 2020.

(51) Int. Cl.
*G02B 6/44*    (2006.01)
(52) U.S. Cl.
CPC .................. *G02B 6/4455* (2013.01)

(58) Field of Classification Search
CPC .................................... G02B 6/4455
See application file for complete search history.

(56) References Cited

U.S. PATENT DOCUMENTS 1,858,539 A * 5/1932 Dewey .................. B25H 3/023
43/57.1
2,805,106 A    9/1957 Penkala
(Continued)

FOREIGN PATENT DOCUMENTS

| AU | 40995/85 | 4/1985 |
| AU | 55314/86 | 3/1986 |

(Continued)

OTHER PUBLICATIONS

Extended European Search Report for Application No. 20172802.9 mailed Aug. 20, 2020.
(Continued)

*Primary Examiner* — Eric Wong
(74) *Attorney, Agent, or Firm* — Merchant & Gould P.C.

(57) ABSTRACT

A telecommunications tray (50/300/400/600/900/1100/1200/1400/1800) is configured for mounting to a telecommunications fixture. The tray (50) includes a removably mounted telecommunications module (100/200/302/402/700/800/1000/1100/1300/1900/2000) that defines a body that is enclosed by a cover (1102/1320/1924) to define an interior. The module (100/200/302/402/700/800/1000/1100/1300/1900/2000) includes radius limiters (902/1356/1358/1954) within the interior for managing cables and defines connection locations for inputting and/or outputting signals via cables for processing within the module (100/200/302/402/700/800/1000/1100/1300/1900/2000), the telecommunications module (100/200/302/402/700/800/1000/1100/1300/1900/2000) movably mounted to the tray (50/300/400/600/900/1100/1200/1400/1800).

14 Claims, 56 Drawing Sheets

(56) References Cited

U.S. PATENT DOCUMENTS

| | | | |
|---|---|---|---|
| 2,864,656 A | 12/1958 | Yorinks | |
| 3,901,564 A | 8/1975 | Armstrong | |
| 4,070,076 A | 1/1978 | Zwillinger | |
| 4,172,625 A | 10/1979 | Swain | |
| 4,245,422 A * | 1/1981 | Souza | A01K 97/06 |
| | | | 206/315.11 |
| 4,320,934 A | 3/1982 | Röck et al. | |
| 4,359,262 A | 11/1982 | Dolan | |
| 4,373,776 A | 2/1983 | Purdy | |
| 4,494,806 A | 1/1985 | Williams et al. | |
| 4,502,754 A | 3/1985 | Kawa | |
| 4,585,303 A | 4/1986 | Pinsard et al. | |
| 4,595,255 A | 6/1986 | Bhatt et al. | |
| 4,630,886 A | 12/1986 | Lauriello et al. | |
| 4,697,874 A | 10/1987 | Nozick | |
| 4,699,455 A | 10/1987 | Erbe et al. | |
| 4,708,430 A | 11/1987 | Donaldson et al. | |
| 4,717,231 A | 1/1988 | Dewez et al. | |
| 4,737,039 A | 4/1988 | Sekerich | |
| 4,765,710 A | 8/1988 | Burmeister et al. | |
| 4,792,203 A | 12/1988 | Nelson et al. | |
| 4,820,007 A | 4/1989 | Ross et al. | |
| 4,840,449 A | 6/1989 | Ghandeharizadeh | |
| 4,898,448 A | 2/1990 | Cooper | |
| 4,971,421 A | 11/1990 | Ori | |
| 4,986,762 A | 1/1991 | Keith | |
| 4,991,928 A | 2/1991 | Zimmer | |
| 4,995,688 A | 2/1991 | Anton et al. | |
| 5,024,498 A | 6/1991 | Becker et al. | |
| 5,066,149 A | 11/1991 | Wheeler et al. | |
| 5,067,678 A | 11/1991 | Henneberger et al. | |
| 5,071,211 A | 12/1991 | Debortoli et al. | |
| 5,100,221 A | 3/1992 | Carney et al. | |
| 5,127,082 A | 6/1992 | Below et al. | |
| 5,129,030 A | 7/1992 | Petrunia | |
| 5,138,688 A | 8/1992 | Debortoli | |
| 5,142,606 A | 8/1992 | Carney et al. | |
| 5,142,607 A | 8/1992 | Petrotta et al. | |
| 5,167,001 A | 11/1992 | Debortoli et al. | |
| 5,174,675 A | 12/1992 | Martin | |
| 5,240,209 A | 8/1993 | Kutsch | |
| 5,247,603 A | 9/1993 | Vidacovich et al. | |
| 5,275,064 A | 1/1994 | Hobbs | |
| 5,285,515 A | 2/1994 | Milanowski et al. | |
| 5,289,558 A | 2/1994 | Teichler et al. | |
| 5,316,243 A | 5/1994 | Henneberger | |
| 5,323,480 A | 6/1994 | Mullaney et al. | |
| 5,335,349 A | 8/1994 | Kutsch et al. | |
| 5,339,379 A | 8/1994 | Kutsch et al. | |
| 5,353,367 A | 10/1994 | Czosnowski et al. | |
| 5,363,466 A | 11/1994 | Milanowskki et al. | |
| 5,363,467 A | 11/1994 | Keith | |
| 5,402,515 A | 3/1995 | Vidacovich et al. | |
| 5,412,751 A | 5/1995 | Siemon et al. | |
| 5,430,823 A | 7/1995 | Dupont et al. | |
| 5,438,641 A | 8/1995 | Malacarne | |
| 5,490,229 A | 2/1996 | Ghanderharizadeh et al. | |
| 5,497,444 A | 3/1996 | Wheeler | |
| 5,509,096 A | 4/1996 | Easley | |
| 5,511,144 A | 4/1996 | Hawkins et al. | |
| 5,530,783 A | 6/1996 | Belopolsky et al. | |
| 5,570,450 A | 10/1996 | Fernandez et al. | |
| 5,613,030 A | 3/1997 | Hoffer et al. | |
| 5,640,481 A | 6/1997 | Llewellyn et al. | |
| 5,655,044 A | 8/1997 | Finzel et al. | |
| 5,715,348 A | 2/1998 | Falkenberg et al. | |
| 5,717,810 A | 2/1998 | Wheeler | |
| 5,717,811 A | 2/1998 | Macken | |
| 5,724,469 A | 3/1998 | Orlando | |
| 5,802,237 A | 9/1998 | Pulido | |
| 5,811,055 A | 9/1998 | Geiger | |
| 5,835,657 A * | 11/1998 | Suarez | G02B 6/44528 |
| | | | 385/135 |
| 5,836,148 A | 11/1998 | Fukao | |
| 5,882,100 A | 3/1999 | Rock | |
| 5,887,106 A | 3/1999 | Cheeseman et al. | |
| 5,917,984 A | 6/1999 | Röseler et al. | |
| 5,923,753 A | 7/1999 | Haataja et al. | |
| 5,946,440 A | 8/1999 | Puetz | |
| 5,966,492 A | 10/1999 | Bechamps et al. | |
| 5,971,626 A | 10/1999 | Knodell et al. | |
| 5,975,769 A | 11/1999 | Larson et al. | |
| 5,978,540 A | 11/1999 | Bechamps et al. | |
| 6,009,224 A | 12/1999 | Allen | |
| 6,022,150 A | 2/2000 | Erdman et al. | |
| 6,027,252 A | 2/2000 | Erdman et al. | |
| 6,044,194 A | 3/2000 | Meyerhoefer | |
| 6,076,908 A | 6/2000 | Maffeo | |
| 6,099,224 A | 8/2000 | Uchida et al. | |
| 6,215,938 B1 | 4/2001 | Reitmeier et al. | |
| 6,226,436 B1 | 5/2001 | Daoud et al. | |
| 6,236,795 B1 | 5/2001 | Rodgers | |
| 6,256,444 B1 | 7/2001 | Bechamps et al. | |
| 6,263,141 B1 | 7/2001 | Smith | |
| 6,269,214 B1 | 7/2001 | Naudin et al. | |
| 6,301,424 B1 | 10/2001 | Hwang | |
| 6,360,050 B1 | 3/2002 | Moua et al. | |
| 6,381,393 B1 | 4/2002 | Matthews et al. | |
| 6,438,310 B1 * | 8/2002 | Lance | G02B 6/44528 |
| | | | 385/135 |
| 6,439,523 B1 | 8/2002 | Chandler et al. | |
| 6,480,660 B1 | 11/2002 | Reitmeier et al. | |
| 6,496,638 B1 | 12/2002 | Andersen | |
| 6,504,988 B1 | 1/2003 | Trebesch et al. | |
| 6,591,051 B2 | 7/2003 | Solheid et al. | |
| 6,594,434 B1 | 7/2003 | Davidson et al. | |
| 6,600,866 B2 | 7/2003 | Gatica et al. | |
| 6,612,515 B1 | 9/2003 | Tinucci et al. | |
| 6,625,374 B2 | 9/2003 | Holman et al. | |
| RE38,311 E | 11/2003 | Wheeler | |
| 6,677,520 B1 | 1/2004 | Kim et al. | |
| 6,695,491 B1 | 2/2004 | Leeman et al. | |
| 6,711,339 B2 | 3/2004 | Puetz et al. | |
| 6,715,619 B2 | 4/2004 | Kim et al. | |
| 6,748,155 B2 | 6/2004 | Kim et al. | |
| 6,768,860 B2 | 7/2004 | Liberty | |
| 6,796,437 B2 | 9/2004 | Krampotich et al. | |
| 6,804,447 B2 | 10/2004 | Smith et al. | |
| 6,809,258 B1 | 10/2004 | Dang et al. | |
| 6,810,193 B1 | 10/2004 | Müller | |
| 6,819,857 B2 | 11/2004 | Douglas et al. | |
| 6,845,208 B2 | 1/2005 | Thibault et al. | |
| 6,850,685 B2 | 2/2005 | Tinucci et al. | |
| 6,865,331 B2 | 3/2005 | Mertesdorf | |
| 6,870,734 B2 | 3/2005 | Mertesdorf et al. | |
| 6,915,057 B2 | 7/2005 | Vincent et al. | |
| 6,925,241 B2 | 8/2005 | Bohle et al. | |
| 6,934,457 B2 | 8/2005 | Vincent et al. | |
| 6,937,807 B2 | 8/2005 | Franklin et al. | |
| 6,944,383 B1 | 9/2005 | Herzog et al. | |
| 6,945,620 B2 | 9/2005 | Lam et al. | |
| 6,968,111 B2 | 11/2005 | Trebesch et al. | |
| 6,981,750 B2 | 1/2006 | Krampotich | |
| 7,006,748 B2 | 2/2006 | Dagley et al. | |
| 7,068,907 B2 | 6/2006 | Schray | |
| 7,079,744 B2 | 7/2006 | Douglas et al. | |
| 7,086,539 B2 | 8/2006 | Knudsen et al. | |
| 7,116,777 B2 | 10/2006 | Knudsen et al. | |
| 7,120,348 B2 | 10/2006 | Trebesch et al. | |
| 7,171,099 B2 | 1/2007 | Barnes et al. | |
| 7,231,125 B2 | 6/2007 | Douglas et al. | |
| 7,274,852 B1 | 9/2007 | Smrha et al. | |
| 7,302,153 B2 | 11/2007 | Thom | |
| 7,302,154 B2 | 11/2007 | Trebesch et al. | |
| 7,308,184 B2 | 12/2007 | Barnes et al. | |
| 7,362,942 B2 | 4/2008 | Beck | |
| 7,367,823 B2 | 5/2008 | Rapp et al. | |
| 7,373,071 B2 | 5/2008 | Douglas et al. | |
| 7,397,996 B2 | 7/2008 | Herzog et al. | |
| 7,406,240 B2 | 7/2008 | Murano | |
| 7,409,137 B1 | 8/2008 | Barnes | |
| 7,418,182 B2 | 8/2008 | Krampotich | |
| 7,437,049 B2 | 10/2008 | Krampotich | |
| 7,454,113 B2 | 11/2008 | Barnes | |

(56) References Cited

U.S. PATENT DOCUMENTS

| | | |
|---|---|---|
| 7,457,504 B2 | 11/2008 | Smrha et al. |
| 7,460,757 B2 | 12/2008 | Hoehne et al. |
| 7,463,811 B2 | 12/2008 | Trebesch et al. |
| 7,480,438 B2 | 1/2009 | Douglas et al. |
| 7,496,268 B2 | 2/2009 | Escoto et al. |
| 7,499,623 B2 | 3/2009 | Barnes et al. |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,599,599 B2 | 10/2009 | Herzog et al. |
| 7,664,361 B2 | 2/2010 | Trebesch et al. |
| 7,689,089 B2 | 3/2010 | Wagner et al. |
| 7,706,656 B2 | 4/2010 | Zimmel |
| 7,715,681 B2 | 5/2010 | Krampotich et al. |
| 7,747,125 B1 | 6/2010 | Lee et al. |
| RE41,460 E | 7/2010 | Wheeler |
| 7,751,674 B2 | 7/2010 | Hill |
| 7,764,859 B2 | 7/2010 | Krampotich et al. |
| 7,856,166 B2 | 12/2010 | Biribuze et al. |
| 7,869,683 B2 | 1/2011 | Barnes et al. |
| 7,876,993 B2 | 1/2011 | Krampotich et al. |
| 7,889,961 B2 | 2/2011 | Cote et al. |
| 7,978,957 B2 | 7/2011 | Sano et al. |
| 8,027,558 B2 | 9/2011 | Barnes et al. |
| 8,041,175 B2 | 10/2011 | Krampotich et al. |
| 8,059,932 B2 | 11/2011 | Hill et al. |
| 8,078,030 B2 | 12/2011 | Trebesch et al. |
| 8,179,684 B2 | 5/2012 | Smrha et al. |
| 8,195,022 B2 | 6/2012 | Coburn et al. |
| 8,285,104 B2 | 10/2012 | Davis et al. |
| 8,315,498 B2 | 11/2012 | Redmann et al. |
| 8,452,149 B2 | 5/2013 | Krampotich et al. |
| 8,526,774 B2 | 9/2013 | Krampotich et al. |
| 8,559,785 B2 | 10/2013 | Barlowe et al. |
| 8,600,208 B2 | 12/2013 | Badar et al. |
| 8,639,081 B2 | 1/2014 | Barnes et al. |
| 8,655,136 B2 | 2/2014 | Trebesch et al. |
| 8,690,593 B2 | 4/2014 | Anderson et al. |
| 8,731,361 B2 | 5/2014 | Anderson et al. |
| 8,801,299 B2 | 8/2014 | Shimotsu et al. |
| 8,816,222 B2 | 8/2014 | Pimentel |
| 8,864,085 B2 | 10/2014 | He et al. |
| 8,885,998 B2 | 11/2014 | Marcouiller et al. |
| 8,903,216 B2 | 12/2014 | Thompson et al. |
| 9,081,164 B2 | 7/2015 | Badar et al. |
| 9,128,262 B2 | 9/2015 | Campbell et al. |
| 9,435,975 B2 | 9/2016 | Ott |
| 9,541,726 B2 | 1/2017 | Geens et al. |
| 9,568,699 B2 * | 2/2017 | Geens ................. G02B 6/3897 |
| 9,575,275 B2 | 2/2017 | Blackwell, Jr. et al. |
| 9,958,631 B2 | 5/2018 | Geens et al. |
| 10,107,984 B2 | 10/2018 | Geens et al. |
| 10,126,515 B2 | 11/2018 | Geens et al. |
| 10,345,546 B2 | 7/2019 | Geens et al. |
| 10,732,373 B2 | 8/2020 | Geens et al. |
| 10,746,950 B2 | 8/2020 | Geens et al. |
| 10,830,977 B2 | 11/2020 | Geens et al. |
| 11,002,936 B2 | 5/2021 | Geens et al. |
| 11,320,618 B2 | 5/2022 | Geens et al. |
| 2001/0001270 A1 | 5/2001 | Williams Vigliaturo |
| 2002/0131749 A1 | 9/2002 | Swenson et al. |
| 2002/0131750 A1 | 9/2002 | Holman et al. |
| 2002/0159746 A1 | 10/2002 | Howell et al. |
| 2002/0181922 A1 | 12/2002 | Xin et al. |
| 2003/0007767 A1 | 1/2003 | Douglas et al. |
| 2003/0020379 A1 | 1/2003 | Larsen et al. |
| 2003/0119385 A1 | 6/2003 | Elliot et al. |
| 2003/0128951 A1 | 7/2003 | Lecomte et al. |
| 2003/0165315 A1 | 9/2003 | Trebesch et al. |
| 2003/0174996 A1 | 9/2003 | Henschel et al. |
| 2003/0190035 A1 | 10/2003 | Knudsen et al. |
| 2004/0011750 A1 | 1/2004 | Kim et al. |
| 2004/0042755 A1 | 3/2004 | Vincent et al. |
| 2004/0136676 A1 | 7/2004 | Mertesdorf |
| 2004/0175090 A1 | 9/2004 | Vastmans et al. |
| 2004/0227443 A1 | 11/2004 | Sandoval |
| 2004/0228582 A1 | 11/2004 | Yamada et al. |
| 2004/0258384 A1 | 12/2004 | Trebesch et al. |
| 2005/0025444 A1 | 2/2005 | Barnes et al. |
| 2005/0058421 A1 | 3/2005 | Dagley et al. |
| 2005/0078929 A1 | 4/2005 | Iwanek |
| 2005/0100301 A1 | 5/2005 | Solheid et al. |
| 2005/0123261 A1 | 6/2005 | Bellekens et al. |
| 2006/0093302 A1 | 5/2006 | Solheid et al. |
| 2006/0116084 A1 | 6/2006 | Miki et al. |
| 2006/0193586 A1 | 8/2006 | Hoehne et al. |
| 2006/0275008 A1 | 12/2006 | Xin |
| 2007/0003204 A1 | 1/2007 | Makrides-Saravanos et al. |
| 2007/0031099 A1 | 2/2007 | Herzog et al. |
| 2007/0058918 A1 | 3/2007 | Trebesch et al. |
| 2007/0201806 A1 | 8/2007 | Douglas et al. |
| 2007/0280618 A1 | 12/2007 | Xin et al. |
| 2008/0048935 A1 | 2/2008 | Yoshioka et al. |
| 2008/0063350 A1 | 3/2008 | Trebesch et al. |
| 2008/0124038 A1 | 5/2008 | Kowalczyk et al. |
| 2008/0169116 A1 | 7/2008 | Mullaney et al. |
| 2008/0175550 A1 | 7/2008 | Coburn et al. |
| 2008/0205843 A1 | 8/2008 | Castonguay et al. |
| 2008/0292260 A1 | 11/2008 | Weinegger et al. |
| 2008/0298026 A1 | 12/2008 | Wang et al. |
| 2009/0060439 A1 | 3/2009 | Cox et al. |
| 2009/0067800 A1 | 3/2009 | Vazquez et al. |
| 2009/0067802 A1 | 3/2009 | Hoehne et al. |
| 2009/0097813 A1 | 4/2009 | Hill |
| 2009/0129033 A1 | 5/2009 | Smrha et al. |
| 2009/0136196 A1 | 5/2009 | Trebesch et al. |
| 2009/0245746 A1 | 10/2009 | Krampotich et al. |
| 2009/0274430 A1 | 11/2009 | Krampotich et al. |
| 2009/0274431 A1 | 11/2009 | Krampotich et al. |
| 2010/0061693 A1 | 3/2010 | Bran de Leon et al. |
| 2010/0142910 A1 | 6/2010 | Hill et al. |
| 2010/0150518 A1 | 6/2010 | Leon et al. |
| 2010/0158465 A1 | 6/2010 | Smrha |
| 2010/0195968 A1 | 8/2010 | Trebesch et al. |
| 2010/0266253 A1 | 10/2010 | Krampotich et al. |
| 2010/0310225 A1 | 12/2010 | Anderson et al. |
| 2010/0316346 A1 | 12/2010 | Krampotich et al. |
| 2010/0322578 A1 | 12/2010 | Cooke et al. |
| 2011/0123165 A1 | 5/2011 | Barth et al. |
| 2011/0188809 A1 | 8/2011 | LeBlanc et al. |
| 2011/0206336 A1 | 8/2011 | Krampotich et al. |
| 2011/0211329 A1 | 9/2011 | Dean, Jr. et al. |
| 2011/0211799 A1 | 9/2011 | Conner et al. |
| 2011/0211801 A1 | 9/2011 | McGranahan et al. |
| 2011/0217016 A1 | 9/2011 | Mullsteff |
| 2011/0228473 A1 | 9/2011 | Anderson et al. |
| 2011/0267794 A1 | 11/2011 | Anderson et al. |
| 2011/0268404 A1 | 11/2011 | Cote et al. |
| 2011/0268408 A1 | 11/2011 | Giraud et al. |
| 2011/0268410 A1 | 11/2011 | Giraud et al. |
| 2011/0268412 A1 | 11/2011 | Giraud et al. |
| 2011/0286712 A1 | 11/2011 | Puetz et al. |
| 2011/0317974 A1 | 12/2011 | Krampotich et al. |
| 2012/0057838 A1 | 3/2012 | Hill et al. |
| 2012/0093475 A1 | 4/2012 | Trebesch et al. |
| 2012/0230646 A1 | 9/2012 | Thompson et al. |
| 2012/0301096 A1 | 11/2012 | Badar et al. |
| 2013/0028567 A1 | 1/2013 | Parikh et al. |
| 2013/0034334 A1 | 2/2013 | Fariello et al. |
| 2013/0084050 A1 | 4/2013 | Vastmans et al. |
| 2013/0089292 A1 | 4/2013 | Ott et al. |
| 2013/0089298 A1 | 4/2013 | Holmberg et al. |
| 2013/0183018 A1 | 7/2013 | Holmberg |
| 2013/0287356 A1 | 10/2013 | Solheid et al. |
| 2013/0287357 A1 | 10/2013 | Solheid et al. |
| 2014/0086545 A1 | 3/2014 | Solheid et al. |
| 2014/0133819 A1 | 5/2014 | Trebesch et al. |
| 2014/0241691 A1 | 8/2014 | Solheid et al. |
| 2015/0378106 A1 | 12/2015 | Allen et al. |
| 2015/0380918 A1 | 12/2015 | Kellerman |
| 2017/0192192 A1 * | 7/2017 | Mead .................... G02B 6/445 |
| 2017/0293099 A1 | 10/2017 | Alexi et al. |
| 2018/0123273 A1 | 5/2018 | Ishii et al. |
| 2019/0086627 A1 * | 3/2019 | Allen ................. G02B 6/44526 |

(56) References Cited

U.S. PATENT DOCUMENTS

| | | | |
|---|---|---|---|
| 2021/0011243 A1 | 1/2021 | Geens et al. |
| 2021/0181430 A1 | 6/2021 | Van Baelen et al. |
| 2021/0181446 A1 | 6/2021 | Van Baelen et al. |
| 2021/0181447 A1 | 6/2021 | Van Baelen et al. |
| 2021/0181448 A1 | 6/2021 | Van Baelen et al. |
| 2021/0181449 A1 | 6/2021 | Van Baelen et al. |
| 2021/0271045 A1 | 9/2021 | Geens et al. |
| 2022/0221675 A1 | 7/2022 | Geens et al. |

FOREIGN PATENT DOCUMENTS

| | | |
|---|---|---|
| AU | 2010246577 A1 | 12/2010 |
| CN | 1133640 A | 10/1996 |
| CN | 1319194 A | 10/2001 |
| CN | 1448746 A | 10/2003 |
| CN | 201335897 Y | 10/2009 |
| CN | 102483500 A | 5/2012 |
| DE | 27 35 106 A1 | 2/1979 |
| DE | 29 18 309 A1 | 11/1980 |
| DE | 33 08 682 A1 | 9/1984 |
| DE | 38 36 273 A1 | 4/1990 |
| DE | 44 13 136 C1 | 5/1995 |
| DE | 295 04 191 U1 | 3/1996 |
| EP | 0 146 478 A2 | 6/1985 |
| EP | 0 149 250 A2 | 7/1985 |
| EP | 0 356 942 A2 | 3/1990 |
| EP | 0 406 151 A2 | 1/1991 |
| EP | 0 464 570 A1 | 1/1992 |
| EP | 0 479 226 A1 | 4/1992 |
| EP | 0 196 102 B1 | 3/1993 |
| EP | 0 538 164 A1 | 4/1993 |
| EP | 0 563 995 B1 | 10/1999 |
| EP | 1 228 389 B1 | 5/2003 |
| EP | 2 093 596 A2 | 8/2009 |
| EP | 2 450 729 A2 | 5/2012 |
| FR | 2 531 576 A1 | 2/1984 |
| FR | 2 587 127 A1 | 3/1987 |
| FR | 2 678 076 A1 | 12/1992 |
| JP | 59-74523 A | 4/1984 |
| JP | 60-169811 A | 9/1985 |
| JP | 61-55607 A | 3/1986 |
| JP | 61-90104 A | 5/1986 |
| JP | 2000-286574 A | 10/2000 |
| KR | 20-0337929 Y1 | 1/2004 |
| KR | 10-2008-0033420 A | 4/2008 |
| RU | 45207 U1 | 4/2005 |
| WO | 91/10927 A1 | 7/1991 |
| WO | 95/07480 A1 | 3/1995 |
| WO | 96/10203 A1 | 4/1996 |
| WO | 99/00619 A1 | 1/1999 |
| WO | 99/38042 A1 | 7/1999 |
| WO | 03/005095 A2 | 1/2003 |
| WO | 2008/048935 A2 | 4/2008 |
| WO | 2009/032330 A1 | 3/2009 |
| WO | 2011/100616 A2 | 8/2011 |
| WO | 2011/137353 A1 | 11/2011 |
| WO | 2012/068013 A2 | 5/2012 |
| WO | 2013/052854 A2 | 4/2013 |
| WO | 2014/090843 A1 | 6/2014 |
| WO | 2014/118227 A1 | 8/2014 |
| WO | 2014/173896 A1 | 10/2014 |
| WO | 2014/173930 A1 | 10/2014 |
| WO | 2014/207210 A1 | 12/2014 |
| WO | 2015/055586 A1 | 4/2015 |
| WO | 2016/012550 A2 | 1/2016 |
| WO | 2016/046259 A1 | 3/2016 |
| WO | 2016/156611 A1 | 10/2016 |
| WO | 2018202812 | 11/2018 |
| WO | 2018234578 | 12/2018 |
| WO | 2020/148296 A1 | 7/2020 |
| WO | 2021/156389 A1 | 8/2021 |

OTHER PUBLICATIONS

International Search Report for International Application No. PCT/EP2014/051714 mailed Apr. 29, 2014 (2 pages).

International Search Report and Written Opinion for International Application No. PCT/EP2014/058136 mailed Jul. 11, 2014 (9 pages).

International Search Report and Written Opinion for International Application No. PCT/EP2014/058196 mailed Jul. 31, 2014 (10 pages).

AT&T Product Bulletin 2987D-DLH-7/89, "High Density Interconnect System (HDIC)," Issue 2 (Copyright 1989).

"ITU Fiber Handbook" with English translation, 14 pages, Mar. 1992.

Northern Telecom Bulletin #91-004, Issue #2, May 1991.

"Precision Mechanical" with English translation, 5 pages.

Preface to the book "Structure, Installation, Connection and Protection of Communication Optical Fiber Cable," in Chinese with English Translation, 14 pages (Mar. 1992).

Complaint relating to Civil Action No. 5:11-cv-02509-JS, *ADC Telecommunications, Inc* v. *Opterna Am, Inc.* filed Apr. 11, 2011 (14 pages).

Complaint relating to Civil Action No. 1:11cv-735 (GBL-IDD), *ADC Telecommunications, Inc* v. *Opterna Am, Inc.* filed Jul. 12, 2011 (5 pages).

Plaintiff's Notice of Dismissal relating to Civil Action No. 5:11-cv-02509-JS, *ADC Telecommunications, Inc* v. *Opterna Am, Inc.* filed Jul. 12, 2011 (1 page).

Stipulation and Order of Dismissal relating to Civil Action No. 1:11-cv-735-GBL-IDD, *ADC Telecommunications, Inc* v. *Opterna Am, Inc.* filed Feb. 21, 2012 (2 pages).

International Search Report and Written Opinion of the International Searching Authority for International Patent Application No. PCT/EP2021/052708 mailed Apr. 22, 2021, 15 pages.

\* cited by examiner

TELECOMMUNICATIONS MODULE ARRANGEMENTS

CROSS-REFERENCE TO RELATED APPLICATIONS

This application is a National Stage Application of PCT/EP2021/052708, filed on Feb. 4, 2021, which claims the benefit of U.S. Patent Application Ser. No. 62/971,313, filed on Feb. 7, 2020, and claims the benefit of U.S. Patent Application Ser. No. 63/030,003, filed on May 26, 2020, the disclosures of which are incorporated herein by reference in their entireties. To the extent appropriate, a claim of priority is made to each of the above disclosed applications.

BACKGROUND

Communication systems utilize fiber optic cables to connect together pieces of telecommunications equipment. Telecommunications panels are used to optically couple fiber optic cables to cross-connect between various types of communications equipment. The demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. In environments of higher fiber density, access, cleaning, and repair all can pose challenges.

Further development in such higher density fiber systems is desired.

SUMMARY

In accordance with some aspects of the disclosure, examples of telecommunications trays and modules are described. According to one example, a telecommunications tray is configured for mounting to a telecommunications fixture. The tray comprises a removably mounted telecommunications module that defines a body that is enclosed by a cover to define an interior, the telecommunications module including radius limiters within the interior for managing cables and defining connection locations for inputting and/or outputting signals via cables for processing within the module, the telecommunications module movably mounted to the tray.

According to another example aspect, the disclosure is directed to a telecommunications tray that is configured for mounting to a telecommunications fixture. The tray comprises a plurality of connection locations defined by fiber optic adapters for inputting and/or outputting signals via cables for processing, a cable overlength chamber including at least one radius limiter for managing cables therewithin, the cable overlength chamber enclosed by a cover to retain the cables within the overlength chamber, a plurality of radius limiters positioned outside of the cable overlength chamber for managing cables exiting from the fiber optic adapters to an exterior of the tray, and a tray hinge for removably and pivotally mounting the tray the telecommunications fixture.

According to other aspects of the disclosure, different examples of modules or cassettes are discussed that can be mounted in telecommunications fixtures such as trays. According to one example, such a telecommunications module or cassette may include a body that is enclosed by a cover to define an interior. Radius limiters may be provided within the interior for managing cables. The module may further define connection locations for inputting and/or outputting signals via cables for processing within the module, the telecommunications module further comprising a module hinge that is configured to mate with a hinge defined by the telecommunications fixture for allowing pivotal movement to the body of the telecommunications module relative to the telecommunications fixture.

DETAILED DESCRIPTION

Referring now to FIGS. 1-50, examples of telecommunications equipment in the form of pivot trays that can be mounted in fiber distribution elements are illustrated. Such fiber distribution elements may be configured for connecting patch cables entering one side of the element to an incoming cable, such as a distribution cable or a feeder cable entering an opposite side of the element. Such elements carrying the pivot trays may be provided in the form of pull-out drawers that are slidably mounted in a stacked arrangement to telecommunications frames.

Examples of such slidable distribution elements that can support the trays discussed herein are described in PCT Publication Nos. WO 2014/118227; WO 2014/207210; and WO 2016/012550, the entireties of which are hereby incorporated by reference.

It should be noted that the examples of pivot trays that are discussed with respect to FIGS. 1-50 can include telecommunications modules or cassettes that provide the fiber distribution function. As will be discussed, in certain examples, such modules or cassettes are provided in a removable fashion with respect to the trays. In other examples, such modules or cassettes are integrally formed with or otherwise non-removably mounted to the pivot trays. And, in certain examples where the modules or cassettes are integrally formed with the pivot trays, the entire pivot tray can be considered the distribution module itself and can be mounted in the drawer-type elements that slide.

Figure 1:
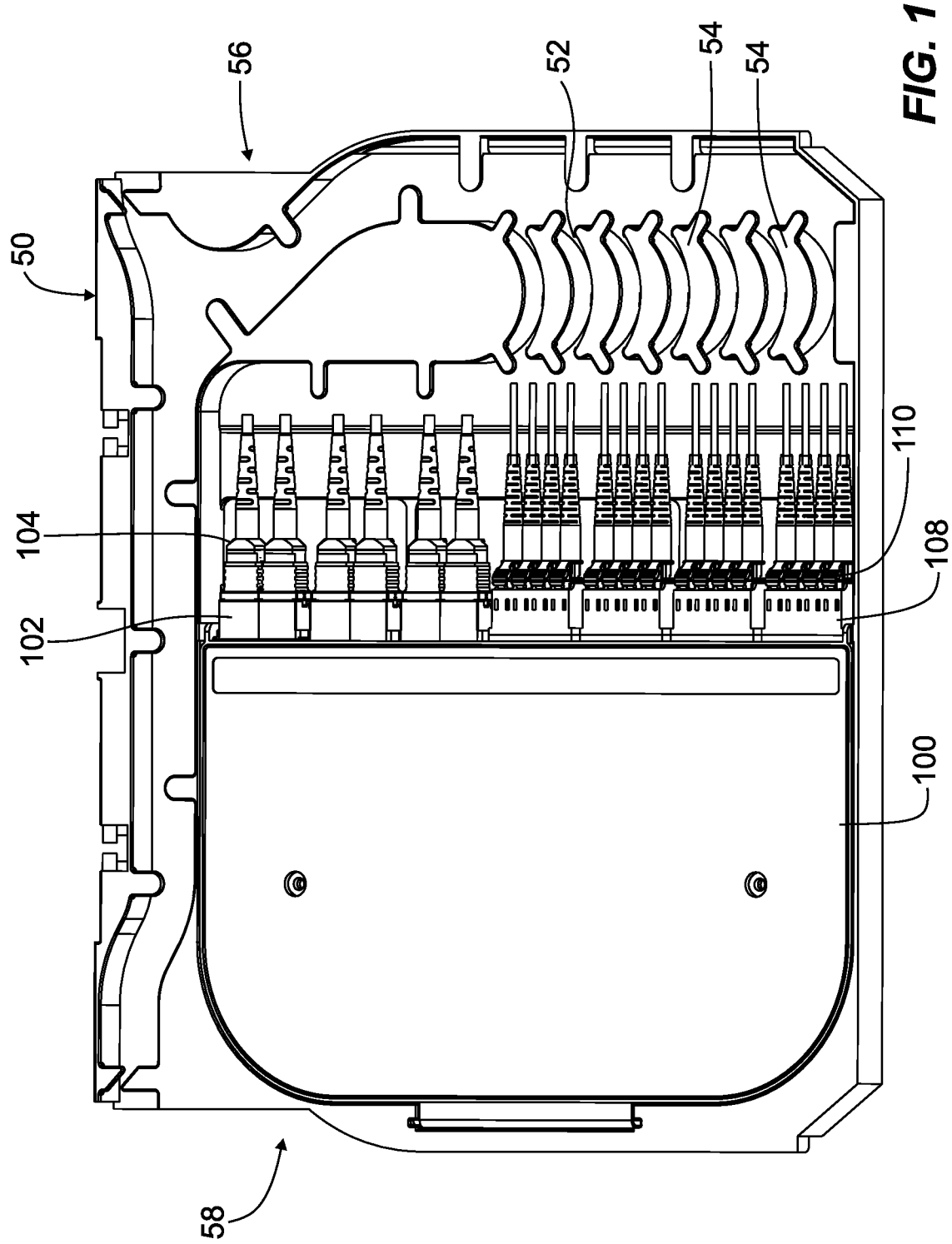
FIG. 1 is a top perspective view of an example telecommunications pivot tray housing a telecommunications module removably mounted within the pivot tray.
Figure 3:
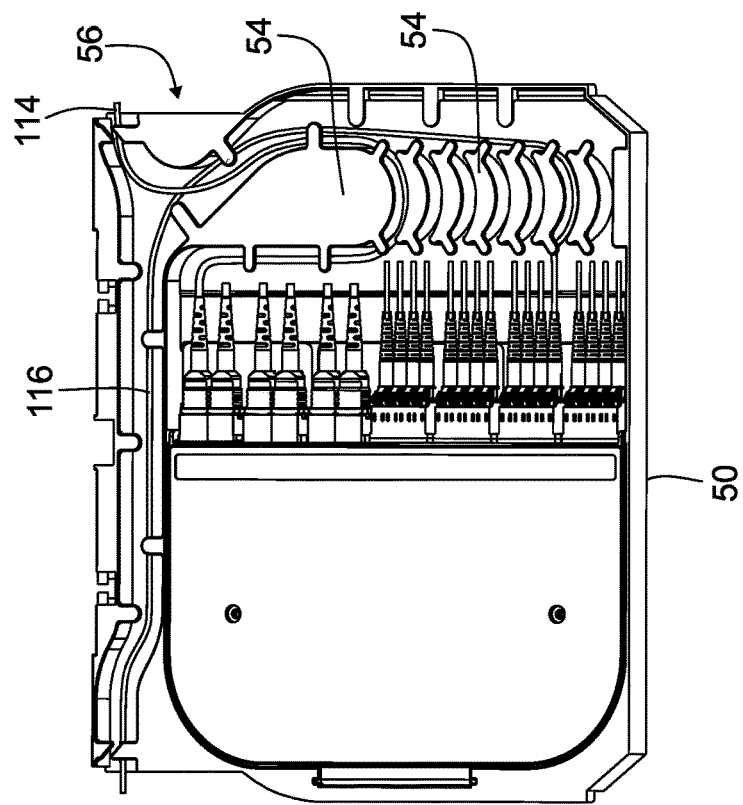
FIG. 3 illustrates an alternative cable routing within the pivot tray of FIGS. 1-2.
Figure 2:
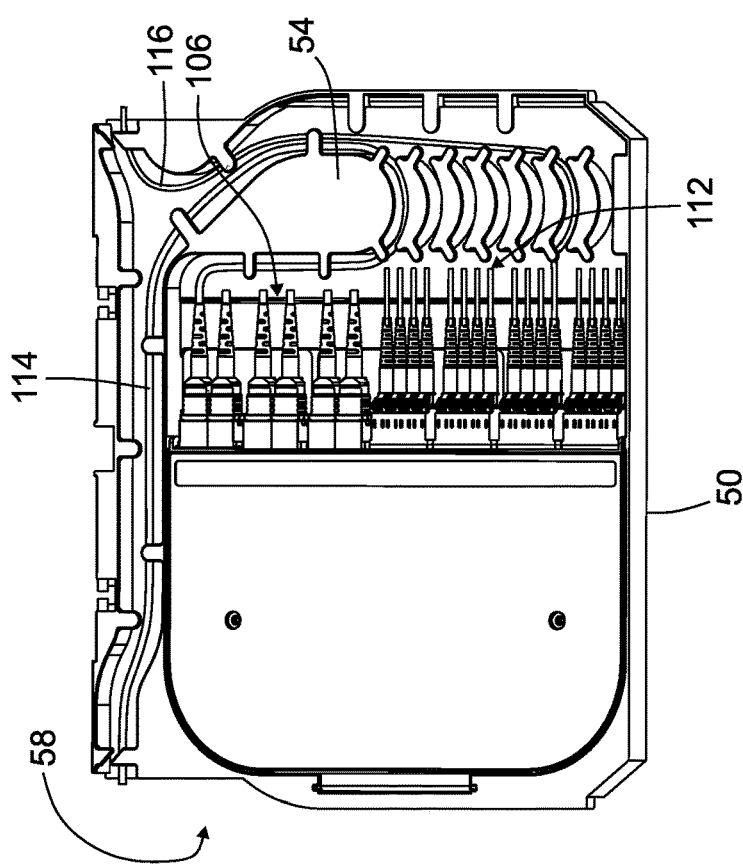
FIG. 2 illustrates one example cable routing within the pivot tray of FIG. 1 using the telecommunications module therein.
Figure 5:
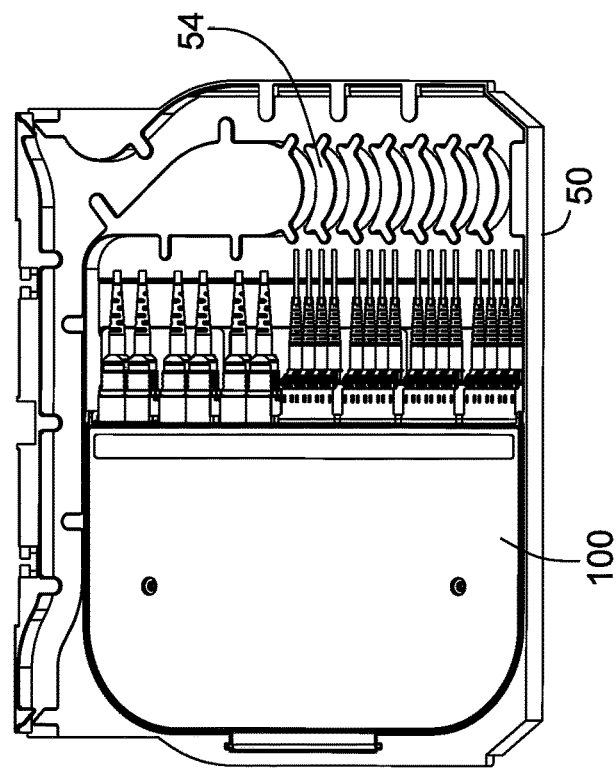
FIG. 5 illustrates another perspective view of the pivot tray with the telecommunications module of FIG. 4 having been placed therein.

Referring now to FIGS. 1-3, one example of a pivot tray 50 carrying an example fiber optic module 100 is illustrated. The example pivot tray and module arrangement is configured to allow the same tray 50 to be used for both left and right orientation for patching between an outside plant (OSP) side and equipment side.

In the illustrated example module, the module 100 may define a first plurality of adapters 102 (e.g., MPO adapters) that are configured to receive mating connectors 104 for receiving the OSP signal at the "fixed" side 106 and a second plurality of adapters 108 (e.g., LC adapters) that are configured to receive mating connectors 110 for the "flexible" distribution signal for the equipment side 112.

As shown, the pivot tray 50 provides a cable path 52 and plurality of radius limiters 54 within that cable path 52 that can guide either the fixed side 106 or the flexible side 112 cabling toward either a right side 56 or a left side 58 of the tray 50.

FIG. 2 illustrates that if the "fixed" OSP side 106 is going to be provided at the left side 58 of the tray 50, cabling 114 that is terminated with the MPO connectors 104 are routed around the radius limiter 54 and in a direction from the front toward the back of the tray 50 and out the cable path 52 to the left side 58 of the tray 50. And, as also shown in FIG. 2, "flexible" equipment side cabling 116 can simply be routed around the radius limiters 54 and in a direction from the front toward the back of the tray 50 and out the cable path 52 to the right side 56 of the tray 50.

If, for example, the "fixed" OSP side 106 is going to be provided at the right side 56 of the tray 50, the cabling 114 that is terminated with the MPO connectors 104 are routed around the radius limiter 54 and out the cable path 52 to the right side 56 of the tray 50, as illustrated in FIG. 3. And, the "flexible" equipment side cabling 116, which is added later on, crosses over the "fixed" side cabling 114 before leading out the left side 58 of the tray 50 as also shown in FIG. 3.

It should be noted that although in the illustrated example, the "fixed" side signal entry is provided with adapters 102 that have an MPO format, other formats are certainly possible. The same concept is applicable to the "flexible" equipment side 112. Also, the number of the adapters 102/108 can be varied based on the connectivity needs for the module 100.

Figure 4:
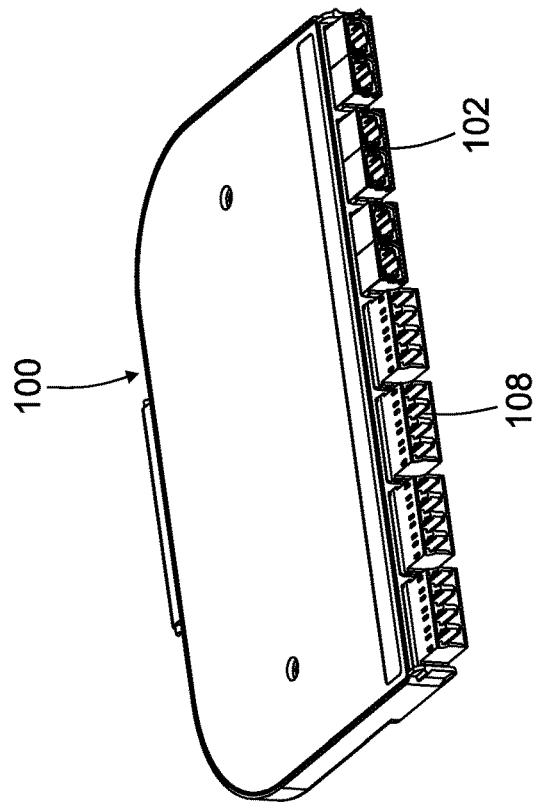
FIG. 4 illustrates the telecommunications module of FIG. 1 removed from the pivot tray in isolation.

Referring specifically to FIGS. 4-7, two different exemplary types of equipment that can be supported by a pivot tray 50 are shown. FIG. 4 illustrates a telecommunications module, similar to the module 100 discussed above, where connectorized cabling 114 can enter the module 100 via a first plurality of adapters 102 positioned on the front of the module 100, and after processing within the module 100, cables 116 exit via a different set of adapters, i.e., the second plurality of adapters 108, positioned at the front of the module 100. The module 100 is shown within the pivot tray 50 in FIG. 5.

Figure 6:
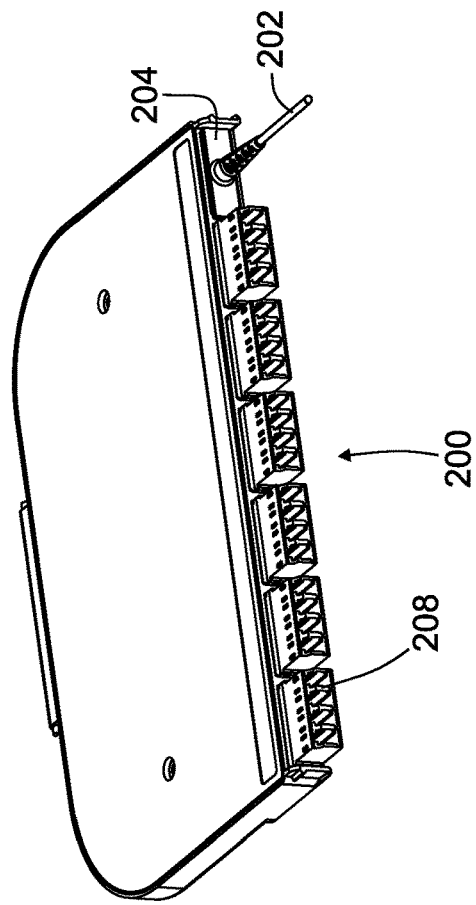
FIG. 6 illustrates an example pre-cabled telecommunications cassette in isolation, the cassette usable within a telecommunications pivot tray such as that shown in FIG. 1.

FIG. 6 illustrates a different type of equipment that can be mounted within the pivot tray. The equipment shown in FIG. 6 is a pre-cabled telecommunications cassette 200 where an incoming OSP cable 202 is pre-terminated to a cable block 204, and after processing, equipment cables 206 exit via a set of adapters 208 positioned at the front of the cassette 200.

Figure 7:
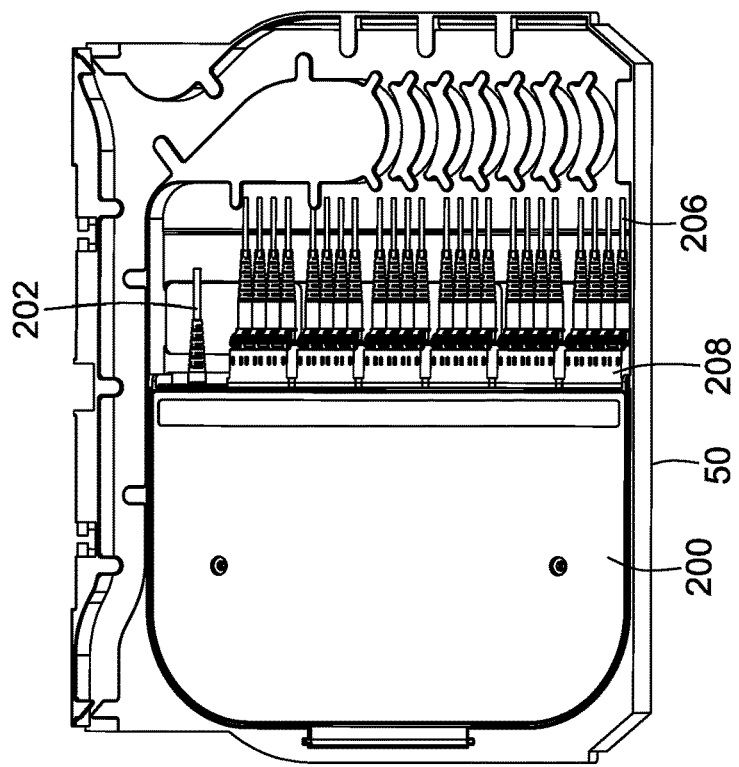
FIG. 7 illustrates a perspective view of the telecommunications cassette of FIG. 6 having been placed within the pivot tray of FIG. 1.
Figure 8:
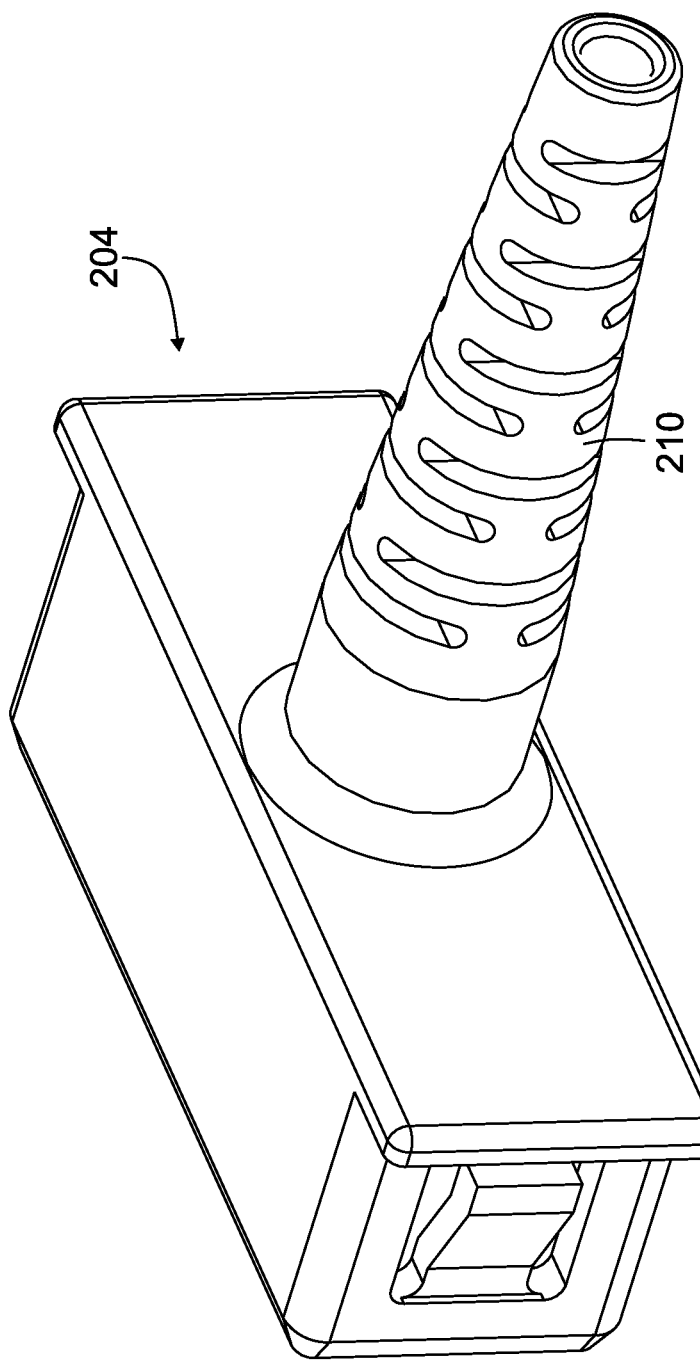
FIG. 8 is a perspective view of a cable termination block in isolation that can be used within a cassette such as that shown in FIGS. 6-7.

As shown, the cable block 204 is configured with a width and a height such that it can fit within an adapter opening within the cassette 200. In the illustrated example, the cable termination block 204 is configured wide enough to fit within the footprint of two MPO or a quad block of LC adapters 208 within the given cassette 200, as shown in FIGS. 6-8. The block 204 is illustrated with an integrated strain relief boot 210 for bend control.

Figure 9B:
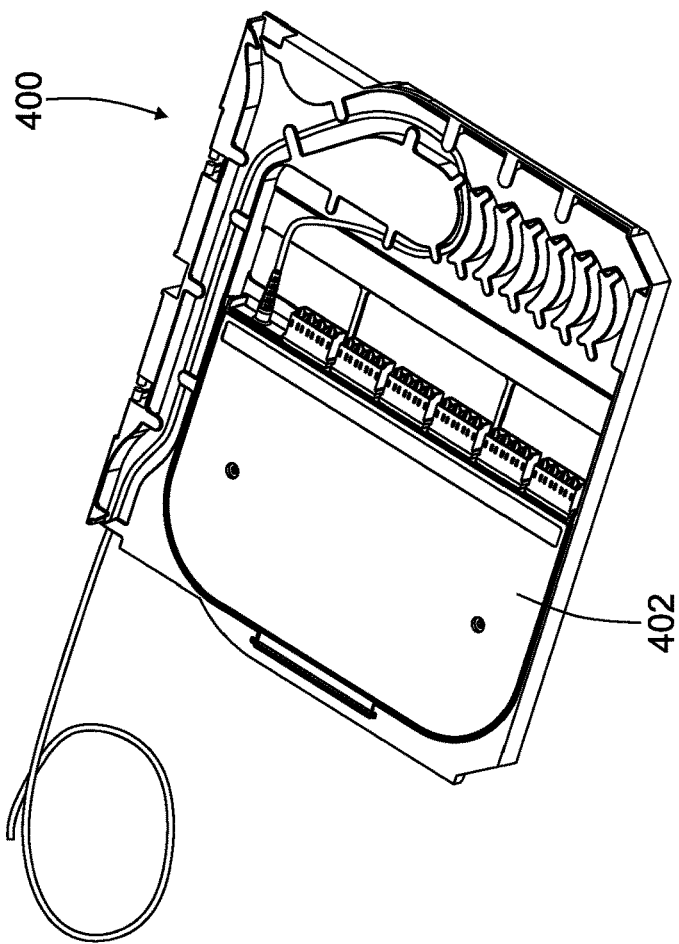
FIG. 9B illustrates a telecommunications pivot tray similar to that of FIG. 9A with a pre-cabled telecommunications cassette having been integrally formed therewith.
Figure 9A:
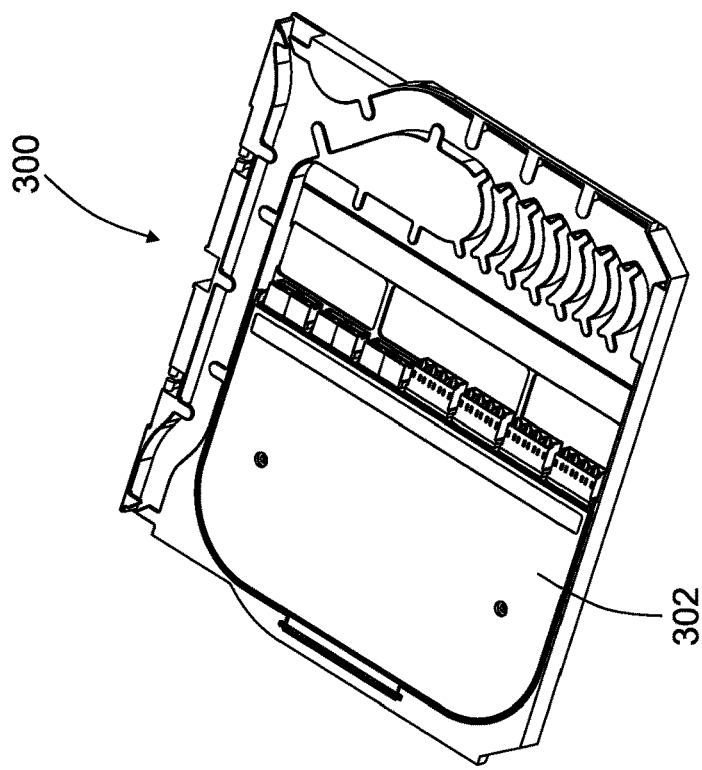
FIG. 9A is an example of a telecommunications pivot tray having features similar to that shown in FIGS. 1-2, wherein the telecommunications module therein has been integrally formed therewith.

FIG. 9A is an example of a telecommunications pivot tray 300 having features similar to that shown in FIGS. 1-3. In the pivot tray 300, a telecommunications module 302 has been completely integrated into the pivot tray 300. FIG. 9B illustrates a telecommunications pivot tray 400 similar to that of FIG. 9A with a pre-cabled telecommunications cassette 402, instead of a module 302 as in FIG. 9A, having been integrally incorporated into the pivot tray.

Figure 9C:
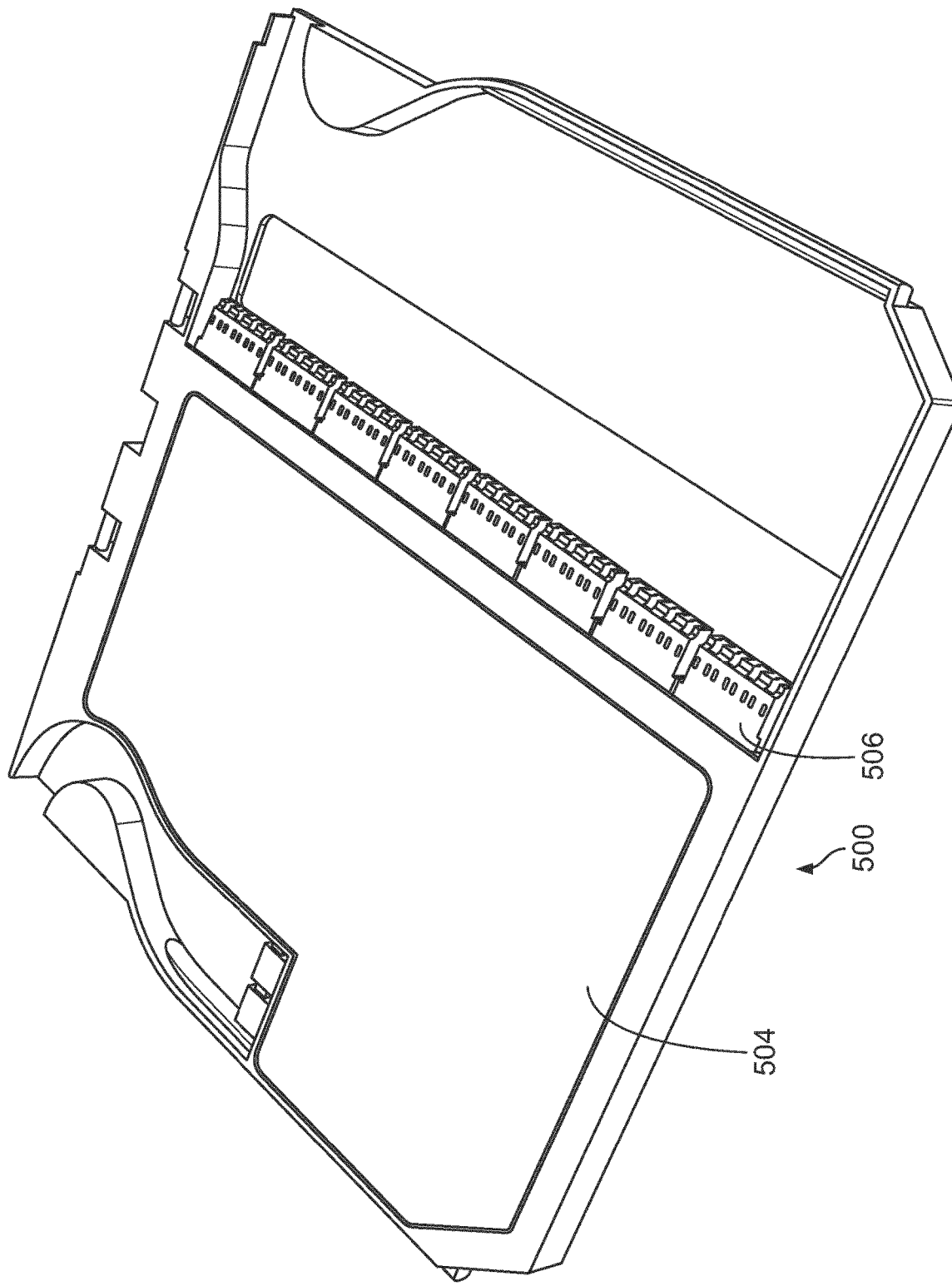
FIG. 9C illustrates a variation on the telecommunications pivot tray of FIG. 9A with the cable entry point provided at a different location within the tray.

FIG. 9C illustrates a variation on the telecommunications pivot tray 300 of FIG. 9A with the cable entry point provided at a different location within the tray. In the example tray 500 illustrated in FIG. 9C, the incoming fixed side OSP cables enter the module 504 thereof in a direction along back to front of the pivot tray 500. And, the adapters 506 for a flexible equipment side cabling face in a perpendicular direction, toward the right side of the pivot tray 500. It should be noted that even though the variation illustrated in FIG. 9C is shown to utilize a module 504 that is integrally formed with the pivot tray 500, such a directional modification can be made on modules or cassettes that are to be removably attached to the pivot tray.

Figure 10:
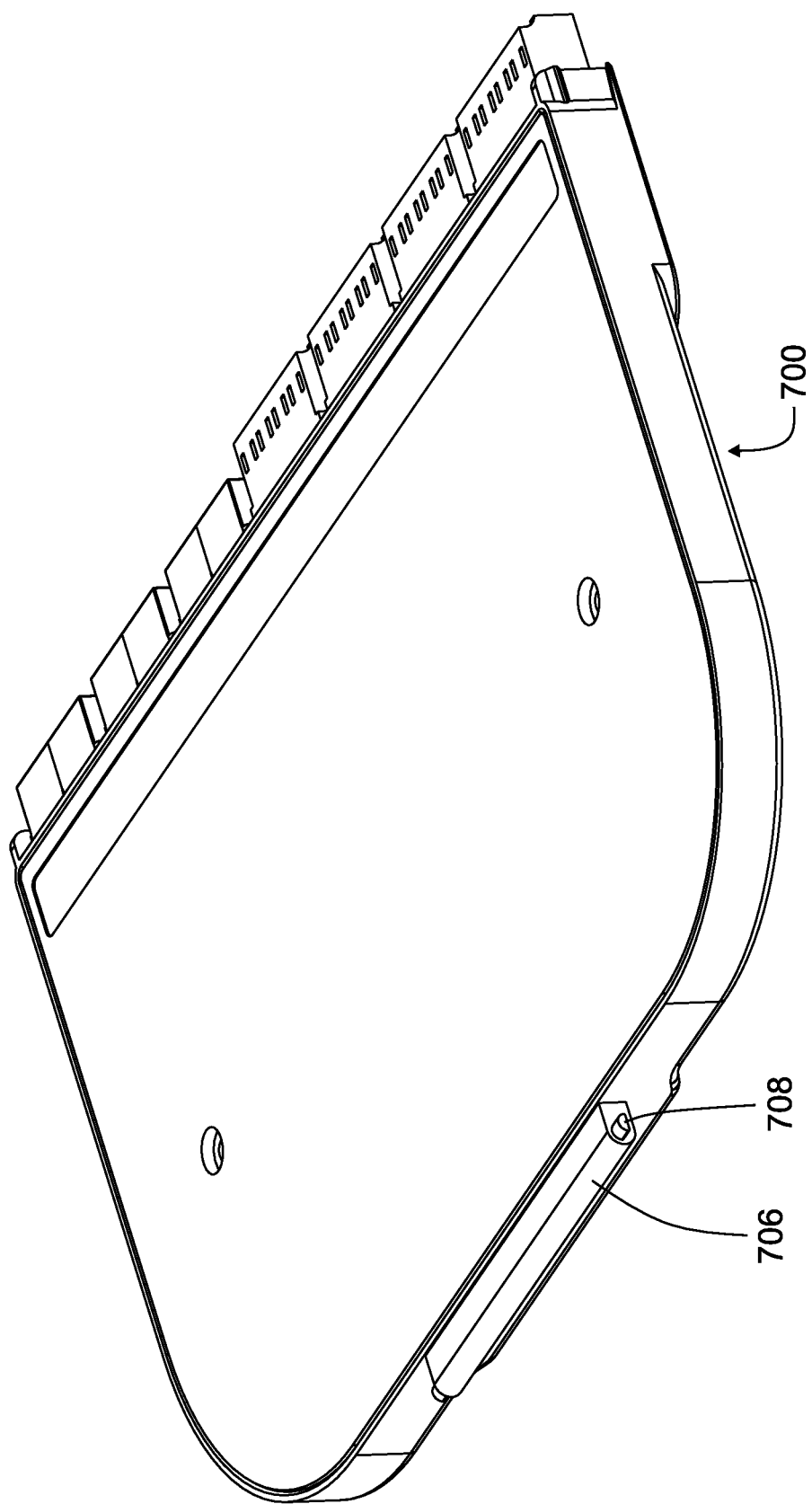
FIG. 10 is a rear perspective view of another embodiment of a telecommunications module shown in isolation that is configured to provide pivotability for cleaning access within a telecommunications tray.
Figure 11:
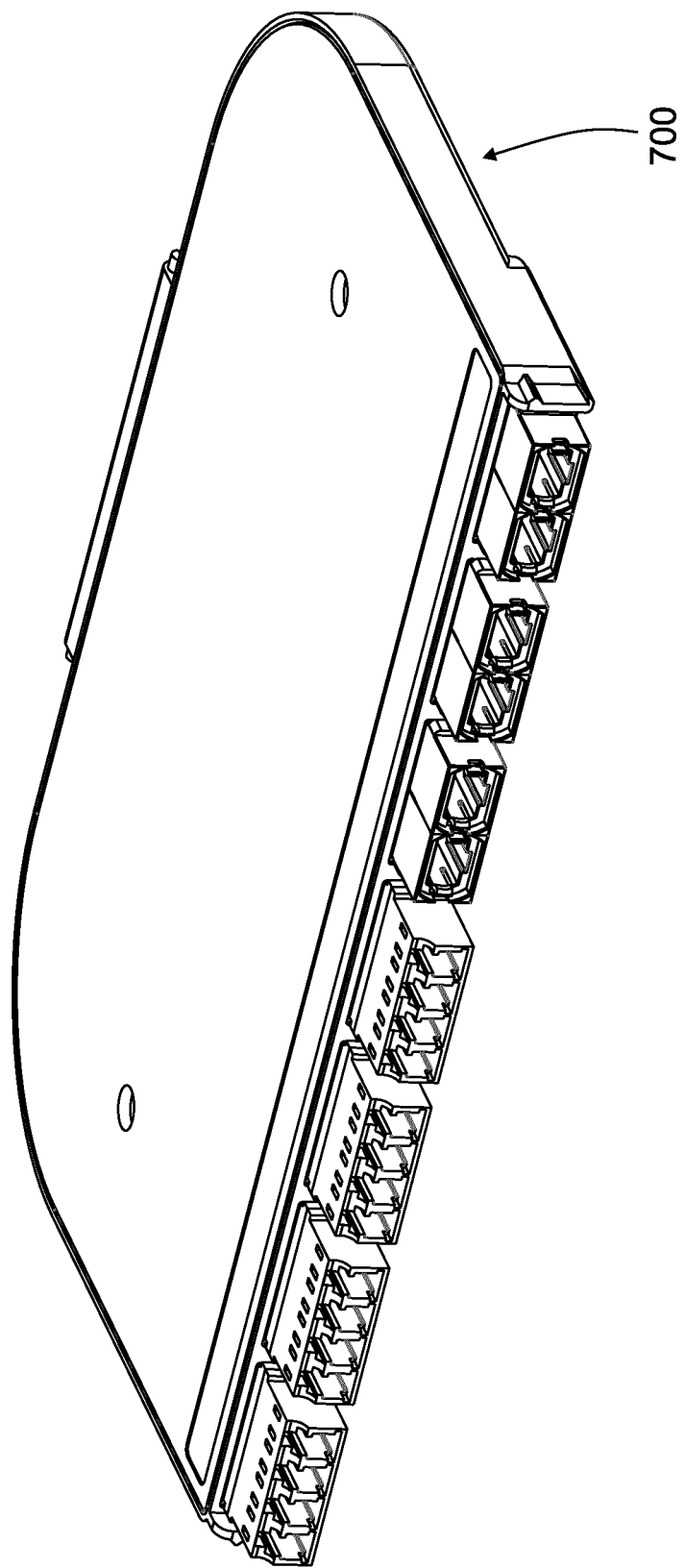
FIG. 11 is a front perspective view of the telecommunications module of FIG. 10.
Figure 12:
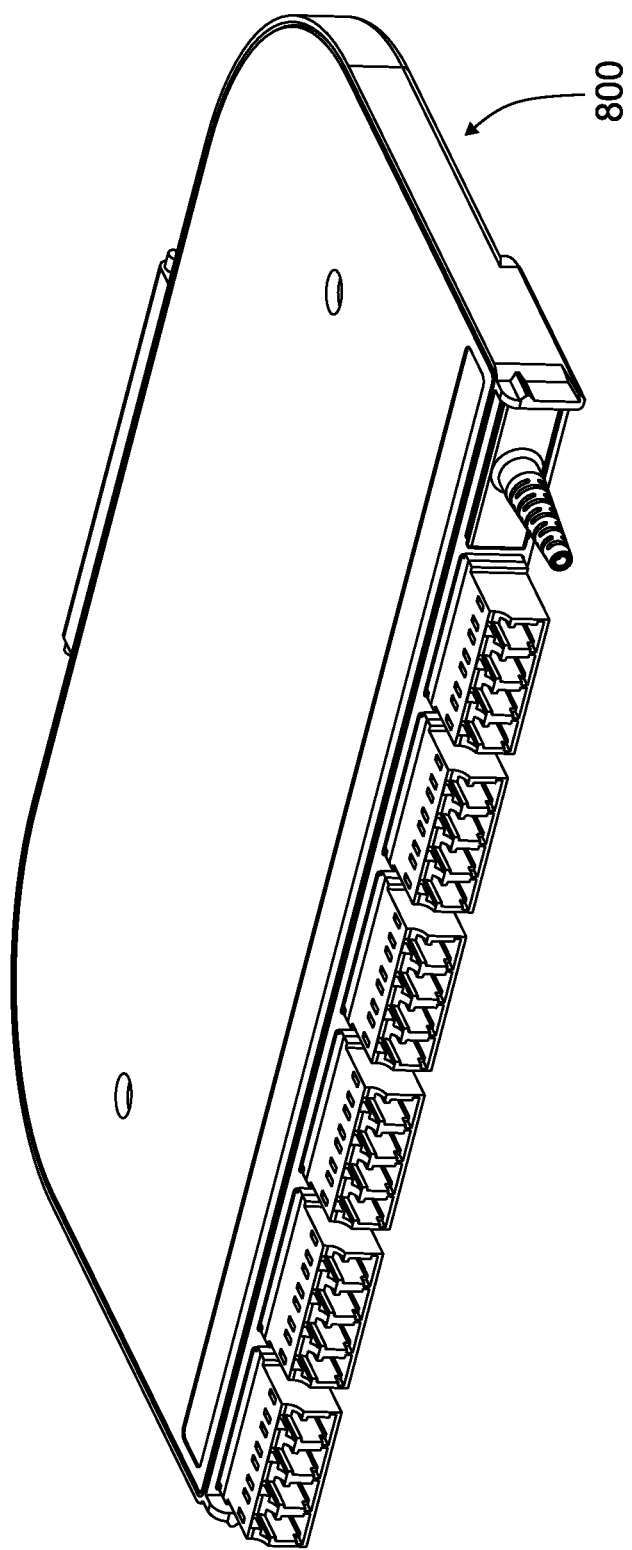
FIG. 12 is an example of a pre-cabled telecommunications cassette having features similar to those of the module of FIGS. 10-11.

Referring now to FIGS. 10-11, the example pivot tray 600 and telecommunications module 700 arrangements allows for cleaning access. FIG. 12 is an example of a pre-cabled telecommunications cassette 800, rather than a telecommunications module, having features similar to those of the module 700 of FIGS. 10-11.

Figure 13:
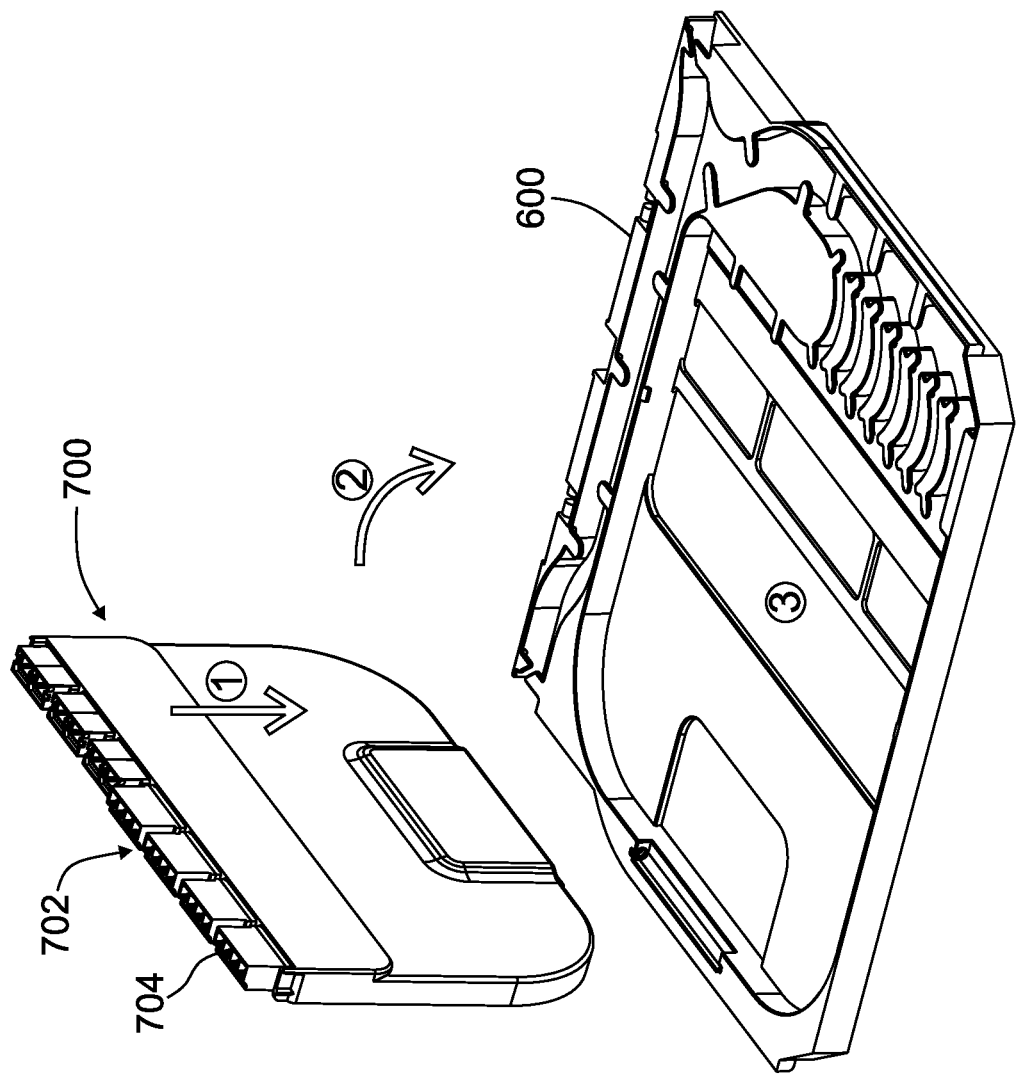
FIG. 13 is an exploded view of the telecommunications module of FIGS. 10-11 being mounted to a telecommunications tray that provides a pivoting function for the module for cleaning access.
Figure 14:
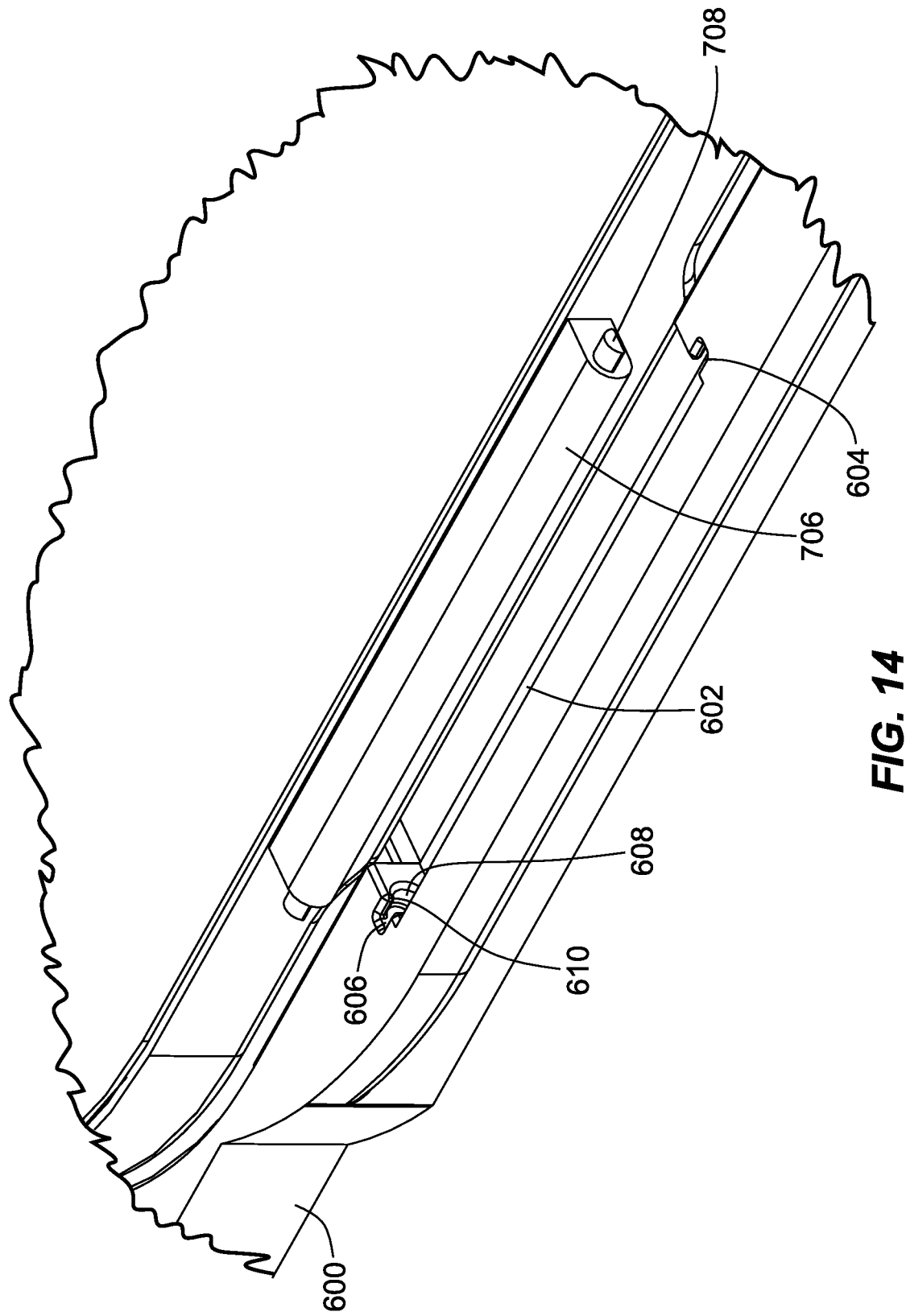
FIG. 14 is a close-up view of the inter-mating hinge structures provided on the telecommunications tray and the module of FIG. 13.

Referring to FIGS. 13 and 14, in the example module 700 shown, the module 700 includes limited pivotability for accessing front connection locations 702 that have been provided in the form of adapters 704 as noted above. The module 700 includes a hinge 706 with hinge pins 708 positioned at the ends thereof. In the illustrated example, the hinge pins 708 are not fully circular and define a half-moon profile. The hinge 706 fits within a hinge slot 602 provided on the pivot tray 600, with the hinge pins 708 fitting within hinge retainers 604 located at the sides of the hinge slot 602, as shown in FIG. 14. As shown, each hinge retainer 604 includes a receiving portion 606 that communicates with a pivot portion 608. The receiving portion 606 is sized smaller than the pivot portion 608 and is sized to receive the hinge pin 708 through the receiving portion 606 into the pivot portion 608 when the module 700 is oriented in a vertical position with respect to the pivot tray 600. After the hinge pins 708 of module hinge 706 pass through the receiving portion 606 into the pivot portion 608 of each hinge retainer 604, pivotal rotation of the module 700 brings the hinge pins 708 underneath a lip 610 defined between the receiving portion 606 and the pivot portion 608 of the hinge retainers 604 and effectively locks the hinge 706 of the module 700 within the hinge slot 602 provided on the pivot tray 600. In order to remove the module 700, the module 700 has to be brought to a fully vertical position with respect to the pivot tray 600, and the pins 708 have to be lifted off the hinge retainers 604 by passing through the receiving portions 606 of the hinge retainers 604.

Figure 15:
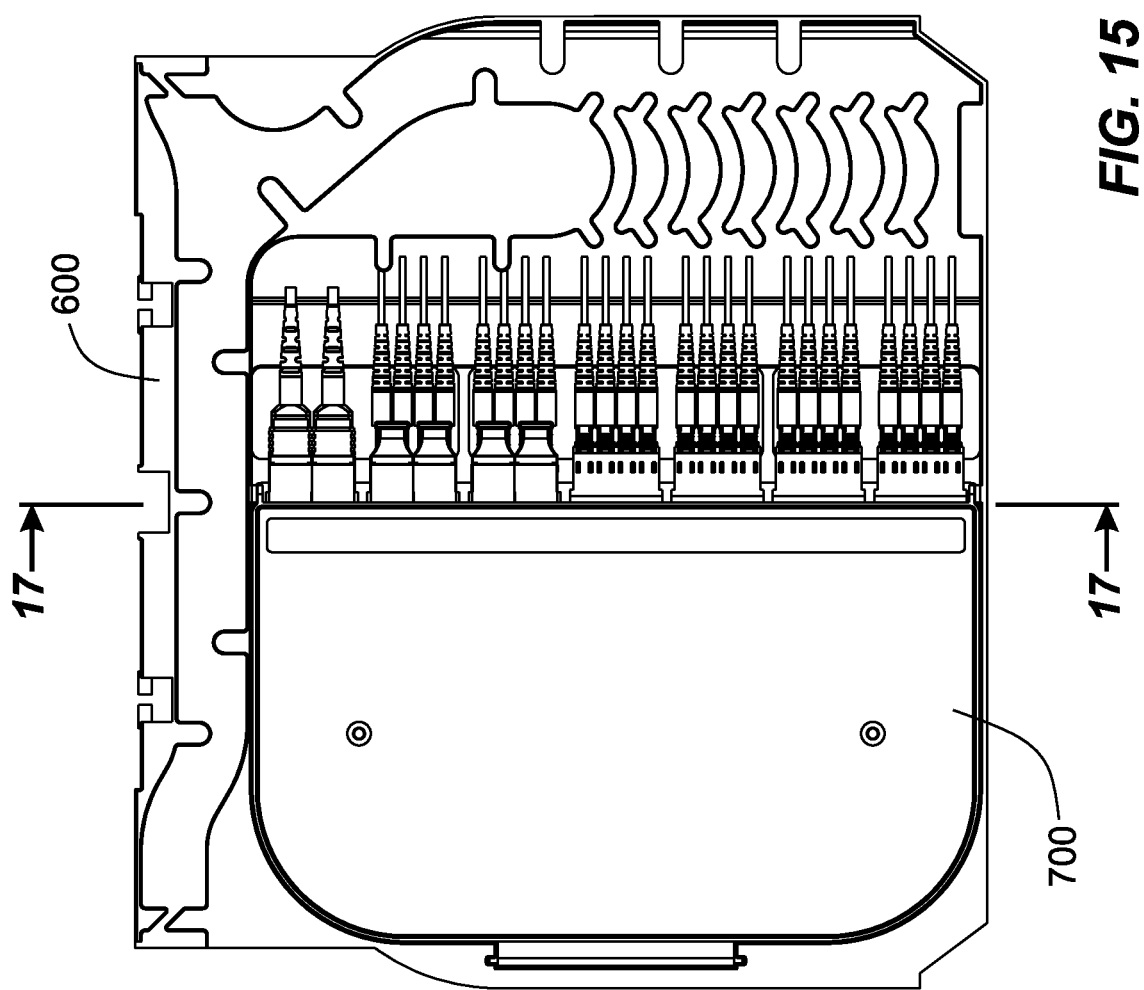
FIG. 15 illustrates a top view of the telecommunications module of FIGS. 10-11 fully seated within the telecommunications tray of FIGS. 13-14.
Figure 16:
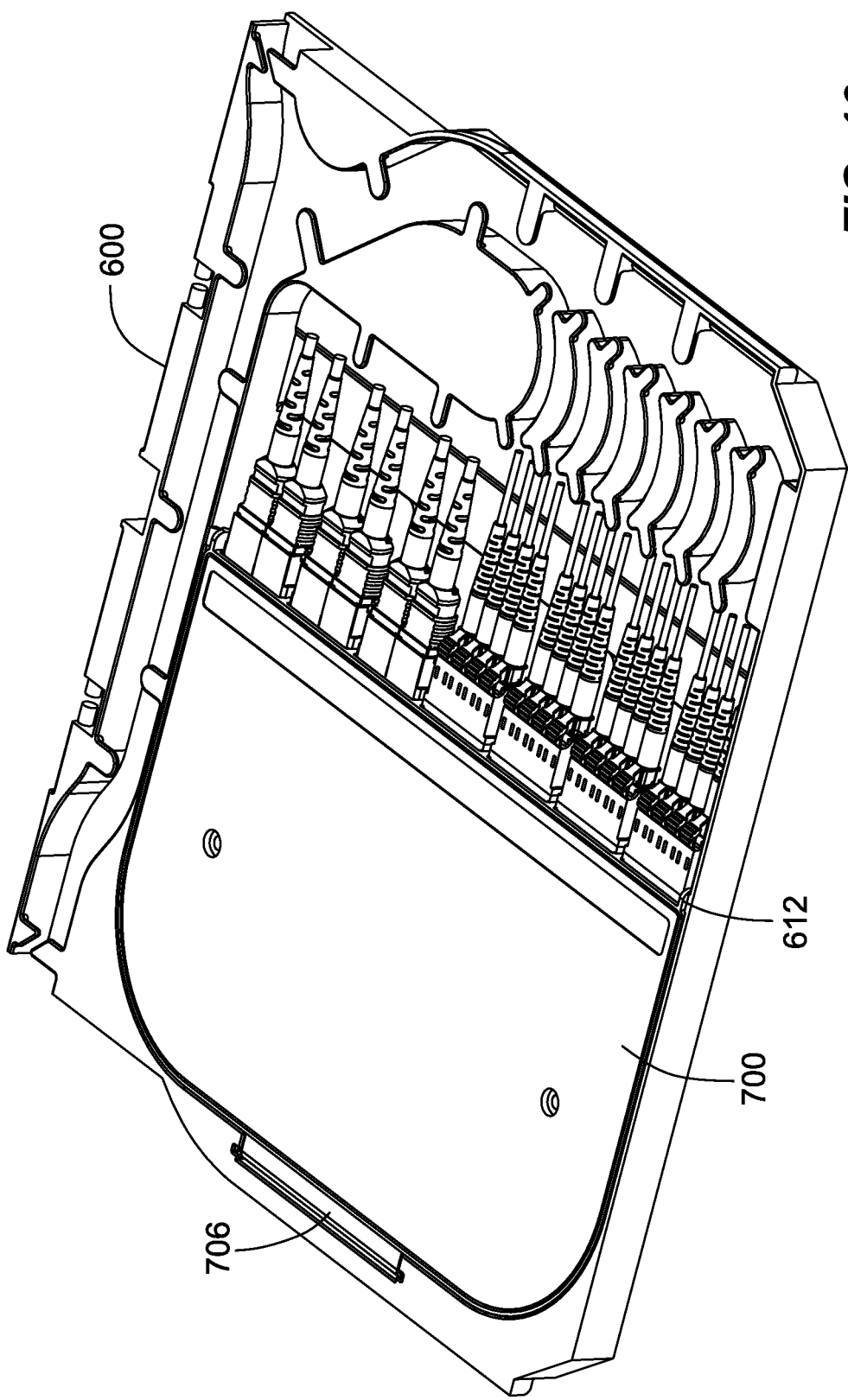
FIG. 16 is a perspective view of the tray and the module of FIG. 15.

After the hinge pins 708 have been positioned within the hinge retainers 604, as shown in FIGS. 15-16, the module 700 is ready to be pivoted down and can be pivoted all the way down to a horizontal position within the pivot tray 600. As noted above, the profile of the hinge pins 708 and the hinge retainers 604 allow a locking function for the module 700 when the module 700 is inserted and pivoted down from a vertical position.

Figure 17:
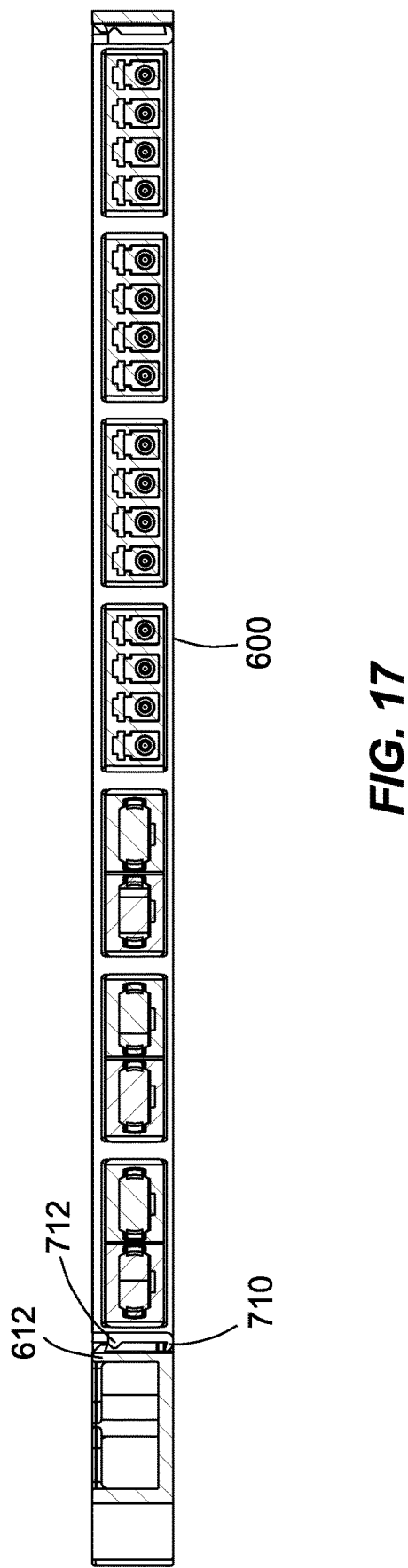
FIG. 17 is a cross-sectional view taken along line 17-17 of FIG. 15.
Figure 18:
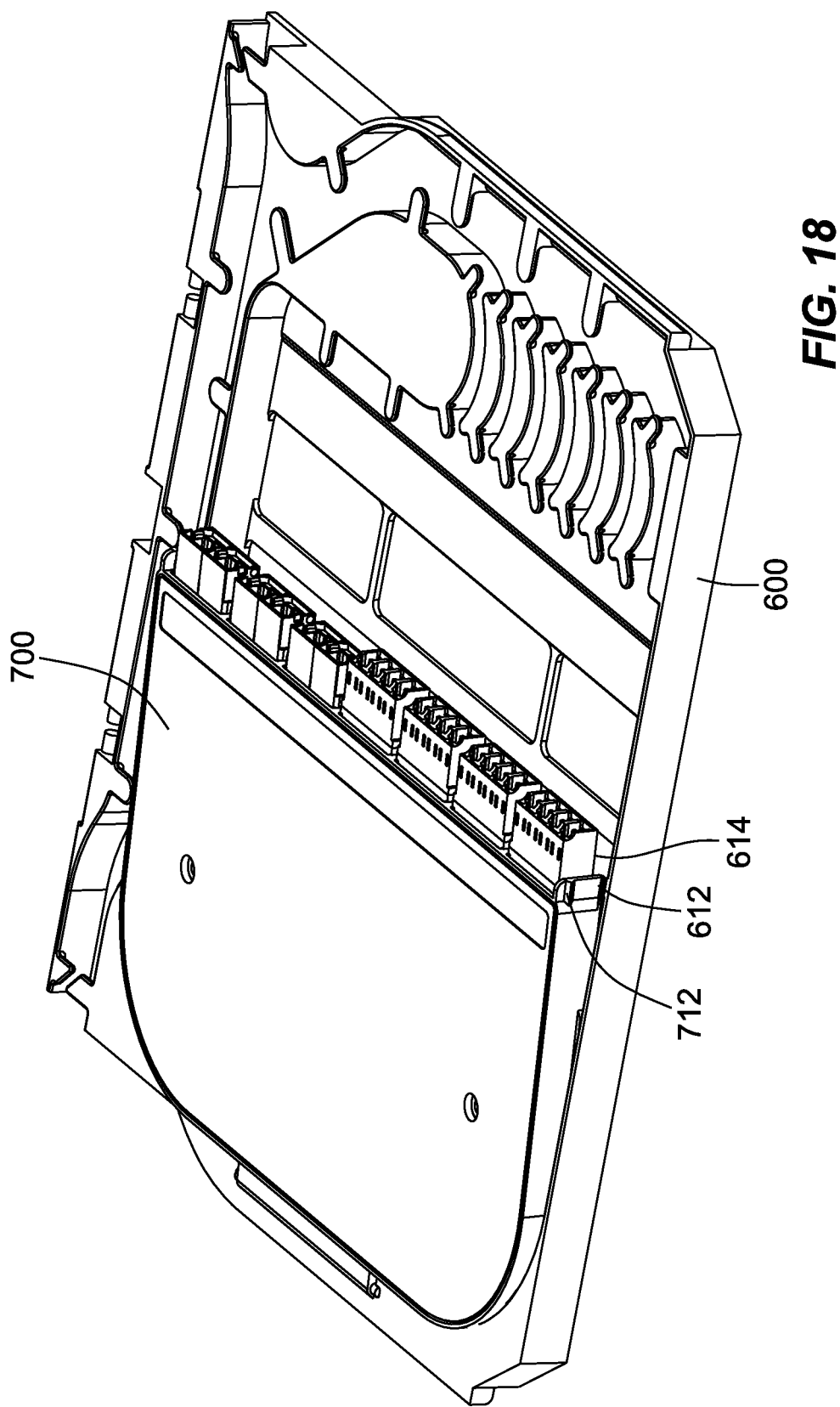
FIG. 18 is a perspective view of the tray and the module of FIG. 16 with the module having been pivoted up for cleaning access.
Figure 19:
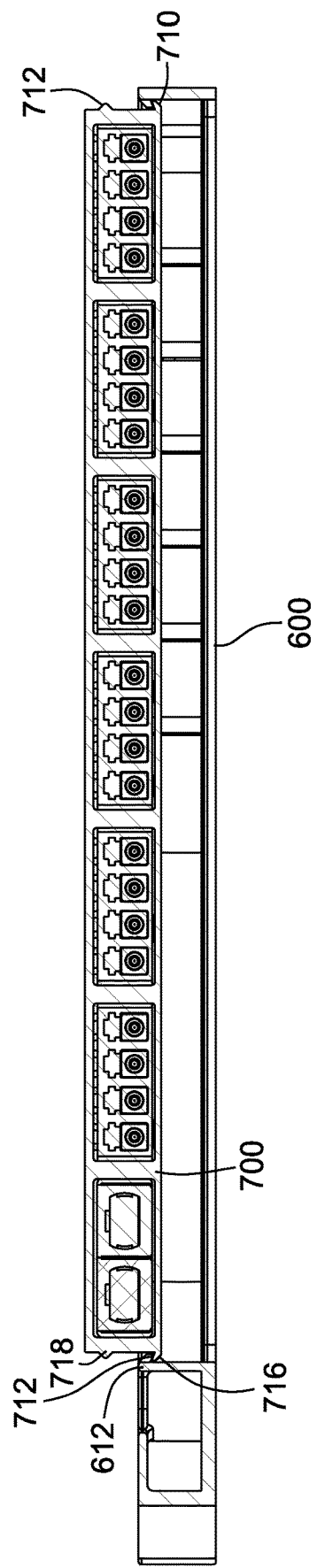
FIG. 19 is a cross-sectional view taken along a line similar to line 17-17 of FIG. 15 when the module has been pivoted up for cleaning access as shown in FIG. 18.

Now referring to FIGS. 15-19, the module 700 may be provided with a lower tab 710 and an upper tab 712 at both sides of the module 700, adjacent a front 714. The lower tab 710 defines a ramped face 716 angled downward and an flat upper face 718. The upper tab 712 defines two opposed ramped faces 720. A cross-sectional view of the lower and upper tabs 710, 712 are illustrated in FIGS. 17 and 19, showing the profiles thereof.

The lower and upper tabs 710, 712 of the module 700 are configured to interact with a tab 612 positioned on the pivot tray 600 for providing limits to the pivotable movement of the module 700 for cleaning access. The profile of the pivot tray tab 612 is also shown in FIGS. 17 and 19.

When the module 700 is brought down to a flat position, both the lower tab 710 and the upper tab 712 at the front 714 of the module 700 pass over the tab 612 that is positioned on the pivot tray 600 to lock the module 700 in a flat position within the tray 600, shown in FIGS. 16-17. If the module 700 has to be pivoted for cleaning access, the module 700 has to be unlocked.

As shown in FIG. 18, the tray 600 can include an opening 614 positioned underneath the module 700 for allowing the front 714 of the module 700 to be pushed upwardly for unlocking the module 700. Once unlocked for upward movement, the range of pivot travel for cleaning access is determined by the distance between the upper tab 712 and the lower tab 710 at the front 714 of module 700, as illustrated by FIGS. 18 and 19.

When the module 700 is in a completely flat position and when the module 700 needs to be pivoted upwardly, the upper ramped tab 712 has to once again clear the tab 612 of the tray 600 to unlock the module 700 for pivoting. However, the range of travel for the module 700 is set by contact of the tray tab 612 with the flat upper face 718 of the lower tab 710 of the module 700, as shown in FIG. 19. In certain embodiments, the range of pivotal travel is between about 1 and 10 degrees from a flat horizontal position. In certain other embodiments, the pivotal movement is limited to between about 2 and 8 degrees from the flat horizontal position. In yet other embodiments, the range of the pivotal movement is about 5 degrees from the flat horizontal position.

The module 700 can be pivoted upwardly until the flat upper face 718 of the lower tab 710 contacts a bottom face of the tab 612 on the tray 600 to stop the pivoting motion, as shown in FIG. 19. If the module 700 needs to be completely removed from the pivot tray 600, the contact force between the flat upper face 718 of the bottom tab 710 of the module 700 and the tab 612 of the tray 600 has to be overcome.

When cleaning is finished, the module 700 can be pivoted down to a completely flat horizontal position again, with the tray tab 612 once again passing over the upper tab 712 of the module 700 to completely lock the module 700 down, as shown in FIG. 17.

The limited pivot range prevents pulling and stress on the cables that extend from the module 700, while allowing for enough vertical upward movement for accessing the connectors.

It is also contemplated that a third tab might be added at the front 714 of the module 700 to interact with the tab 612 of the tray 600 to keep the module 700 in a pivoted, but, elevated position, rather than having a technician having to keep the module 700 raised with his or her hands.

Also, in certain other implementations, the pivot hinge 706 of the module 700 can have an axis that is parallel to the front or the back of the tray 600 so that slidable movement of the drawer that supports the tray 600 can be used as a fail-safe mechanism to ensure that a module or cassette is always in the pivoted-down, locked position when the drawer starts to slide. For example, a top cover of a panel can contact the module 700 and automatically pivot the module 700 down if the hinge was, for example, located at the rear wall of the tray 600 rather than at one of the sides. This could prevent pinching of any cables.

Figure 20:
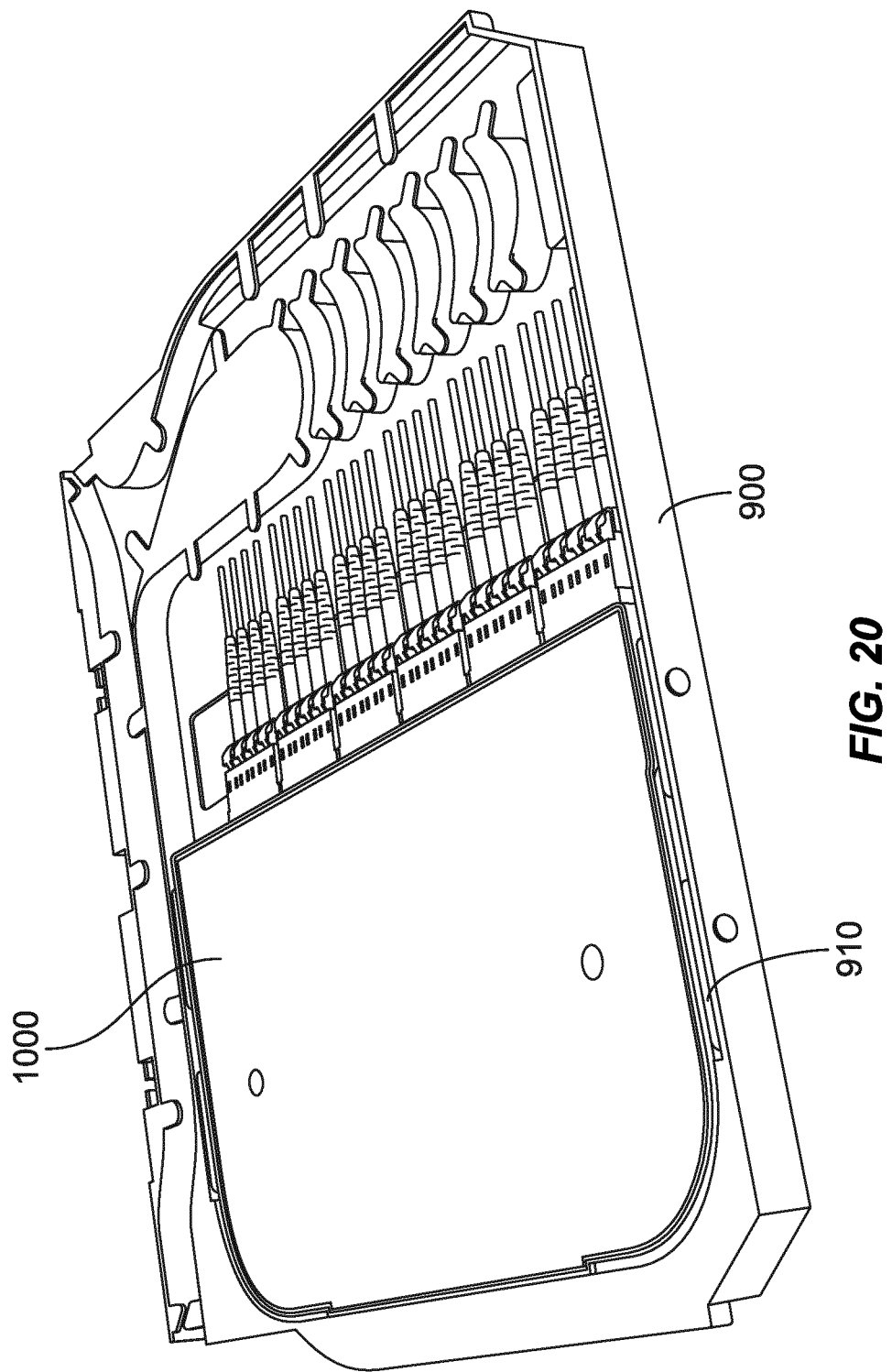
FIG. 20 is an alternative embodiment of a telecommunications module and a telecommunications tray that cooperatively provide for a pivoting function of the module for cleaning access.
Figure 21:
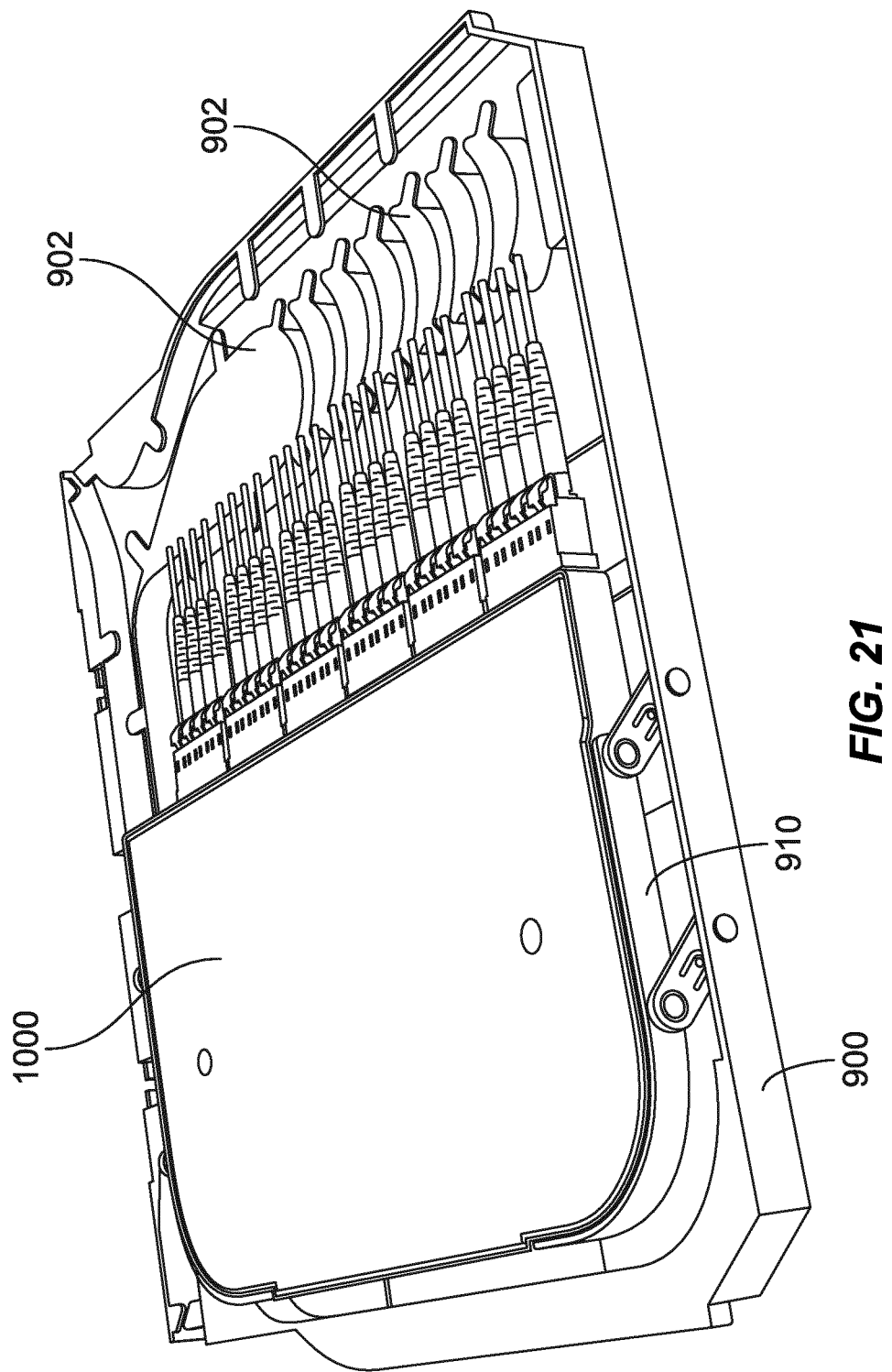
FIG. 21 illustrates the telecommunications module of FIG. 20 in a pivoted access position.
Figure 22:
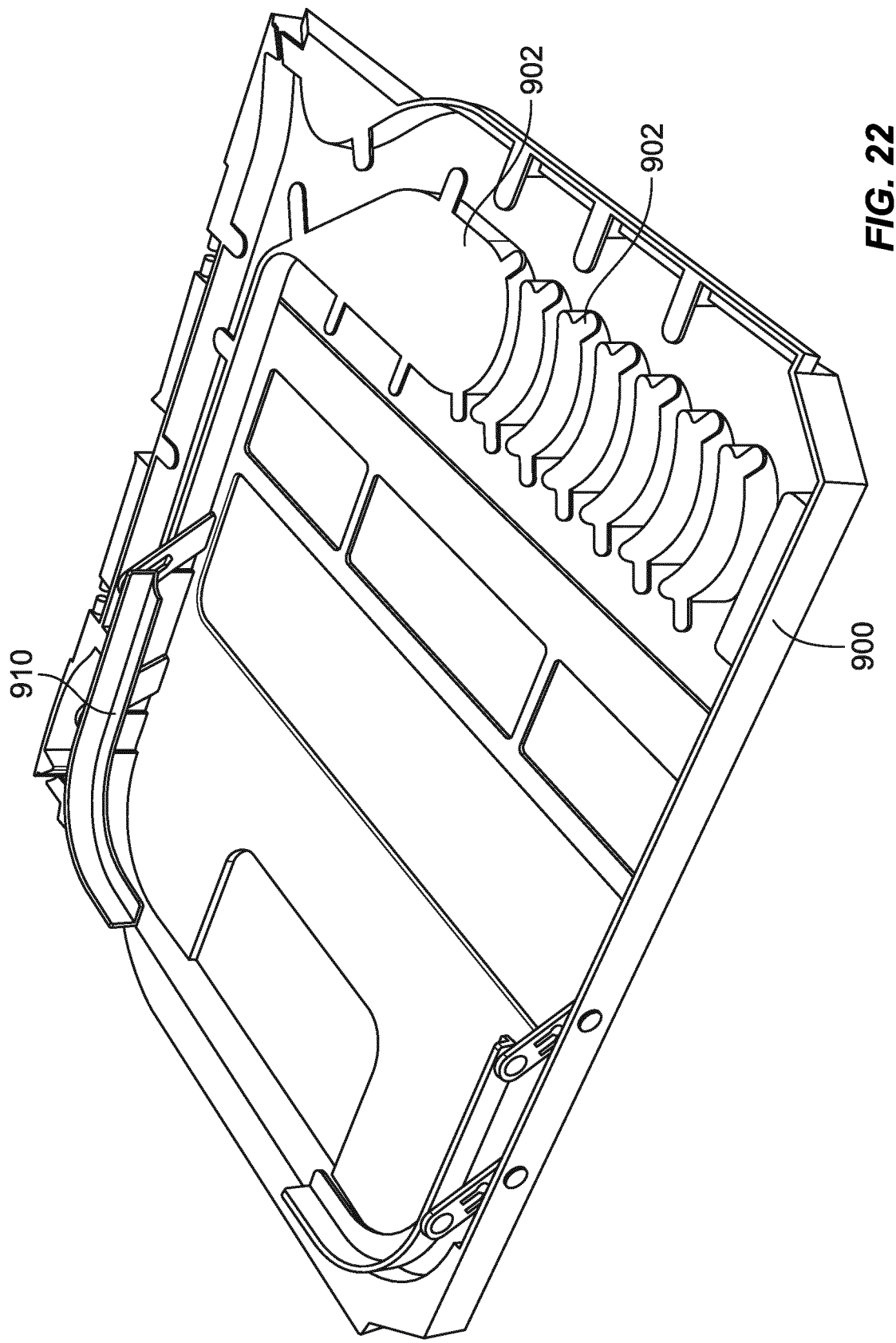
FIG. 22 illustrates the linkage system of the pivot tray of FIG. 20 in isolation without the telecommunications module mounted thereon.

Another concept that allows for cleaning access to the telecommunications module or cassette is illustrated in FIGS. 20-22. Instead of a pivot motion provided by one end of the tray, an example tray 900 may include a linkage system 910 that is used to both lift a module 1000 and move the module 1000 forward. This results in less pull or stress on the cabling extending from the module 1000 since the overall movement of the module 1000 results in a direction toward radius limiters 902 of the tray 900. In the version illustrated in FIGS. 20-22, the linkage system 910 is provided on the tray 900 and the module 1000 is removably mounted to the linkage system 910 in a nested orientation. The linkage system 910 is designed to support the module or cassette during the movement.

FIGS. 23-27 illustrate a variation on the concept shown in FIGS. 20-22 where an entire linkage mechanism 1110 is positioned on or integrated within a module or cassette 1100 instead of a tray 1200 itself. As shown in the version of FIGS. 23-27, both pivot linkages 1112 and a horizontal linkage 1114 are provided on the cassette 1100. The horizontal linkage 1114 defines flexible cantilever tabs 1116 that can be snap-fit within notches 1202 provided on the tray 1200. While the horizontal linkage 1114 stays locked with respect to the tray 1200, the pivot linkages 1112 once again allow the cassette 1100 to be moved both upward and forward, similar to the embodiment discussed with respect to FIGS. 20-22.

Figure 23:
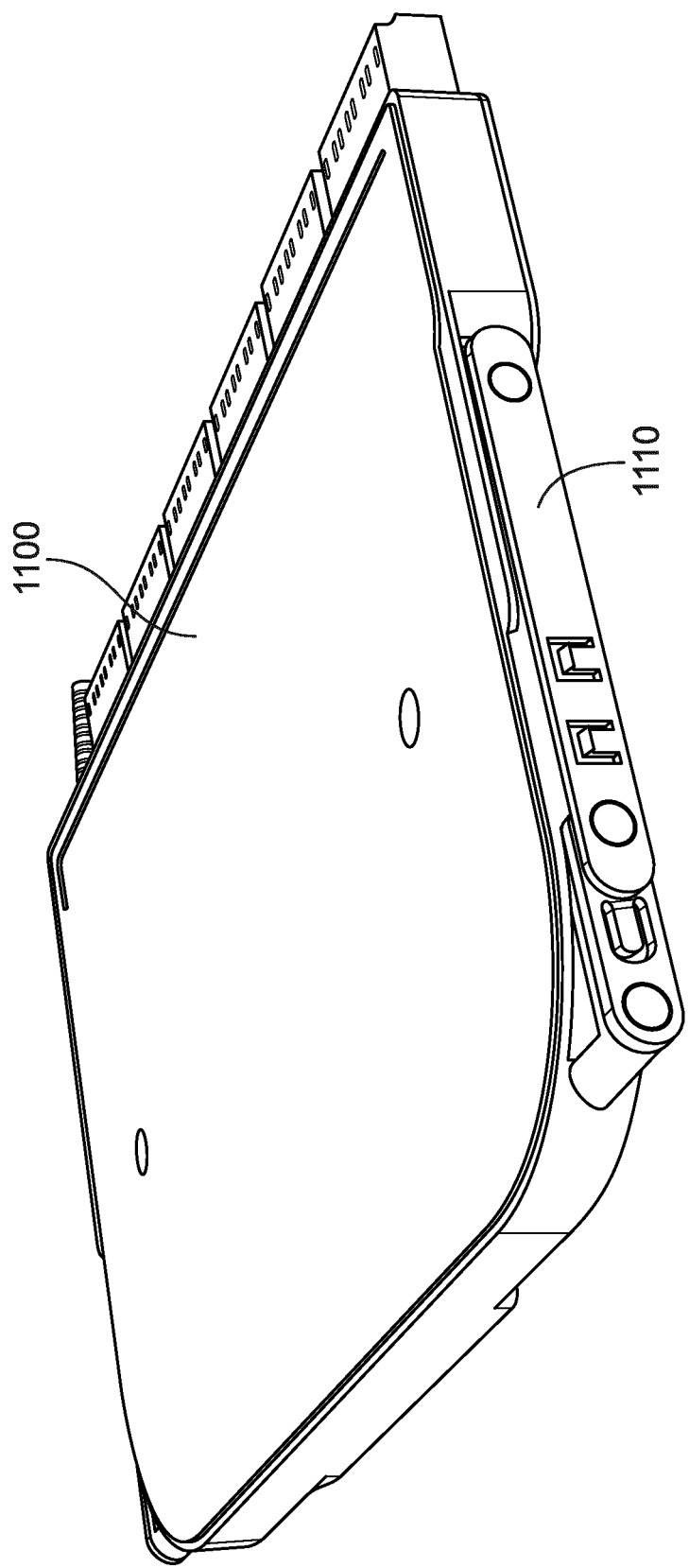
FIG. 23 illustrates an alternative embodiment of a linkage system provided on a telecommunications cassette that provides for a pivoting function for cleaning access.
Figure 24:
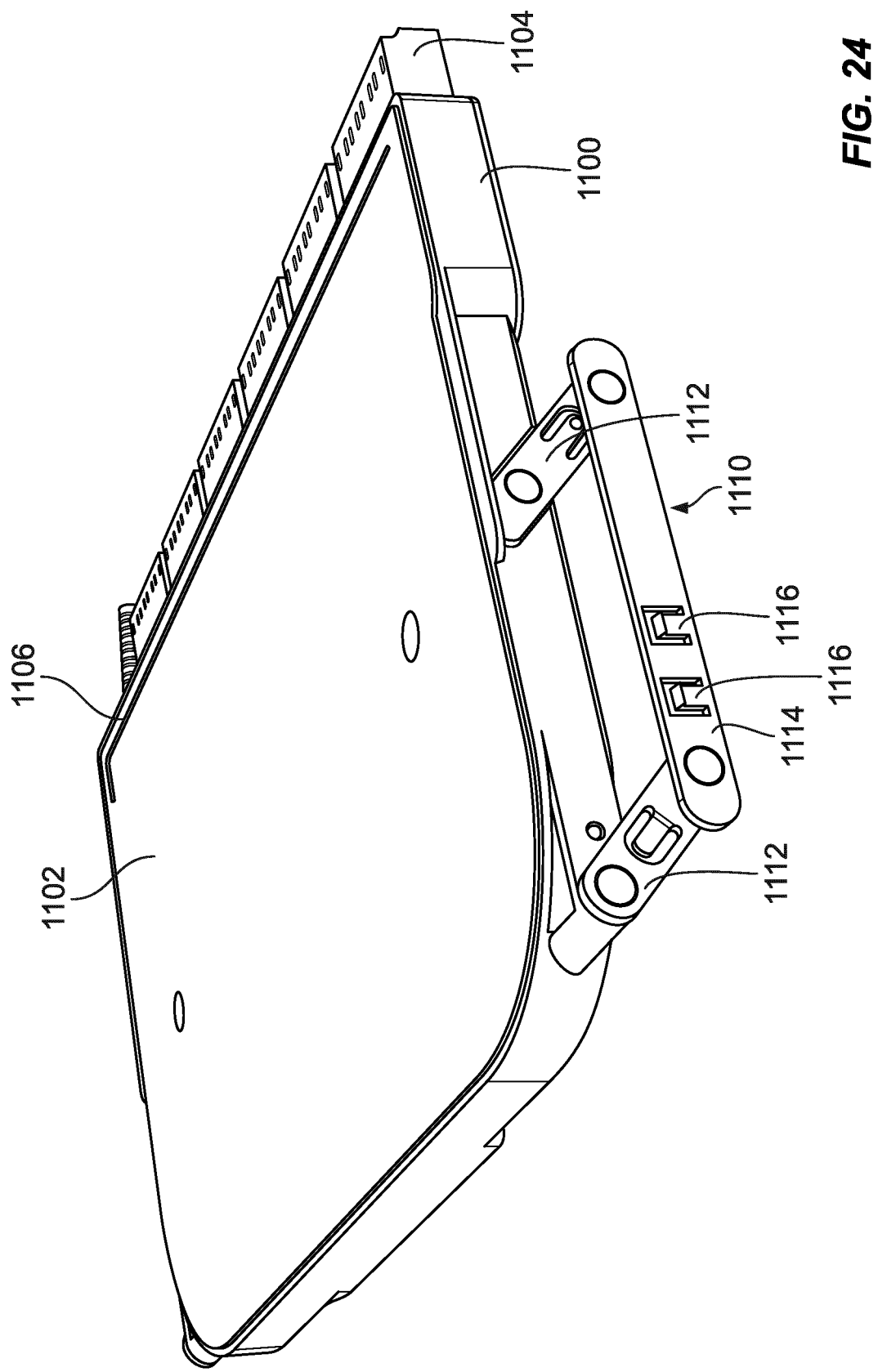
FIG. 24 illustrates the telecommunications cassette of FIG. 23 with the linkage system shown in a pivoted access position.
Figure 25:
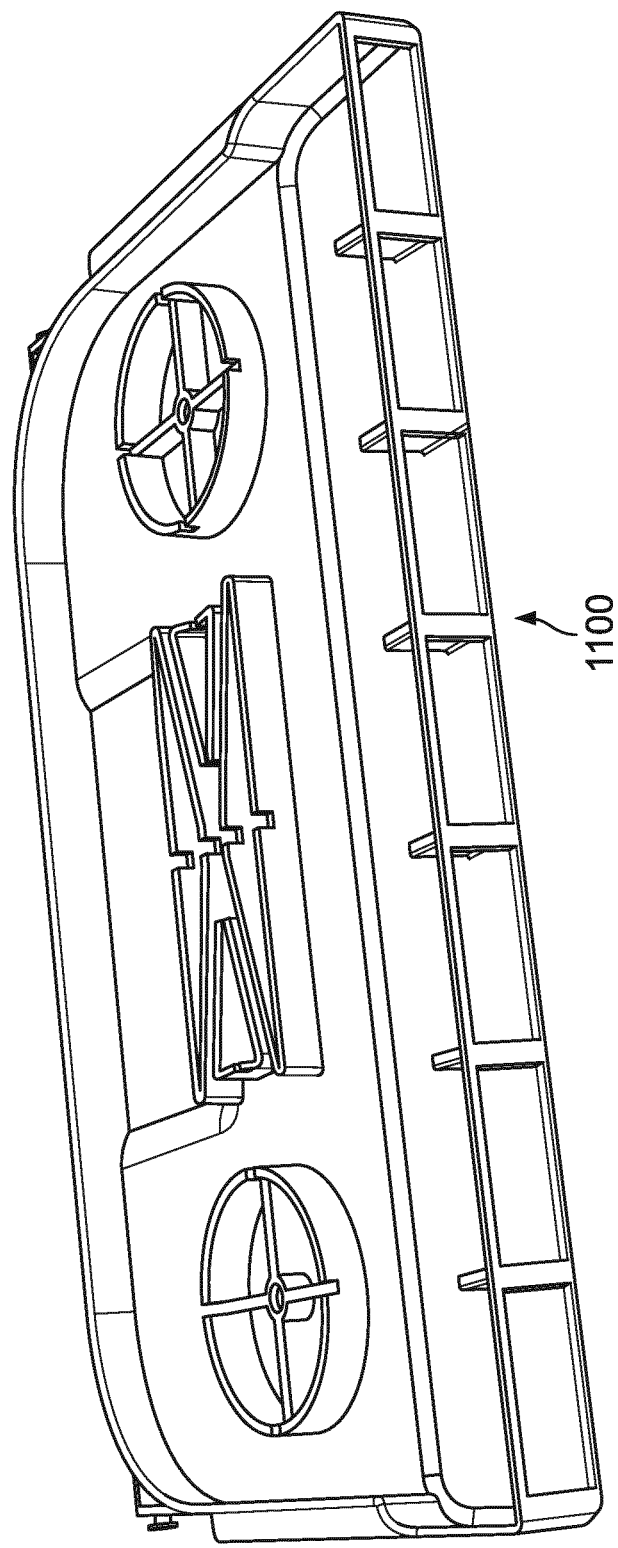
FIG. 25 is a front perspective view of the telecommunications cassette of FIGS. 23-24 with the cover, the adapters, and the cable termination block removed to illustrate the internal features thereof, the cassette also shown without the linkage system.
Figure 26:
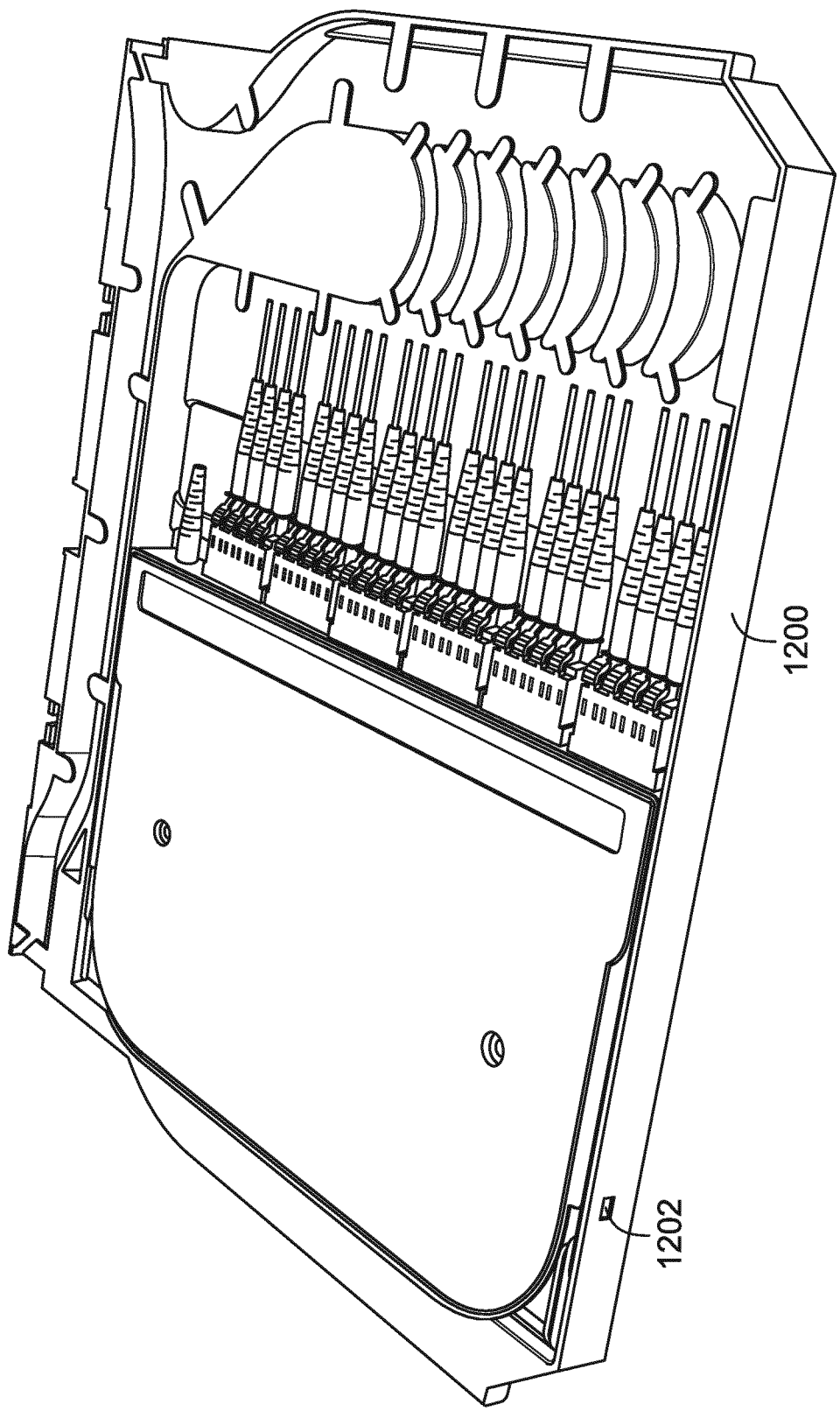
FIG. 26 illustrates the telecommunications cassette of FIGS. 23-24 mounted within a telecommunications tray in a fully seated position.
Figure 27:
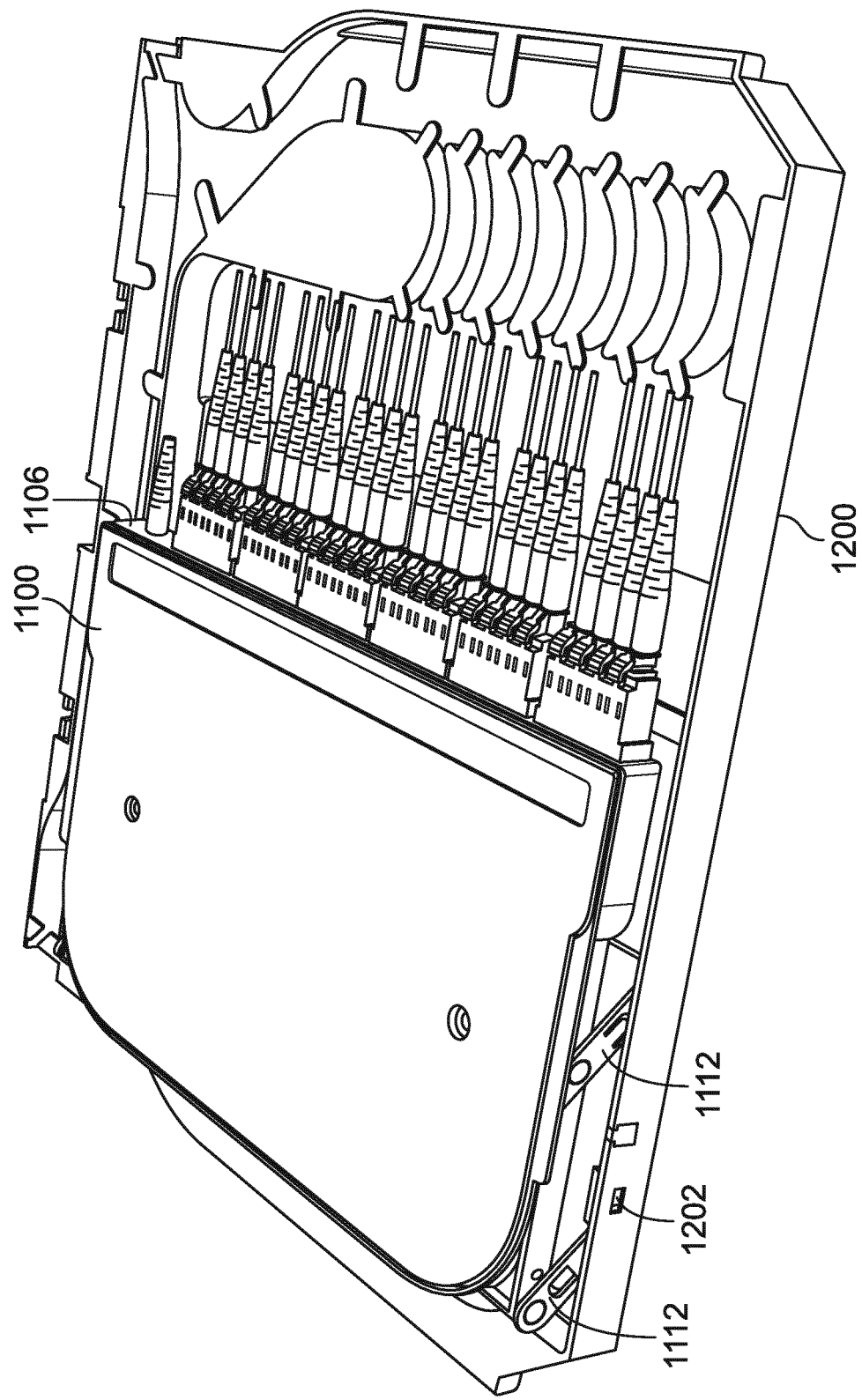
FIG. 27 illustrates the telecommunications cassette of FIG. 25 in a pivoted access position within the tray.
Figure 28:
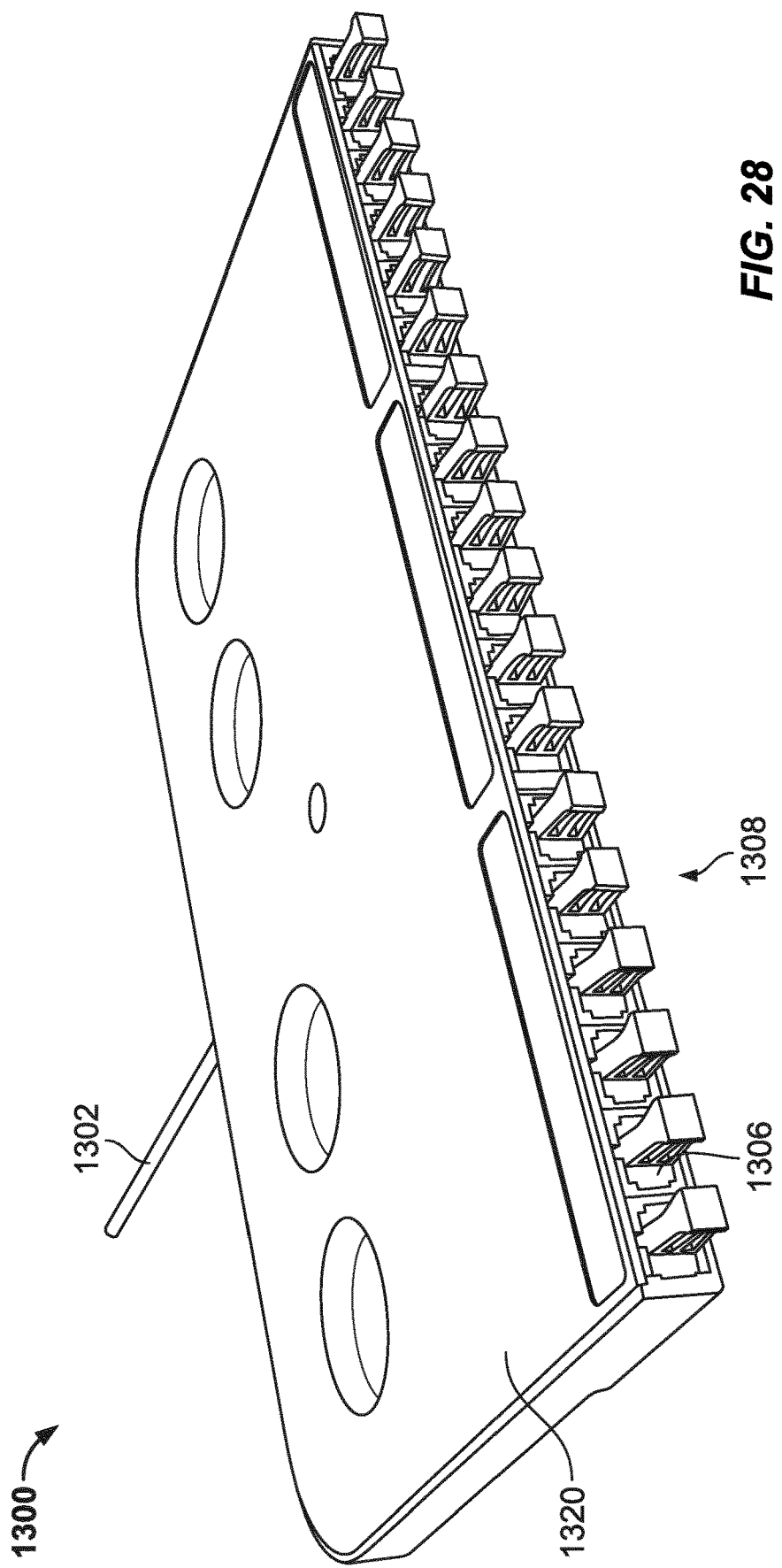
FIG. 28 is another embodiment of a pre-cabled telecommunications cassette that can be mounted within a pivot tray such as that shown in FIG. 1.
Figure 30:
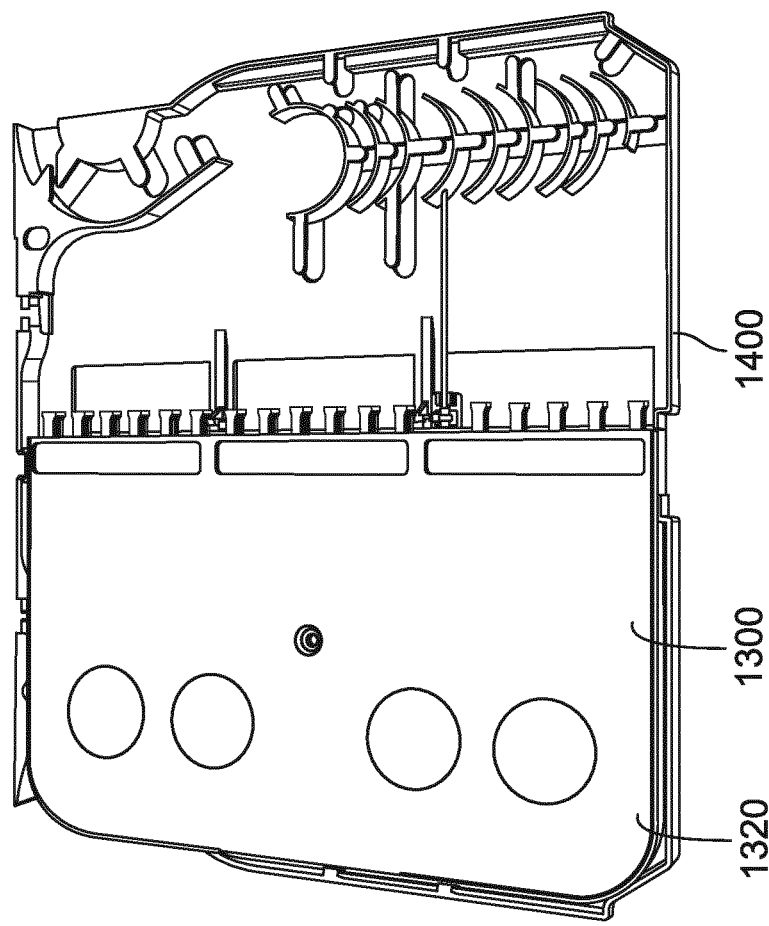
FIG. 30 illustrates the telecommunications cassette of FIGS. 28-29 mounted within a telecommunications tray having features similar to those of the tray of FIG. 1.
Figure 29:
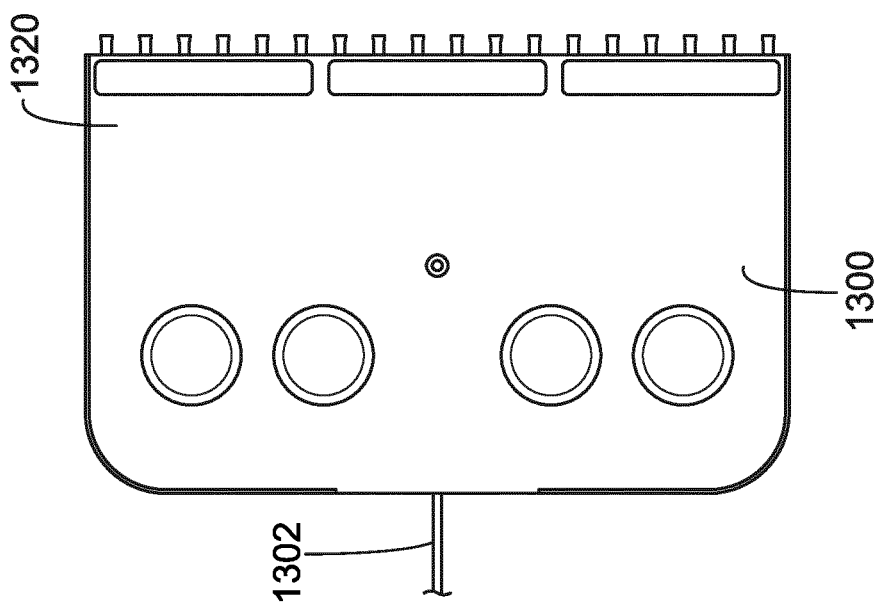
FIG. 29 is a top view of the telecommunications cassette of FIG. 28.

FIG. 25 is a front perspective view of the telecommunications cassette 1100 shown in FIGS. 23-24 with its cover 1102, adapters 1104, and cable termination block 1106 removed to illustrate the internal features thereof. The cassette 1100 is also shown without its linkage system 1110.

Now referring to FIGS. 28-45, another version of a cassette 1300 is illustrated. The illustrated cassette 1300 can be used within the pivot trays and can allow for certain functionality such as access, repair, and adapter bypass, as will be discussed in further detail below.

The cassette 1300 of FIGS. 28-45 is shown as being a pre-cabled cassette that has an incoming OSP cable 1302 at a rear 1304 of the cassette 1300 and plurality of adapters 1306 positioned at a front 1308 of the cassette 1300 for distribution.

The fiber optic cassette 1300 includes a body 1310 defining an open front 1312, a rear wall 1314, a pair of sidewalls 1316 (i.e., right and left sidewalls), a bottom wall 1318, and a top in the form of a removable cover 1320 (shown in FIGS. 28-30), all defining an interior 1322 of the cassette 1300.

As noted, a cable entry location 1324 is illustrated as being at the rear wall 1314.

At the front 1312 of the cassette body 1310, as shown, individual adapters 1306 are configured to be snap-fit to the cassette 1300 in a side-by-side configuration, closing off the front 1312 of the cassette 1300.

Figure 42:
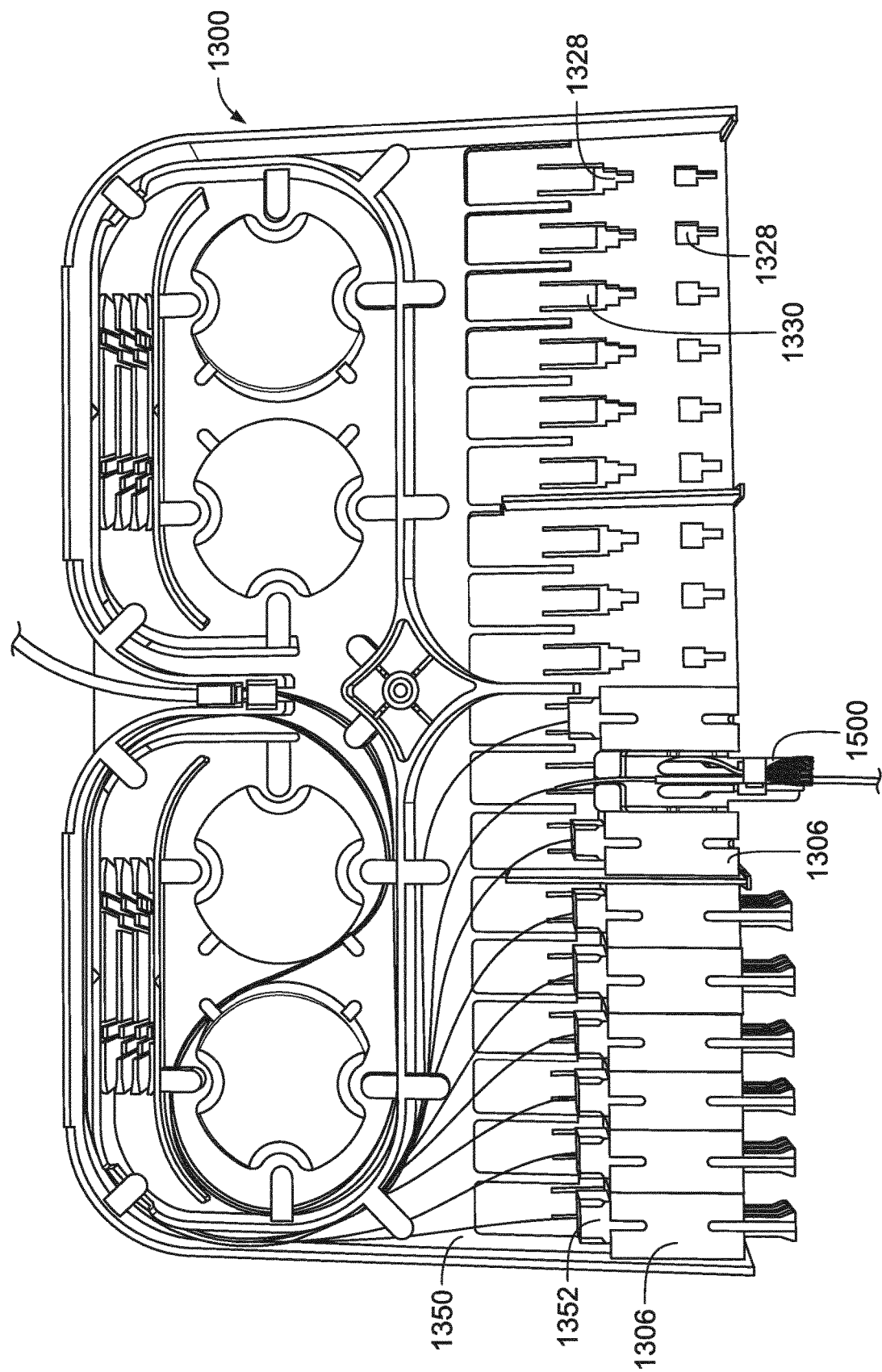
FIGS. 42-45 illustrate different views of an example cable routing configuration used within the cassette of FIGS. 31-34, where the cassette also includes a CTU being used as an adapter bypass for a hard connection.
Figure 43:
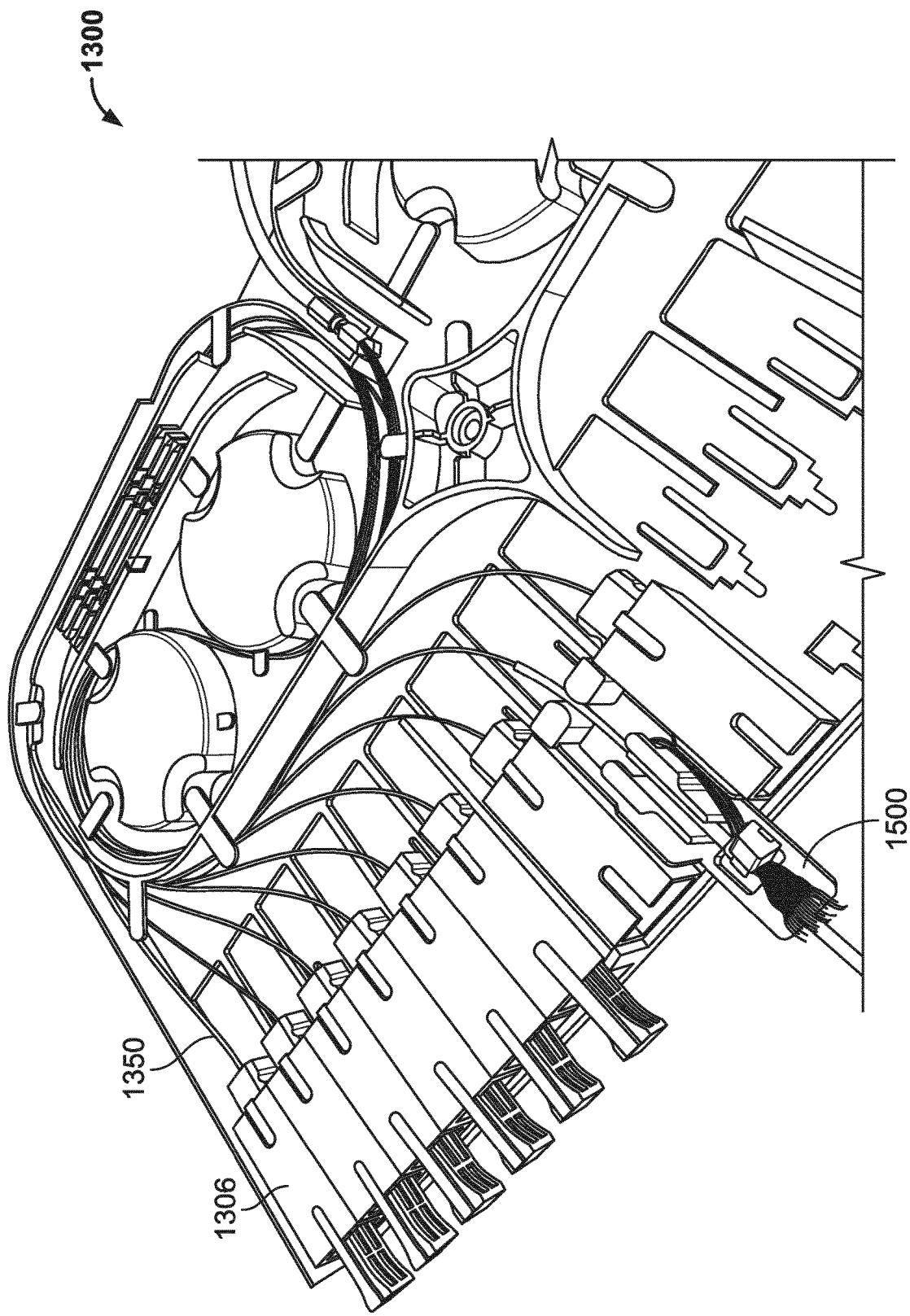
Figure 44:
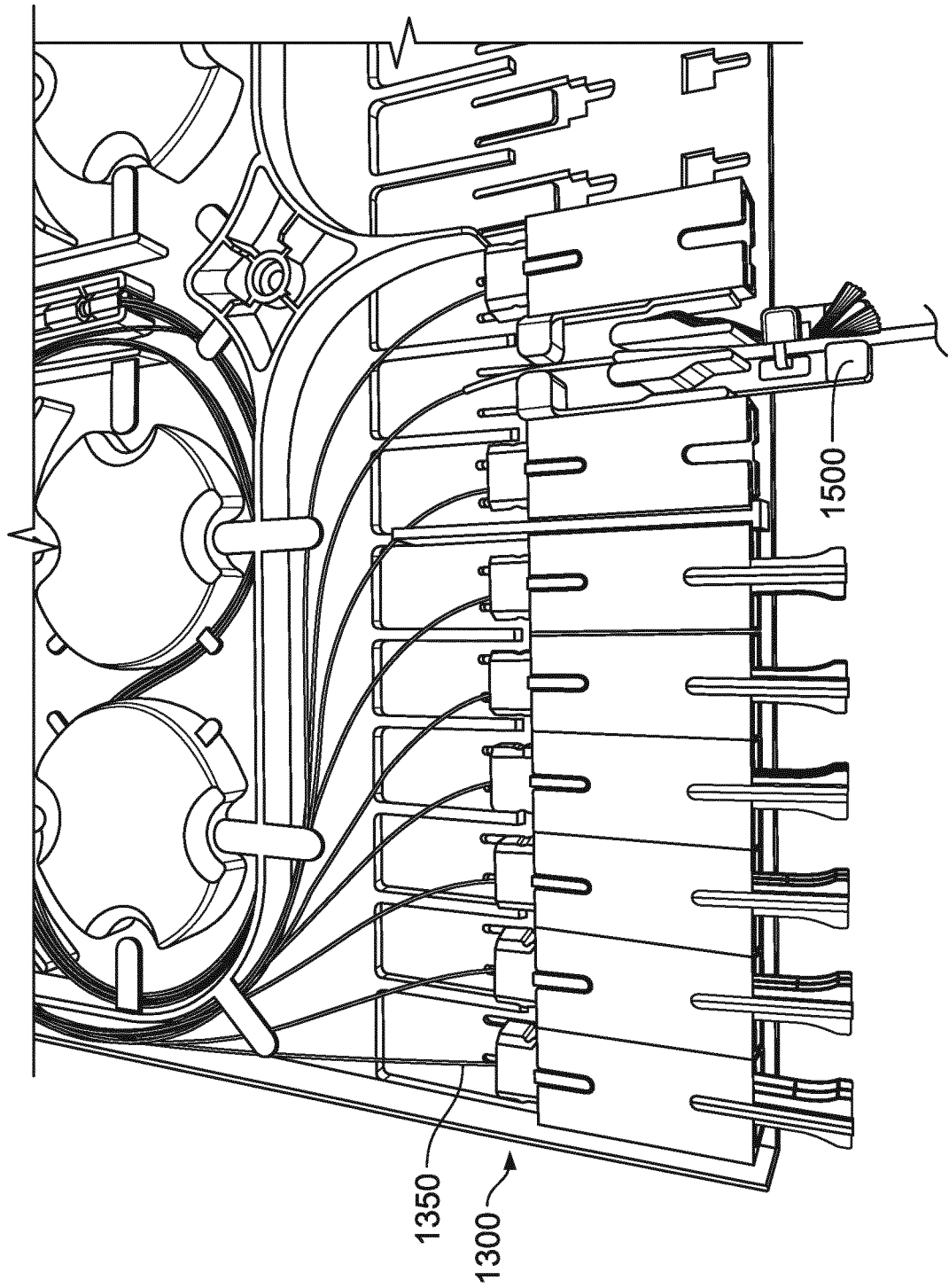
Figure 45:
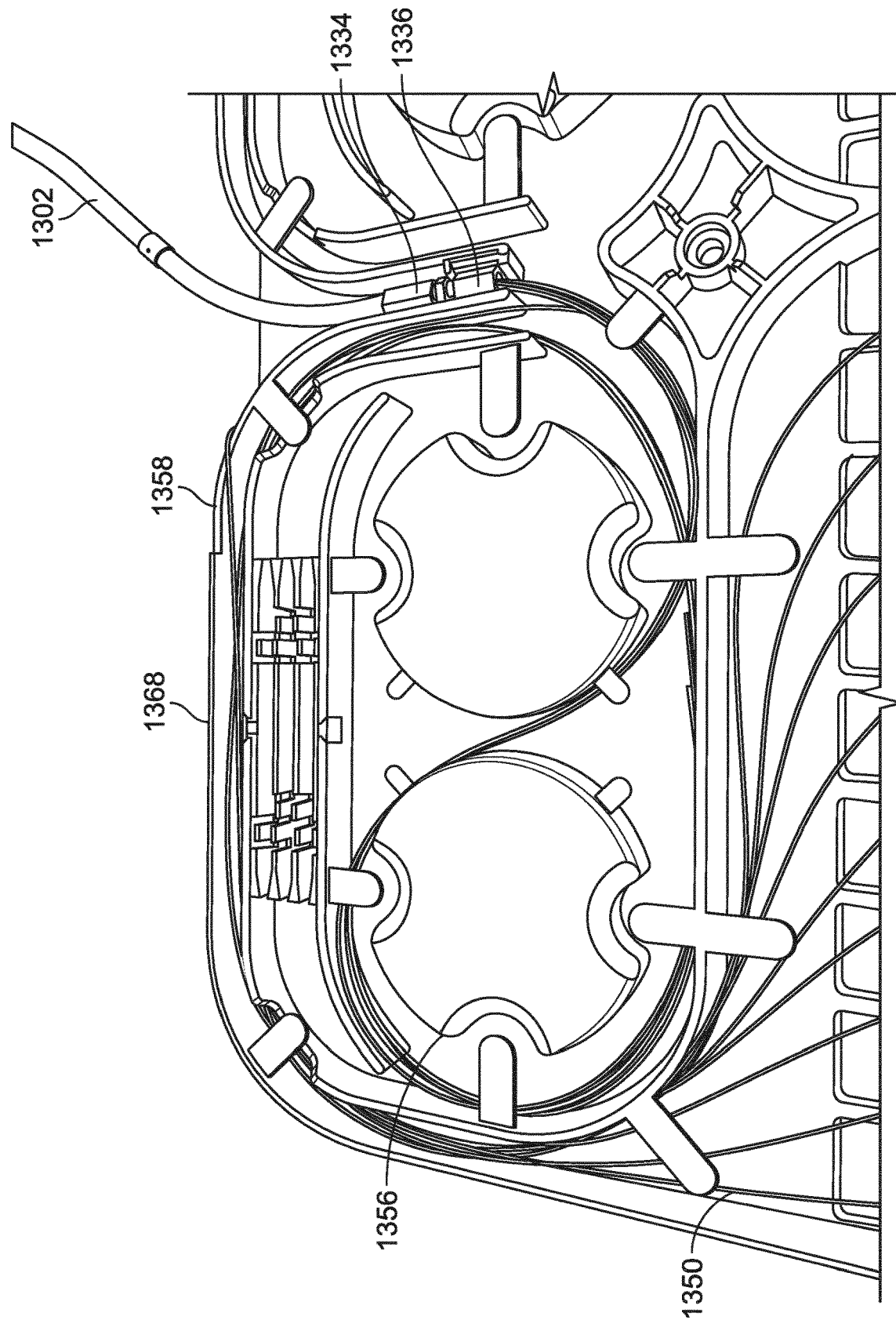
Figure 46:
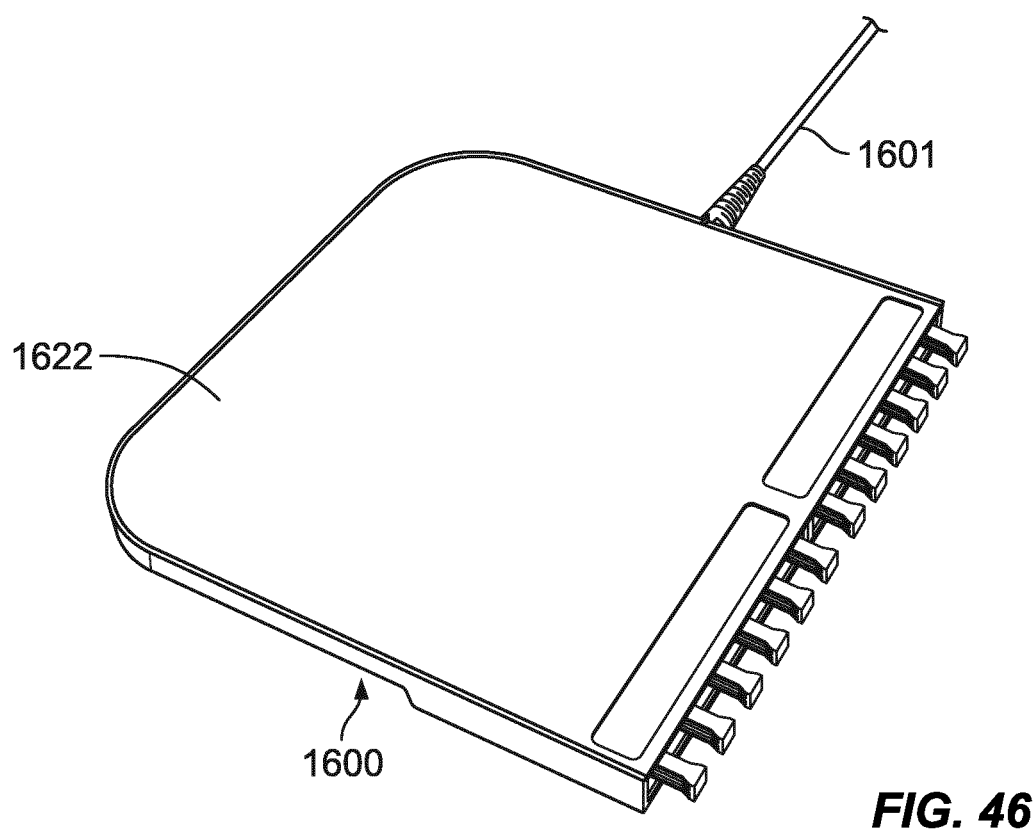
FIG. 46 is another alternative embodiment of a pre-cabled telecommunications cassette that can be mounted within a pivot tray such as that shown in FIG. 1.

The fiber optic adapters 1306 (e.g., SC format in the illustrated example) define dovetail structures 1326 that are received by retainer slots 1328 defined by the bottom wall 1318 of the cassette 1300. As shown in FIGS. 42-44, the retainer 1328 slots may be closed at one end by a flexible cantilever tab 1330 that acts as a slide stop or lock for the dovetail structures 1326. The flexible cantilever tab 1330 has to be elastically flexed down when inserting or removing the dovetail structures 1326 of the adapters 1306.

Other format types for the adapters are certainly possible as noted and illustrated for the above examples. In the illustrated example, the provided SC fiber optic adapters 1306 include completely flat sidewalls 1332 to minimize their width for allowing maximum density within a given footprint for that given format adapter.

The adapters 1306 provide connection locations for the cassette 1300 in receiving exterior fiber optic connectors for optically continuing the signals input into the cassette 1300 from the cabling 1302 entering at the rear 1304 of the cassette 1300.

In general, the top defined by the cover 1320 (shown in FIGS. 28-30) and the bottom wall 1318 of the cassette 1300 are generally parallel to each other and define the major surfaces of cassette body 1310. Sidewalls 1316, the front 1312, and the rear wall 1314 define the minor sides of cassette body 1310. The cassette 1300 can be oriented in the position shown in FIG. 30 within an example pivot tray 1400. As noted above, other orientations are also possible and will be discussed in further detail below. The cover 1320 may be configured to be snap-fit to the cassette body 1310 or may be mounted with fasteners.

As noted previously, in the fiber optic cassette 1300 of FIGS. 28-45, fiber optic signals are input into the cassette 1300 via the fiber optic cable 1302 at the cable entry location 1324. The cable 1302 entering the cassette 1300 is coupled to the cassette 1300 at the cable entry location 1324 with a crimp tube 1334 and a crimp ring 1336 (e.g., hex shaped) which crimps a jacket 1338 and the strength member of the cable 1302 to the crimp tube 1334.

A pocket 1340 is defined at the cable entry location 1324. The pocket 1340 is designed to capture the crimp tube 1334 for retention within the cassette body 1310. The pocket 1340 also defines a portion 1342 shaped to receive the hex shaped ring 1336 to fix the cable 1302 with respect to the cassette body 1310. The cover 1320 is configured to capture the cable 1302 once it is received within the pocket 1340.

As shown, the pocket 1340 is provided in an inset portion 1344 defined at the center of right and left portions 1346, 1348 of the rear wall 1314 of the cassette body 1310. The portions 1346, 1348 of the rear wall 1314 surrounding the pocket 1340 provide gradual curves as the portions 1346, 1348 extend from the pocket 1340 to left and right of the rear wall 1314. Thus, when the cable 1302 placed in the pocket 1340 is bent in either direction toward the right side or the left side of the cassette 1300, bend radius protection is provided with the curved portions of the rear wall 1314. This provides a built-in bend radius protection structure that may eliminate the need for a separate boot for the cable 1302.

As will be discussed in further detail, in the interior 1322, fibers 1350 that are broken out from cable 1302 may be connectorized (e.g., with connectors 1352 defining an SC format in the given example) and led toward the front 1312 of the cassette 1300 for coupling to rears of the adapters 1306 defined at the front 1312 of the cassette 1300, wherein they can mate with exterior connectors coupled at the fronts of the adapters 1306.

The interior connectors 1352 that have been terminated to the fibers 1350 extending from the input cable 1302 is illustrated in FIGS. 31-34 where the cassette 1300 is shown without its cover 1320. According to the depicted embodiment, the interior connector 1352 is a connector that may be terminated to a 250 micron fiber extending into the cassette 1300 without a strain relief boot attached at the back of the connector 1352. If enough room is provided within the cassette 1300, internal connectors may also be standard connectors that include strain relief boots.

As shown, the interior 1322 of the cassette body 1310 of the cassette 1300 of FIGS. 28-45 generally defines two distinct overlength chambers 1354, each one including two side-by-side radius limiters 1356, 1358 (e.g., in the form of spools) with cable retention fingers 1359 extending therefrom. As will be discussed, various fiber routing configurations are possible around the radius limiters 1356, 1358 toward the front adapters 1306, as the optical fibers 1350 are led from the input cable 1302 at the back.

In the version of the cassette 1300 shown in FIGS. 28-45, each interior chamber 1354 defines a first bulkhead 1360 (e.g., an outer bulkhead). Each first bulkhead 1360 defines curved surfaces that cooperate with the curved portions of the rear wall 1314 on both sides of the cassette 1300 to define fiber routing pathways for the fibers 1350 broken out from the cable 1302. At the front, the first bulkhead 1360 defines curved surfaces that cooperate with the curved surfaces of the radius limiters 1356, 1358 to define fiber routing pathways. The first bulkhead 1360 also serves to separate the two chambers 1354 at the back of the cassette 1300 from the front adapters 1306. A pathway 1362 is defined from the chambers 1354 toward the front between a side portion 1364 of the first bulkhead 1360 and each sidewall 1316 of the cassette body 1310. The first bulkheads 1360 may also include cable retention fingers 1359 for retaining the fibers 1350.

A second bulkhead 1366 (e.g., an inner bulkhead) extends right to left in each chamber 1354 with curved portions at the ends. The second bulkhead 1366 also cooperates with the spools 1356, 1358 in each chamber 1354 for defining fiber pathways for routing of the fibers 1350. The second bulkhead 1366 also includes cable retention fingers 1359 that face forwardly for retaining fibers 1350 around the spools 1356, 1358.

Figure 31:
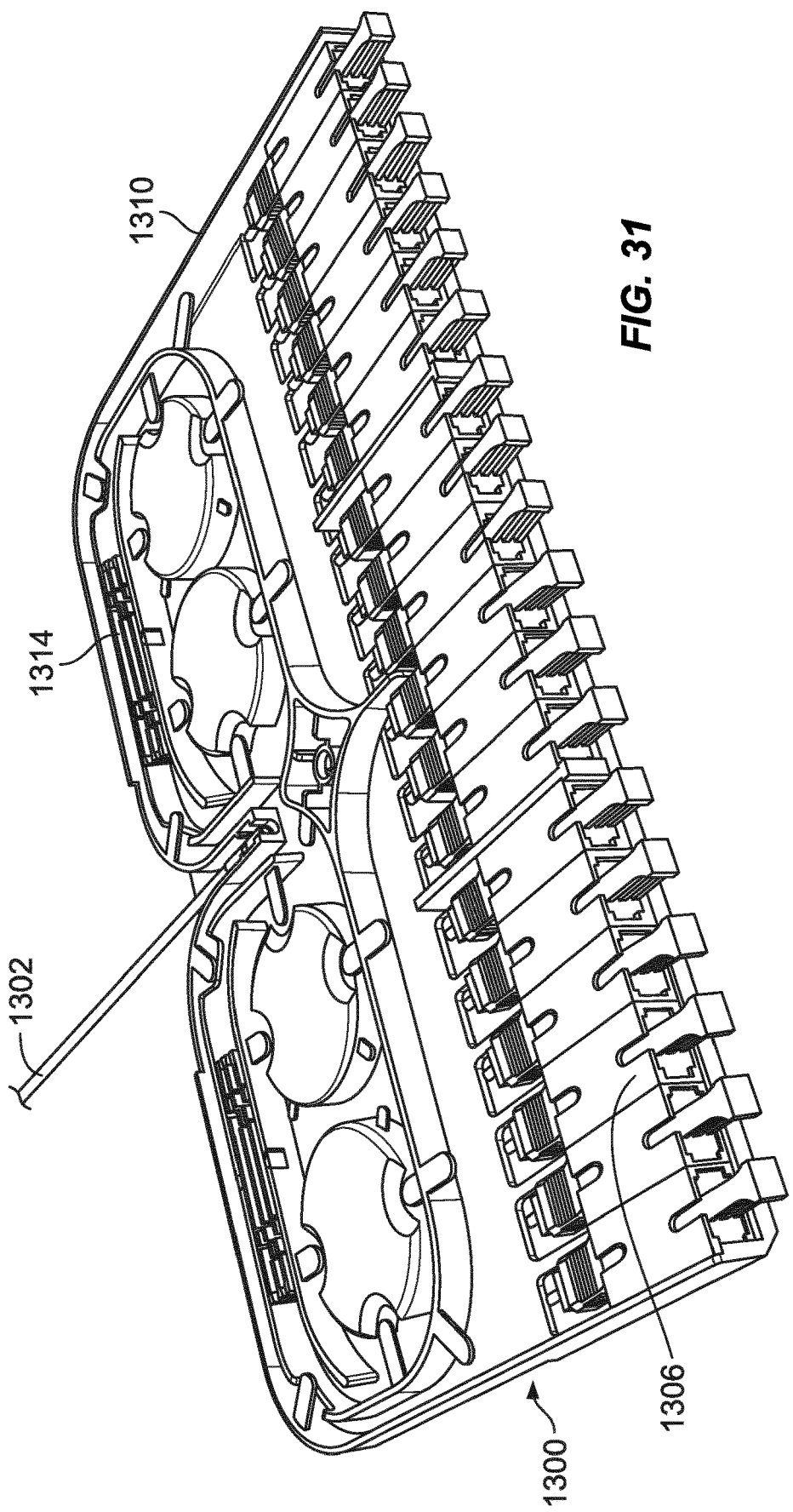
FIG. 31 is a perspective view of the telecommunications cassette of FIGS. 28-30 with a cover thereof removed to show the internal features thereof.
Figure 32:
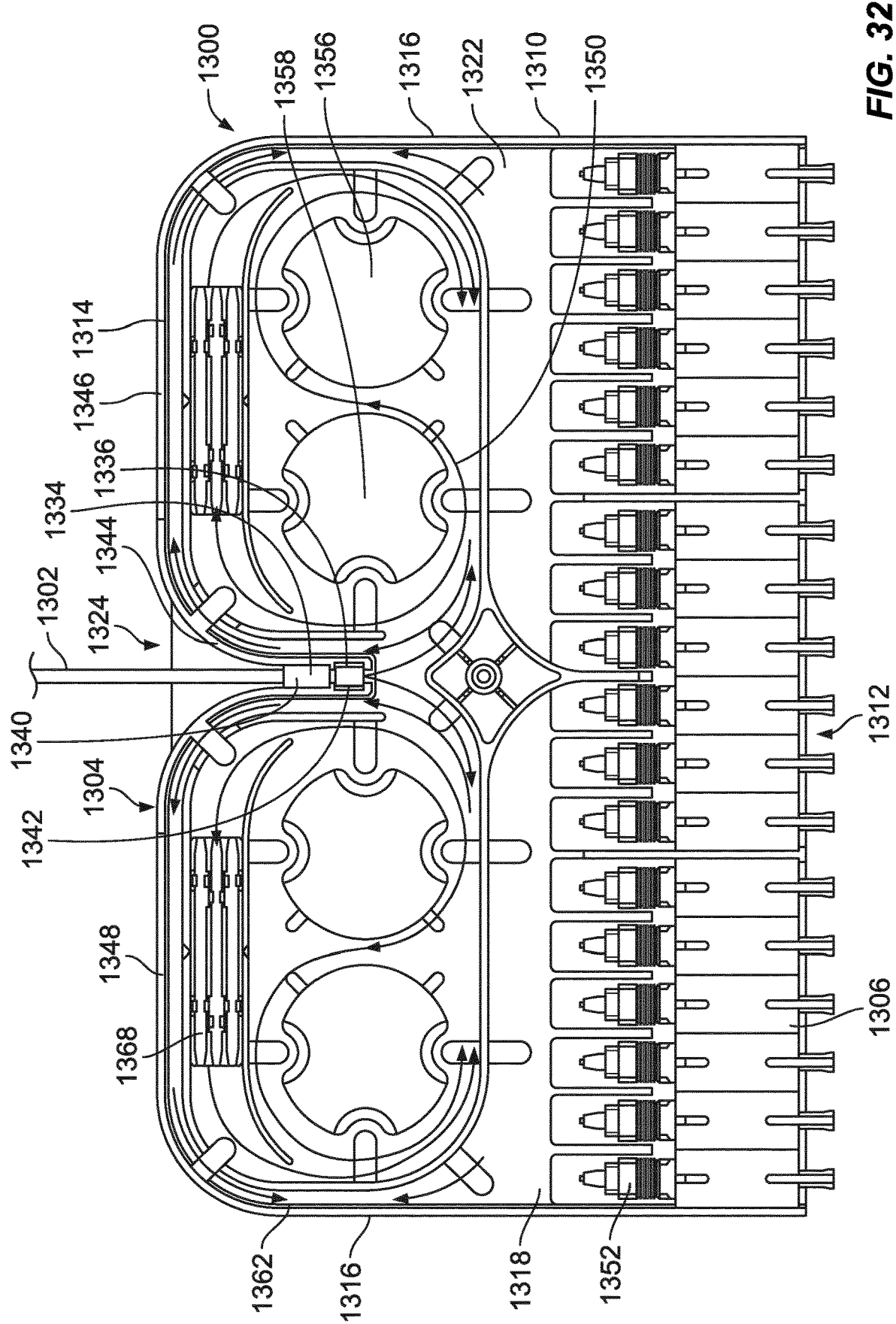
FIG. 32 is a top view of the telecommunications cassette of FIG. 31 illustrating example cable routing paths within the cassette.
Figure 33:
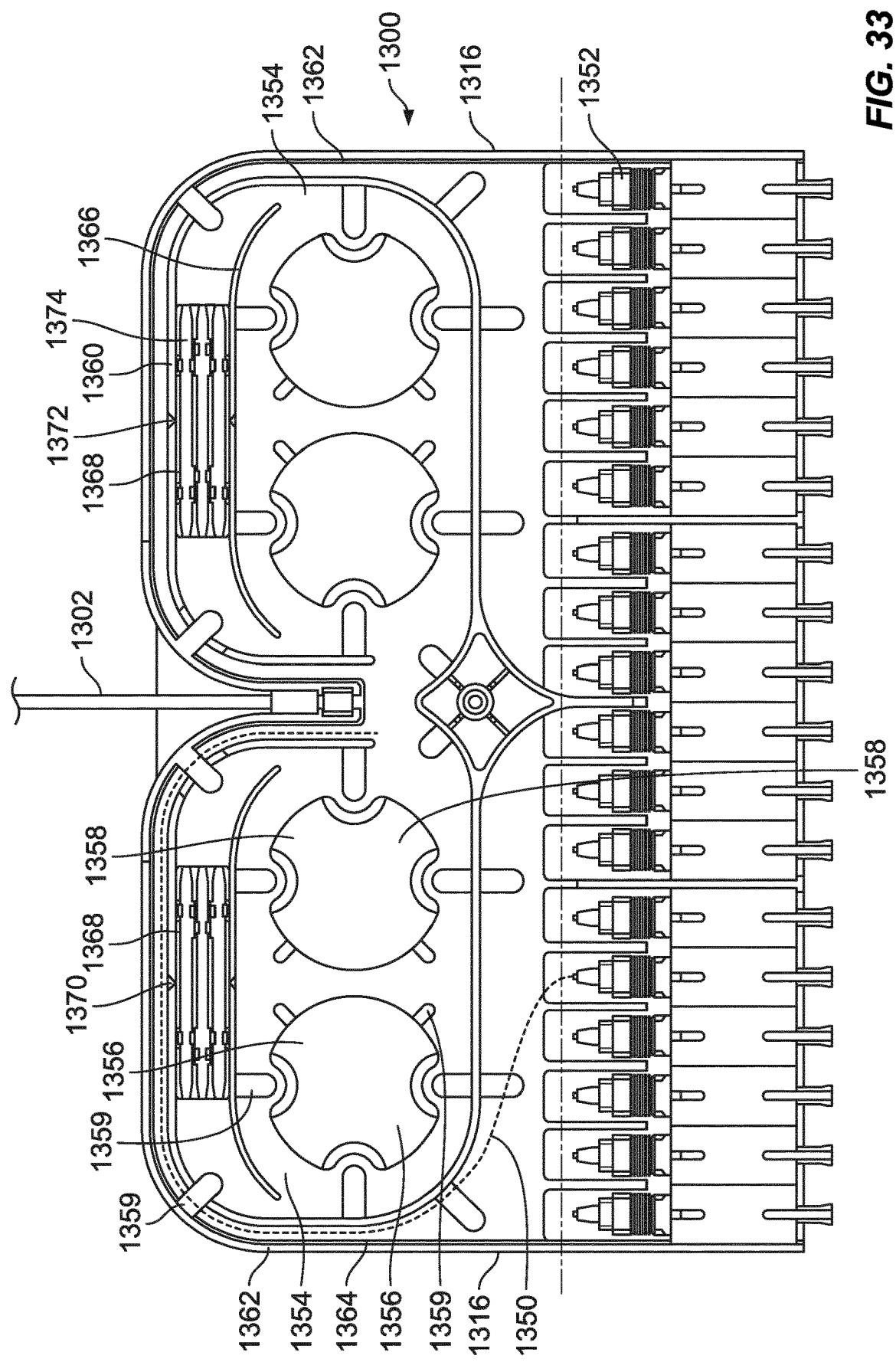
FIG. 33 is another top view of the telecommunications cassette of FIGS. 31-32 illustrating an example repair splice operation.
Figure 34:
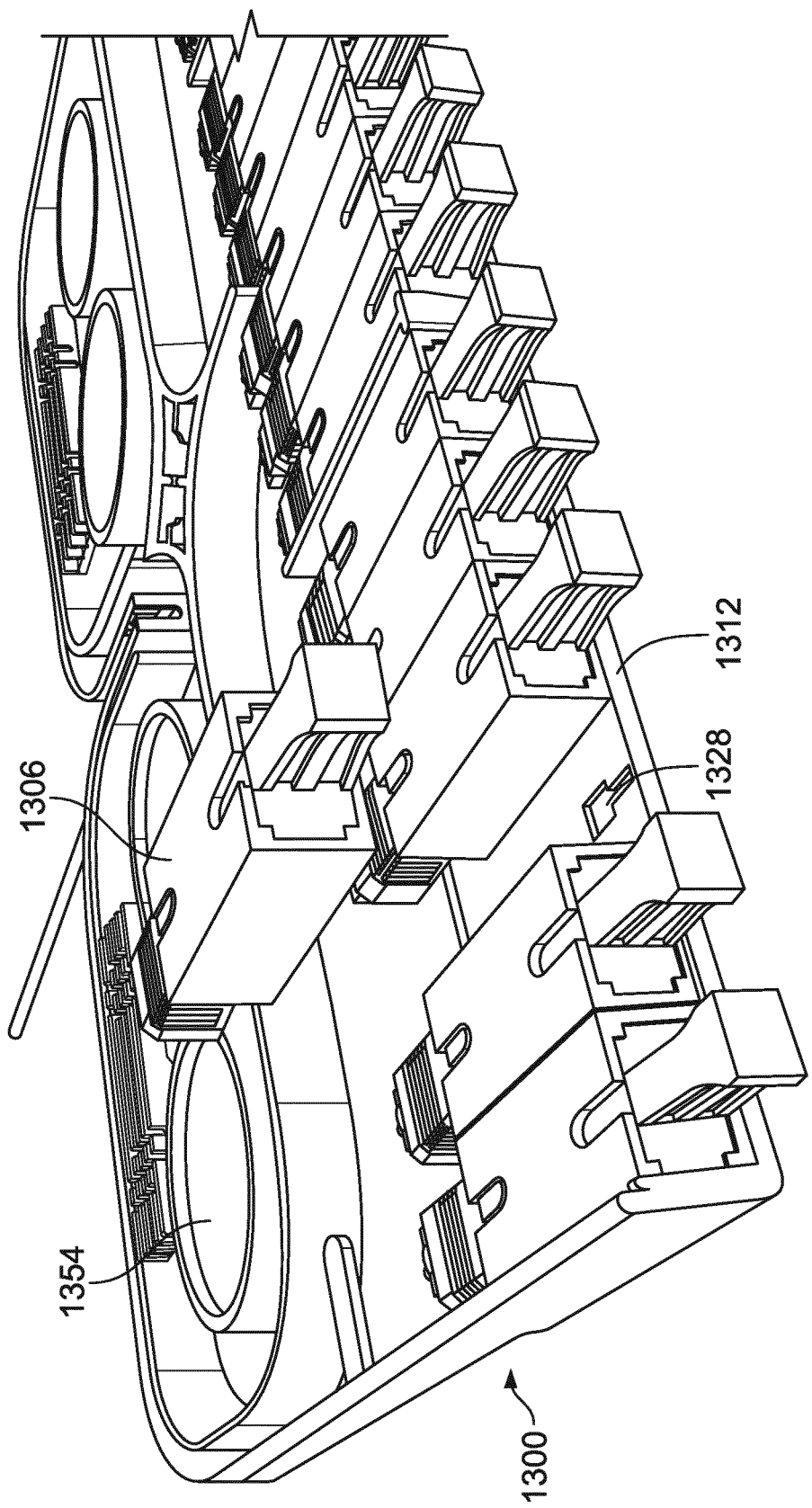
FIG. 34 is a front perspective view of the telecommunications cassette of FIGS. 31-33 with one of the adapters thereof shown in an exploded configuration.
Figure 36:
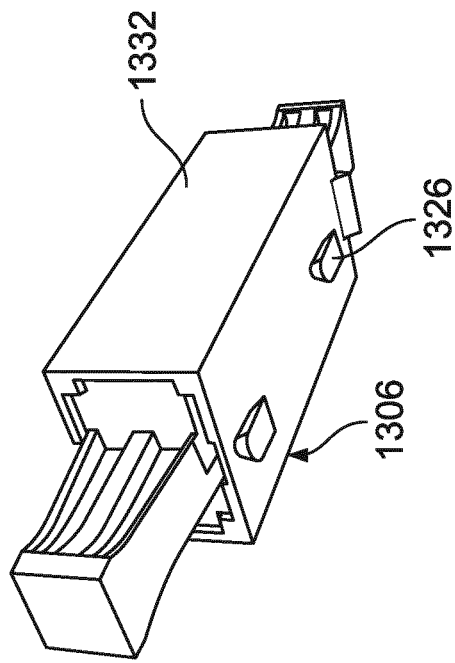
FIG. 36 is a bottom perspective view of the adapter of FIG. 35.
Figure 35:
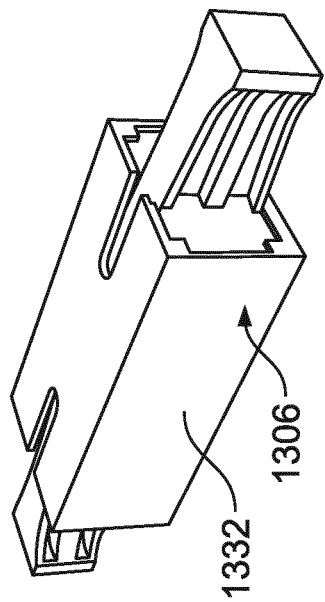
FIG. 35 is a top perspective view of one of the adapters of FIG. 34 shown in isolation.

As shown in FIGS. 31-33, each chamber 1354 within the cassette interior 1322 includes a splice support tray 1368 (i.e., splice protector) positioned between the rear portion of the first bulkhead 1360 and the second bulkhead 1366. The splice protector 1368 can be used for factory-splicing, re-splicing, or the repairing of any damaged fibers 1350 within the interior 1322 of the cassette 1300.

The splice protector 1368 may also be referred to as a repair splice protector since it may be used for the purpose of repair of fibers 1350. If one of the connectors 1352 terminating the fibers 1350 broken out from input cable 1302 is damaged and needs replacement, the cover 1320 of the cassette 1300 can simply be removed, the damaged connector 1352 removed from the rear end of the corresponding adapter 1306, and a new connector 1352 can be spliced to the corresponding fiber 1350. The splice support tray or protector 1368 is configured to support such repair splices.

In the embodiment depicted in FIGS. 31-33, each splice protector 1368 may be provided as a removable insert that is slidably mounted to the cassette body 1310. In the depicted embodiment, each splice protector 1368 defines dovetail shaped tabs 1370 that are slidably inserted into complementary notches 1372 defined on the first and second bulkhead structures 1360, 1366 when mounting the splice protector 1368 into the cassette 1300.

The splice protector 1368 may define a plurality of separate channels 1374 for holding repair splices. Depending on the needed application, the splice protector 1368 can have different numbers of channels 1374. The splice protector 1368 can frictionally hold the splices.

In the example embodiment illustrated in FIGS. 31-33, each splice protector 1368 may house six smouv 45 mm splices, where the splices may be vertically stacked in each splice protector 1368.

As discussed above, the fibers 1350 leading into the cassette body 1310 are provided with excess length between the cable crimp or entry location 1324 and the inner SC connectors 1352 coupled to the rears of the adapters 1306 for allowing reparability of the cassette 1300. The excess length of optical fibers 1350 is managed via the radius limiters 1356, 1358 within the cassette 1300, as will be discussed below.

An example routing is shown in FIGS. 32 and 42-45 for fibers 1350 that are led to the left chamber 1354 within the cassette 1300. A similar routing can be used for the right chamber 1354. From the cable entry location 1324, the fibers 1350 are led toward an internal wall defined by the first bulkhead 1360. The fibers 1350 are then directed back toward the rear of the cassette 1300 and around the outer spool 1356. Once the fibers 1350 are routed around the outer spool 1356, the fibers 1350 are led back toward the front and along the internal side of an internal wall defined by the first bulkhead 1360 toward the center of the cassette 1300. The fibers 1350 then lead back toward the rear of the cassette 1300 and around the pathway 1362 defined between the first bulkhead 1360 and the outer walls of the cassette 1300 (e.g., the rear wall 1314 and the sidewalls 1316) and finally toward the front of the cassette 1300 to the adapters 1306.

As shown in FIG. 32, the fibers 1350 that are routed within the right chamber 1354 are led to the group of adapters 1306 that are on the right side and the fibers 1350 that are routed within the left chamber 1354 are led to the group of adapters 1306 that are on the left side.

When a splice operation is needed, as shown in FIG. 33, the pathway 1362 is used for facilitating uncoiling the fiber 1350 to be spliced without interfering with the rest of the overlength chamber 1354.

When a splice needs to be performed in the left chamber 1354, a fiber 1350 to be repaired, instead of being led into the pathway 1362 from the outer and inner spools 1356, 1358 initially as illustrated in FIGS. 42-45, will be lead from the outer spool 1356, along the internal side of the internal wall of the first bulkhead 1360, around the inner spool 1358 to the right side of the splice protector 1368. After being spliced at the splice protector 1368, the spliced fiber 1350 will once again be routed toward the front of the cassette 1300, and along the internal side of the internal wall of the first bulkhead 1360, around both of the radius limiters 1356, 1358 and into the pathway 1362. A similar routing, but in the opposite direction, can be implemented for a fiber 1350 to be spliced in the right chamber 1354.

As noted above, the pathway 1362 defined between the first bulkhead 1360 and the outer walls of the cassette 1300 (e.g., the rear wall 1314 and the sidewalls 1316) allows for easy uncoiling when needed for a splice. As shown in FIG. 33, when a repair is needed, the fiber 1350 can simply be cut from the internal connector 1352 and the fiber 1350 that is positioned within the pathway 1362 can be unwrapped. The unwrapped portion that is within the pathway 1362 provides plenty of fiber length for re-splicing without having to uncoil fiber 1350 from the chambers 1354 that have the two radius limiters 1356, 1358.

Referring now to FIGS. 34-44, as noted above, the removability of the fiber optic adapters 1306 that are used in the front 1312 of the cassette 1300 allow a cable termination unit (i.e., CTU) 1500 to be provided in place of an adapter 1306. The snap-in CTU 1500 is illustrated in detail in FIGS. 37-39.

The CTU 1500 provides the advantage of being able to provide an adapter bypass for a hard splice depending upon the connectivity needs of a customer. For example, if a customer did not want to use an adapter 1306 for the connection between the OSP cable 1302 and the front side 1312 of the cassette 1300, the CTU 1500 can be used as an adapter bypass for a hard connection from the OSP cable 1302.

The CTU 1500 can also be used for repair purposes.

Figure 38:
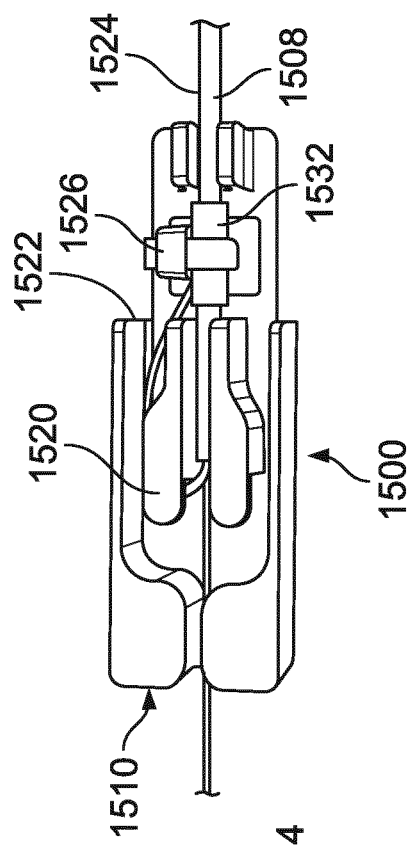
FIG. 38 illustrates the CTU of FIG. 37 being used to terminate a fiber optic cable.
Figure 37:
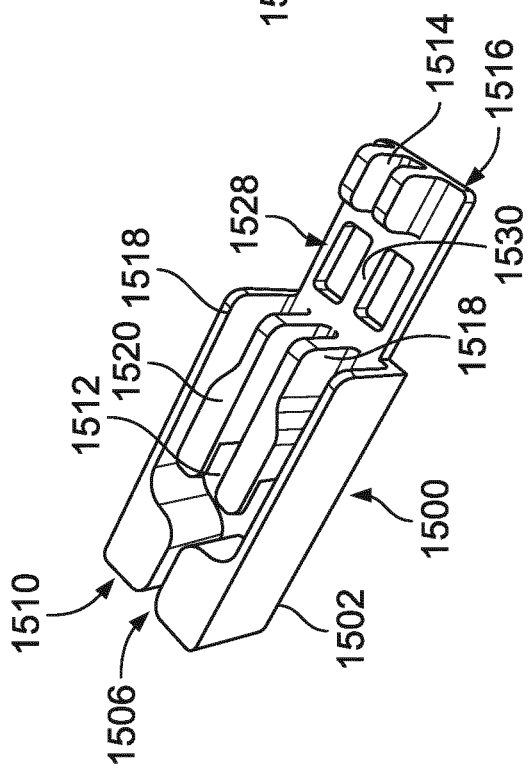
FIG. 37 is a perspective view of a snap-in cable termination unit (CTU) that can be used within the cassette of FIGS. 31-34.
Figure 39:
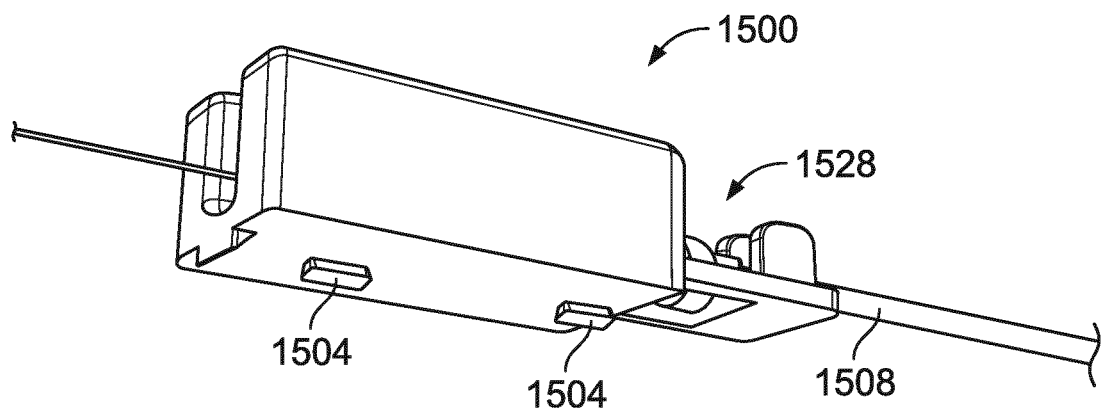
FIG. 39 is a bottom perspective view of the CTU of FIG. 38.
Figure 40:
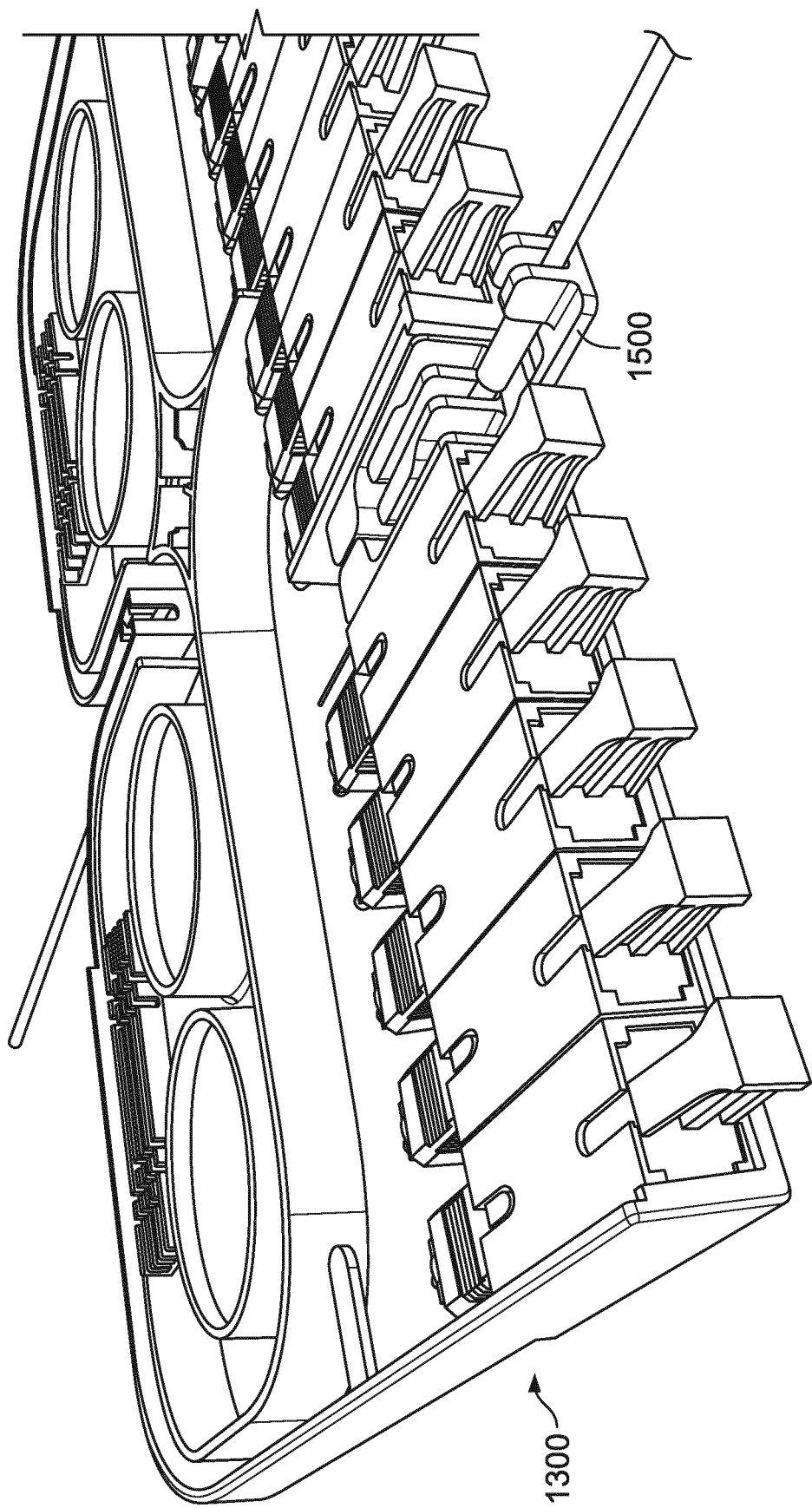
FIG. 40 illustrates the CTU of FIGS. 37-39 mounted within the cassette of FIGS. 31-34 in place of an adapter.
Figure 41:
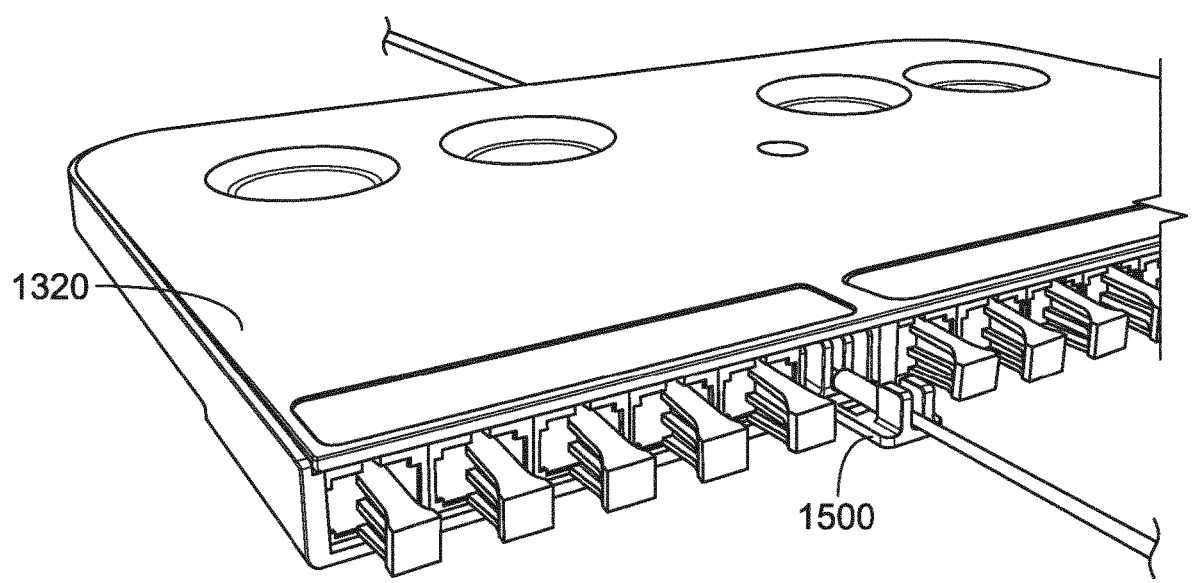
FIG. 41 illustrates the cassette of FIG. 40 with a cover thereof placed on the cassette.

The CTU 1500 as shown in FIGS. 37-39, defines a body 1502 that has the same overall width as one of the adapters 1306 used at the front 1312 of the cassette 1300. The body 1502 defines similar dovetail mounting structures 1504 underneath thereof for removable mounting of the CTU 1500 to the cassette 1300 with a snap-fit interlock.

The CTU body 1502 defines an entry point 1506 for a cable 1508 at a rear end 1510. From the entry point 1506, a central cable channel 1512 is defined along the body 1502, extending to a cable exit 1514 at a front 1516. Strength member channels 1518 are provided adjacent the central cable channel 1512. The strength member channels 1518 are defined by a pair of bulkheads 1520 that form the central cable channel 1512. The bulkheads 1520 are used for wrapping strength members 1522 of the cable 1508 therearound in a rear-to-front direction and clamping the strength members 1522 to a main jacket portion 1524 of the cable 1508 with a tie wrap 1526 to the body 1502 of the CTU 1500. A tie-wrap notch 1528 is provided toward the front 1516 of the CTU body 1502 with an anchor wall 1530 that centrally divides the tie-wrap notch 1528. The anchor wall 1530 is used for anchoring the tie wrap 1526 and thus the strength member 1522 and the cable jacket 1524 to the CTU 1500 once the strength member 1522 has been wrapped around one of the bulkheads 1520. A protective sleeve 1532 may be used around the cable jacket 1524 as shown in FIG. 38 before using the tie wrap 1526.

The CTU 1500, even though shown with a single cable 1508 for an SC format connector, may also accommodate two cables in a vertically stacked position, such as for LC format connectors/adapters.

FIGS. 46-50 illustrate another version of a telecommunications cassette 1600 that can be used within a pivot tray as noted above. The cassette 1600 has features similar to the cassette 1300 described above with respect to FIGS. 28-45 in that a crimp 1602 for the OSP cable 1601 is mounted to a body 1604 of the cassette 1600 with fibers 1606 extending into an interior 1608 and leading to adapters 1610 at a front 1612. In the version of the cassette 1600 illustrated in FIGS. 46-50, a cable input location 1614 is provided at a side 1616 of the cassette 1600. An overlength cable management chamber 1618 is provided at a rear 1620 of the cassette 1600, as shown in FIGS. 47-50 where the cassette 1600 is shown without a cover 1622. As shown, for a cassette 1600 that has a right side cable entry 1614, fibers 1606 coming in are initially routed toward a left spool 1624 and around the left spool 1624 and then around a right spool 1626 within a pathway 1628 that is defined between rear and side outer walls 1630, 1632 of the cassette 1600 and an internal bulkhead 1634 defining the overlength cable management chamber 1618. From the pathway 1628, all of the fibers 1606 are lead toward the front adapters 1610.

Figure 48:
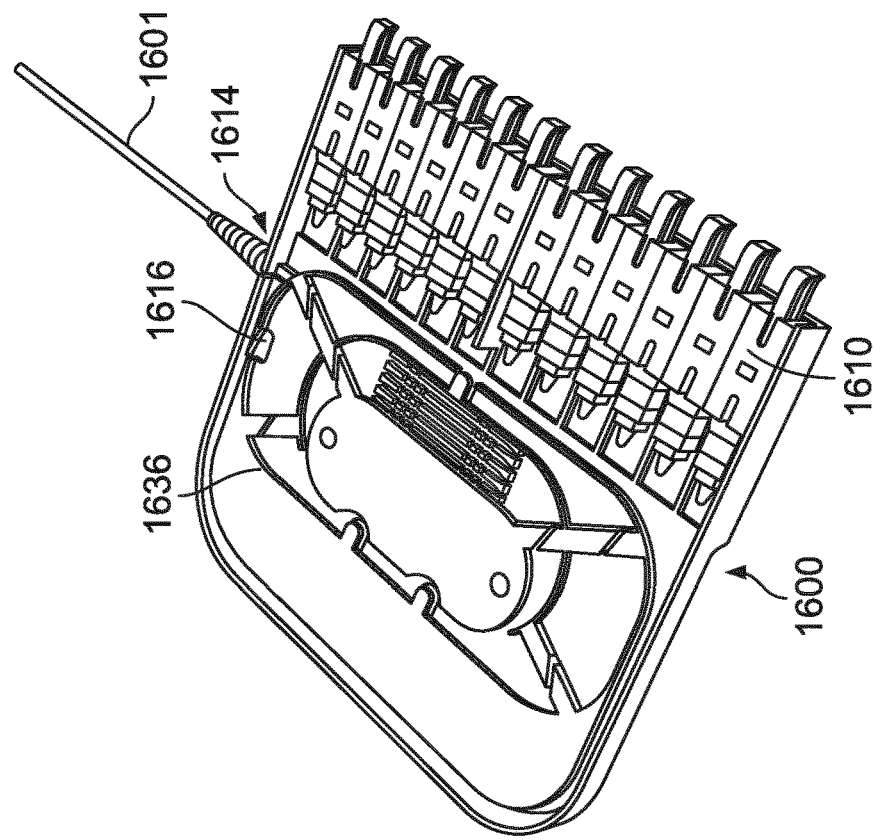
FIG. 48 illustrates the telecommunications cassette of FIG. 47 with a repair tray positioned therein.
Figure 47:
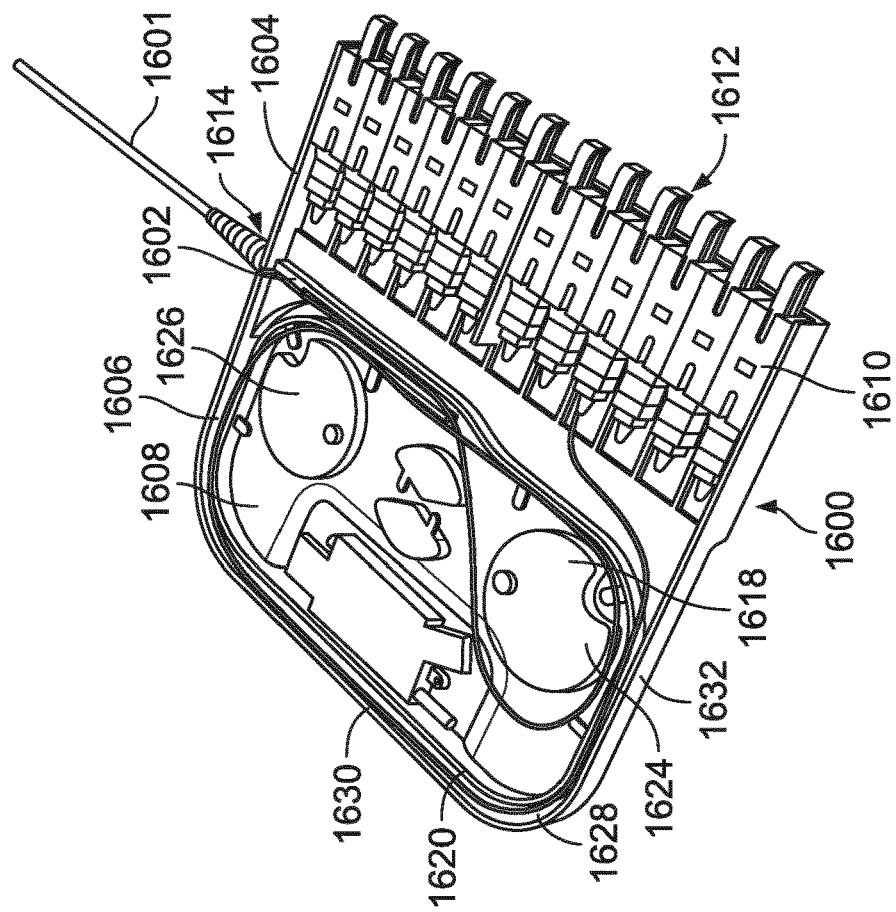
FIG. 47 illustrates the telecommunications cassette of FIG. 46 with a cover thereof removed to show the internal features thereof.
Figures 49, 50:
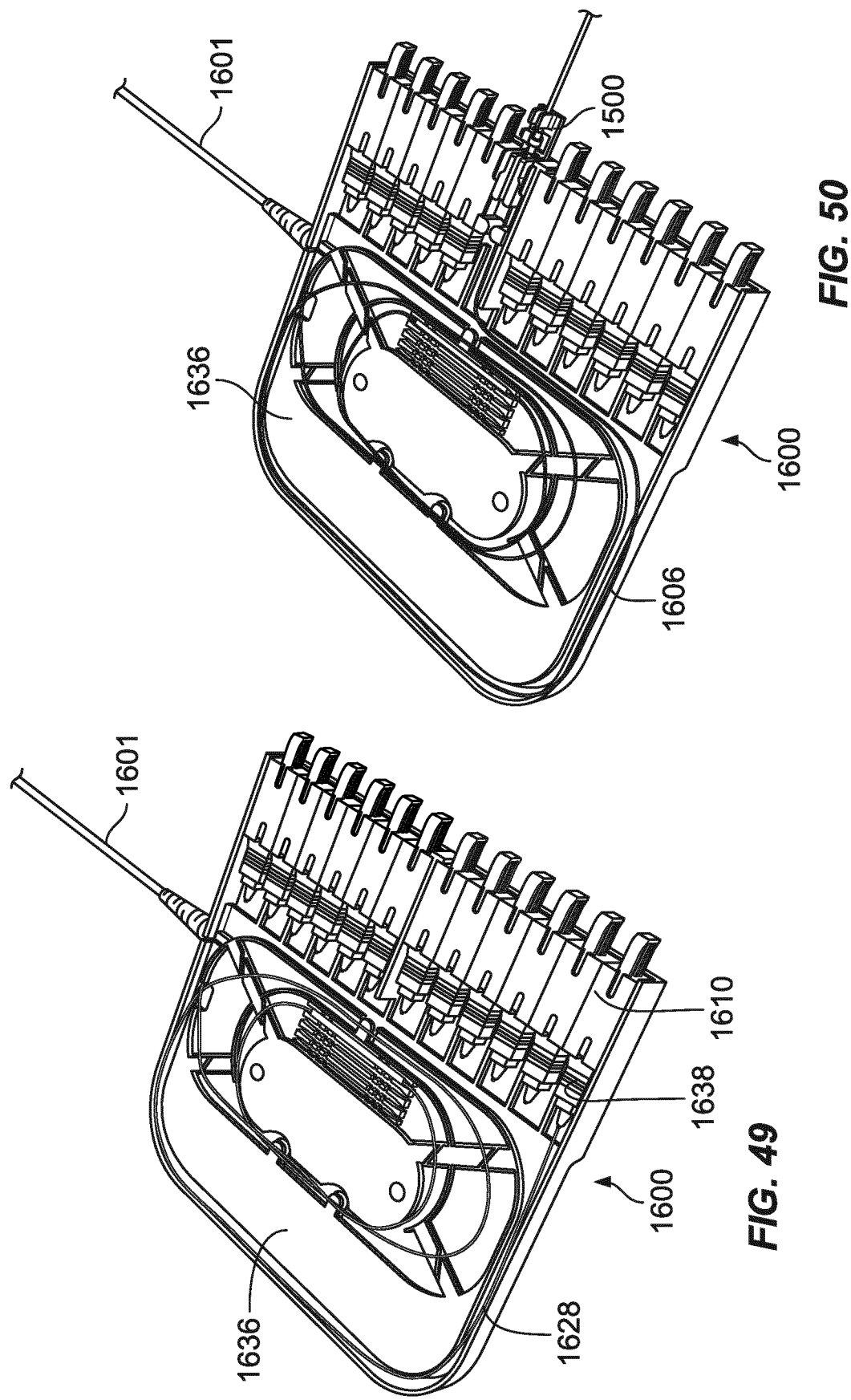
FIG. 49 illustrates the telecommunications cassette of FIG. 48 with a repaired fiber and a replacement connector using the repair tray within the cassette.
FIG. 50 illustrates the telecommunications cassette of FIG. 48 with a splice-through adapter bypass operation using the repair tray and a CTU as illustrated in FIGS. 37-39 within the cassette.

As shown in FIGS. 48-50, a repair tray 1636 may be positioned above the overlength chamber 1618. The repair tray 1636 initially is not populated with fibers 1606 and may act as a demarcation cover keeping the repaired fiber(s) 1606 separate from the initial overlength fibers 1606 underneath. In this manner, when a repair is being made, the splice area stays completely isolated and the live fibers 1606 that are underneath the demarcation cover 1636 are not disturbed. The repair tray 1636 may be permanently mounted to the cassette 1600 and prevented from removal such that the tray 1636 is only used when a repair splice is needed without accessing the live fibers 1606.

The main cover 1622 can be used on the cassette 1600 to keep the adapters 1610 and the repair tray 1636 within the cassette body 1604.

A repaired fiber 1606 and replacement connector 1638 are shown in FIG. 49 using the repair tray 1636 within the cassette 1600.

A splice through an adapter bypass operation is shown in FIG. 50 using the repair tray 1636 within the cassette 1600 and a CTU 1500 similar to that discussed above with respect to FIGS. 37-39.

Figure 51:
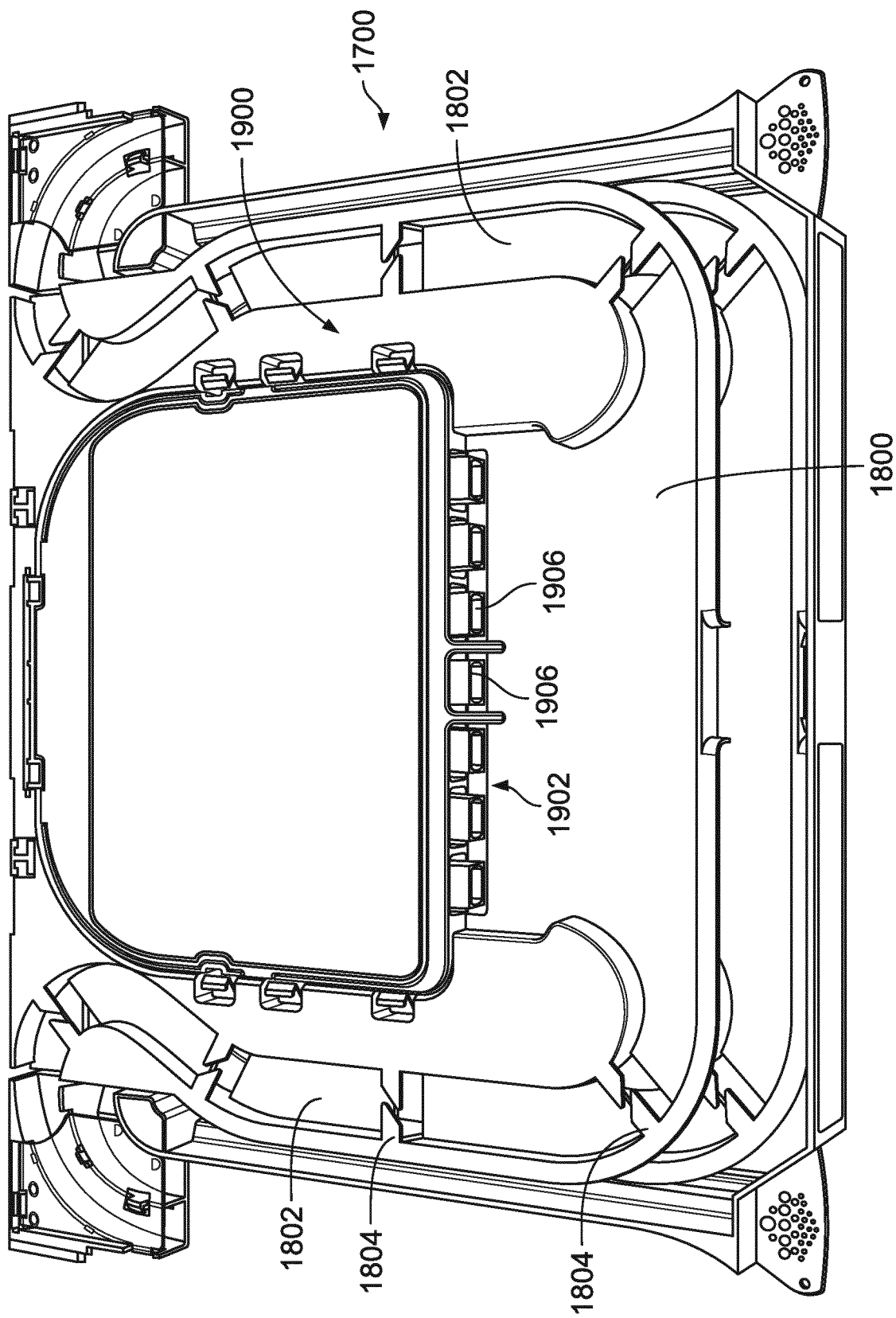
FIG. 51 illustrates an example fiber distribution element including a pair of pivot trays, wherein each tray houses a telecommunications module removably mounted within the tray, the depicted pivot tray and telecommunications module arrangement including features similar to those illustrated in FIGS. 10-19 that allow pivotal access to the module for cleaning.

Referring now to FIG. 51, an example fiber distribution element 1700 including a pair of pivot trays 1800, wherein each tray 1800 houses a telecommunications module 1900 removably mounted within the tray 1800 is illustrated. The depicted pivot tray and telecommunications module arrangement that is housed by the fiber distribution element 1700 includes features similar to those illustrated in FIGS. 10-19 that allow pivotal access to the module for cleaning.

As noted above, fiber distribution elements, such as the element 1700 shown in FIG. 51, may be configured for connecting patch cables entering one side of the element 1700 to an incoming cable, such as a distribution cable or a feeder cable entering an opposite side of the element 1700. Such elements 1700 carrying the pivot trays 1800 may be provided in the form of pull-out drawers that are slidably mounted in a stacked arrangement to telecommunications frames.

Examples of such slidable distribution elements 1700 that can support the trays 1800 discussed herein are described in PCT Publication Nos. WO 2014/118227; WO 2014/207210; and WO 2016/012550, the entireties of which are hereby incorporated by reference.

As noted above, the pivot tray and telecommunications module arrangement that is housed by the fiber distribution element 1700 depicted in FIG. 51 includes features similar to those of the arrangement illustrated in FIGS. 10-19 except for a number of differences that will be described in detail below.

Figure 52:
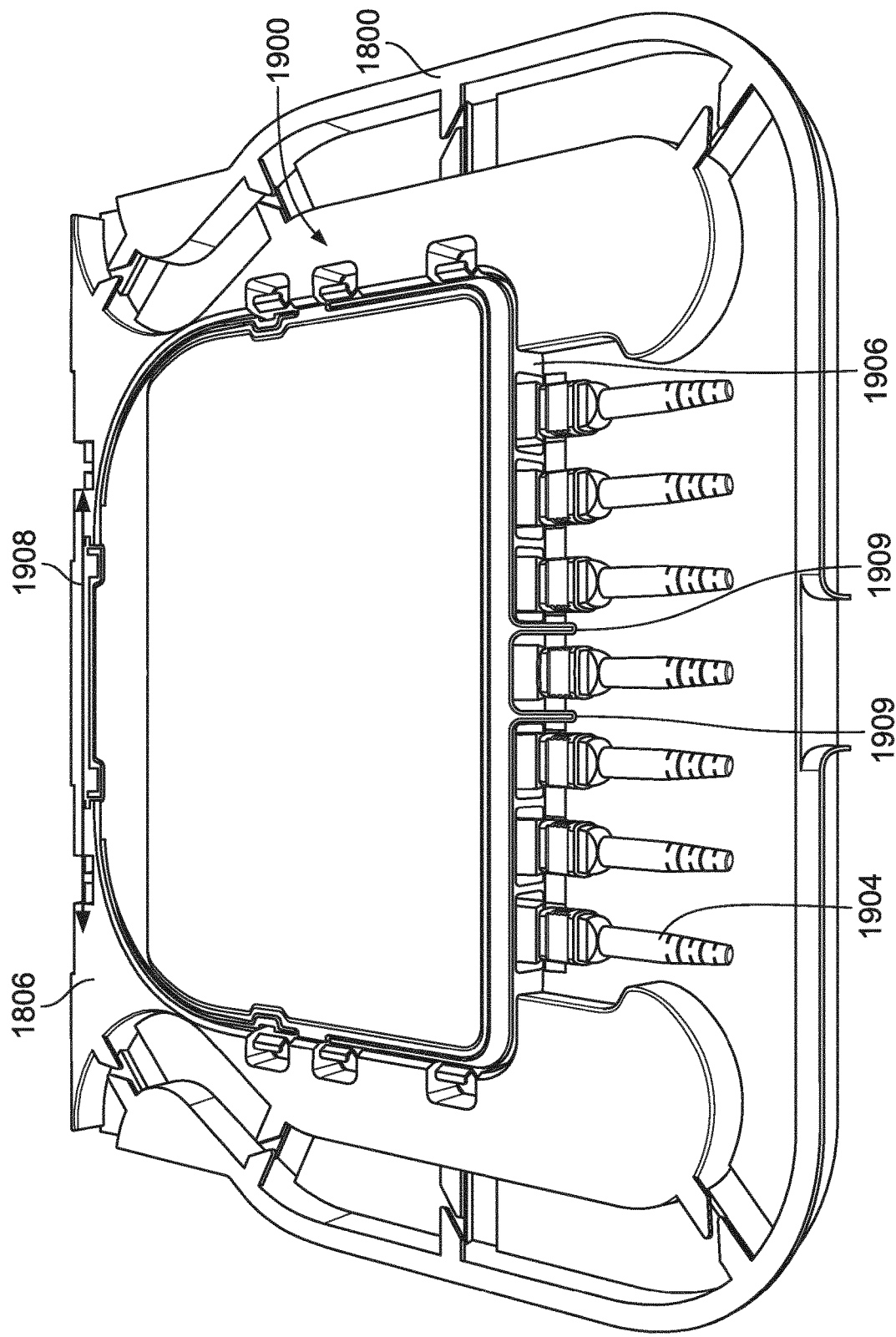
FIG. 52 illustrates one of the pivot trays of FIG. 51 removed from the fiber distribution element, in isolation, the module within the pivot tray shown connectorized with front connectors.

Still referring to FIG. 51, as shown, the distribution element 1700 and the pivotally mounted trays 1800 cooperatively provide a cable path 1802 and a plurality of radius limiters 1804 within that cable path 1802 that can guide cabling from both the right and left sides of the element 1700 toward front connection locations 1902 defined by the module 1900. FIG. 52 illustrates one of the pivot trays 1800 removed from the distribution element 1700 and in isolation. And, the module 1900 is shown with connectors 1904 having been coupled to front adapters 1906 defining the connection locations 1902 of the module 1900 within the tray 1800.

One difference that is provided by the pivot tray and the module arrangement shown in FIG. 51 is that a hinge axis 1908 is provided adjacent a back end 1806 of the tray 1800, where the module 1900 is pivotally liftable in a front-to-back direction rather being hinged at one of the sides. In the arrangement shown in FIG. 51, the module 1900 is pivotally liftable from a front end 1903 of the module 1900 utilizing a pair of finger tabs 1909 as illustrated.

The arrangement of the module 1900 where a hinge 1911 is positioned at the back end 1806 of the tray 1800 also provides an automatic safety feature, where an upper panel of the chassis of the distribution element 1700 will automatically push down the module 1900 if the module 1900 is in a pivoted-up position when the drawer of the element 1700 is being closed. Provision of the hinge 1911 at the back end 1806 of the tray 1800 and positioning of the adapters 1906 at the front 1903 of the module 1900 also allows for both right and left compatibility for cabling, and provides a more universal directional solution as compared to the arrangement shown in FIGS. 10-19.

It should be noted that the tray 1800 and the module 1900 shown in FIG. 51 may include similar hinge structures and functionality as those described above with respect to the tray and module arrangement shown in FIGS. 10-19. And, similar to the tray and module arrangement shown in FIGS. 10-19, the range of pivotal travel of the module 1900 may be between about 1 and 10 degrees from a flat horizontal position. In certain other embodiments, the pivotal movement may be limited to between about 2 and 8 degrees from the flat horizontal position. In yet other embodiments, the range of the pivotal movement may be about 5 degrees from the flat horizontal position.

Figure 53:
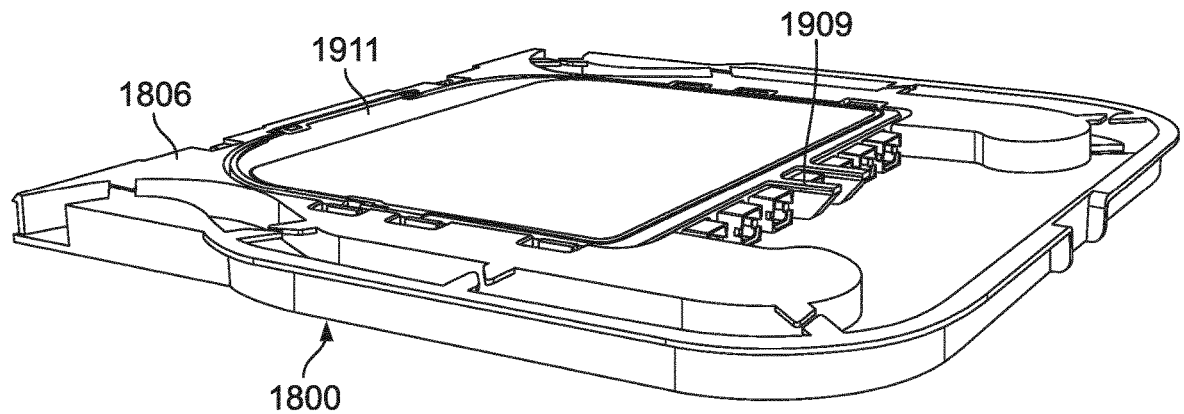
FIG. 53 is a right side perspective view of the pivot tray of FIG. 52, with the module in a non-pivoted position.
Figure 54:
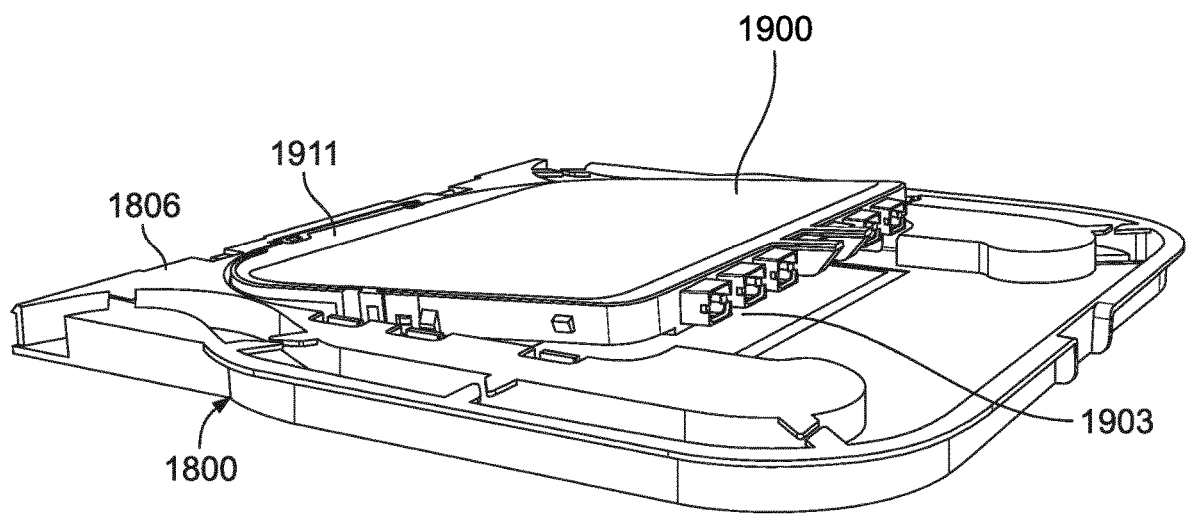
FIG. 54 illustrates the pivot tray of FIG. 53, with the module in a pivoted position for cleaning access.

FIG. 53 illustrates a side perspective view of the pivot tray 1800, with the module 1900 in a non-pivoted position, and FIG. 54 illustrates the pivot tray 1800 with the module 1900 in a pivoted position for cleaning access.

Figure 55:
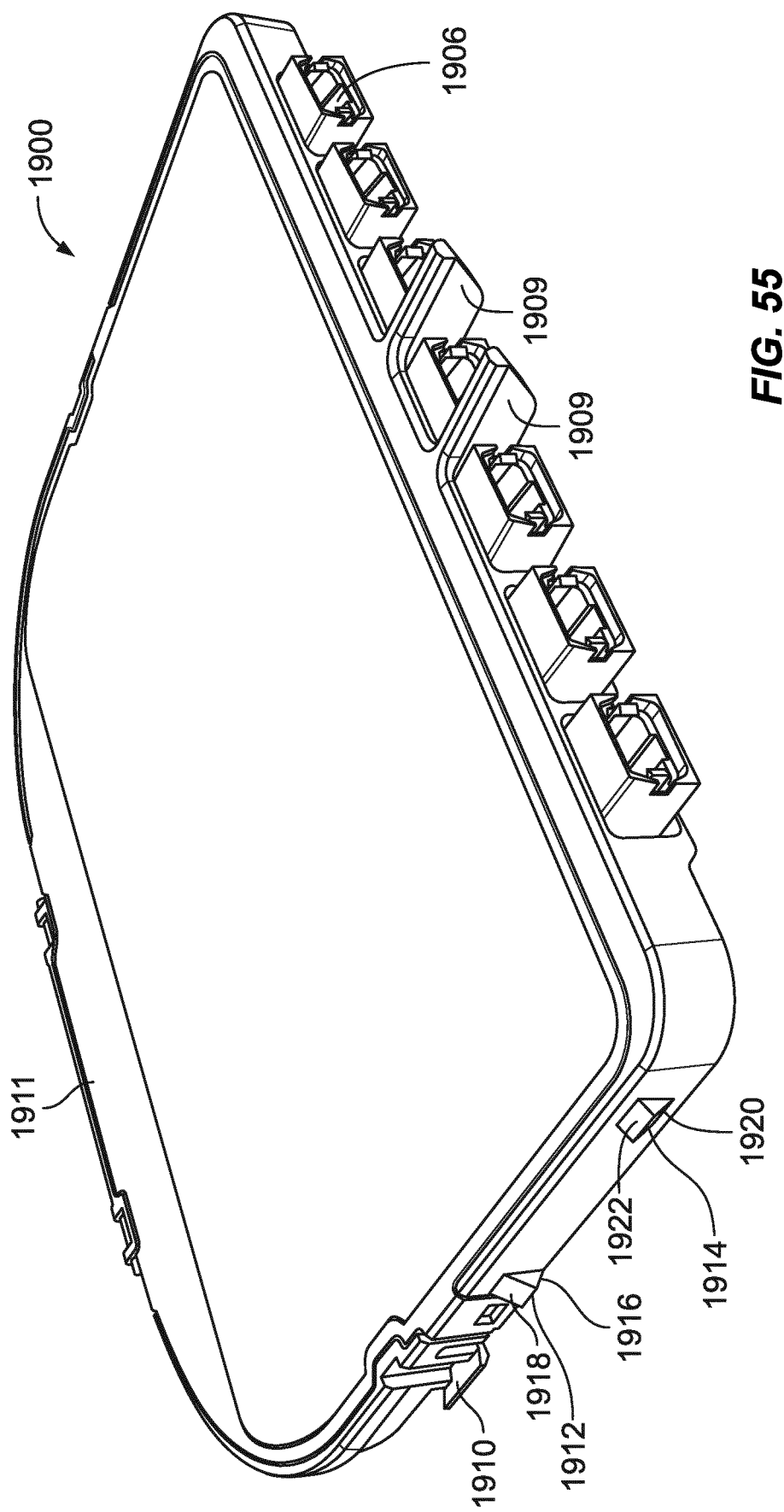
FIG. 55 illustrates the module of FIGS. 51-54 removed from one of the pivot trays, in isolation.
Figure 56:
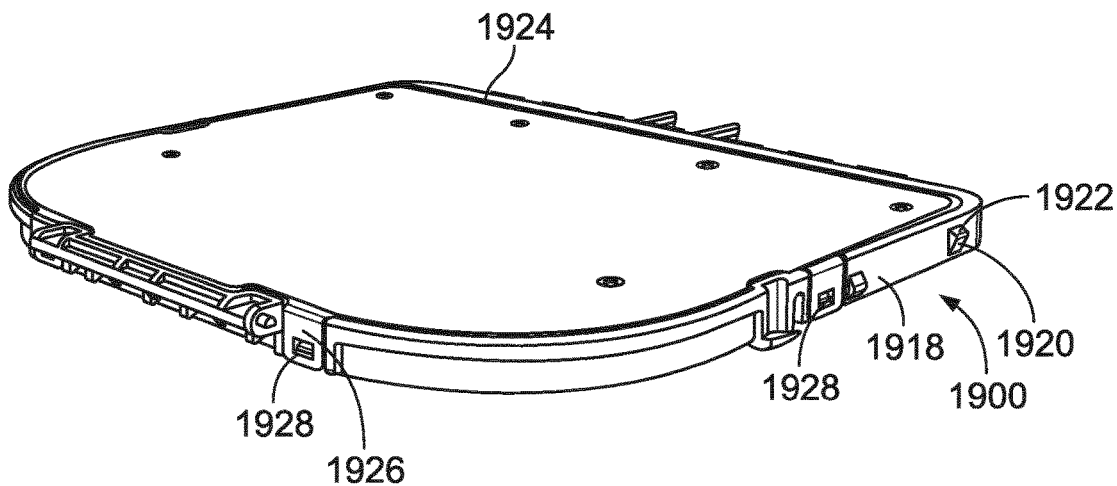
FIG. 56 is a rear perspective view of the module of FIG. 55.
Figure 57:
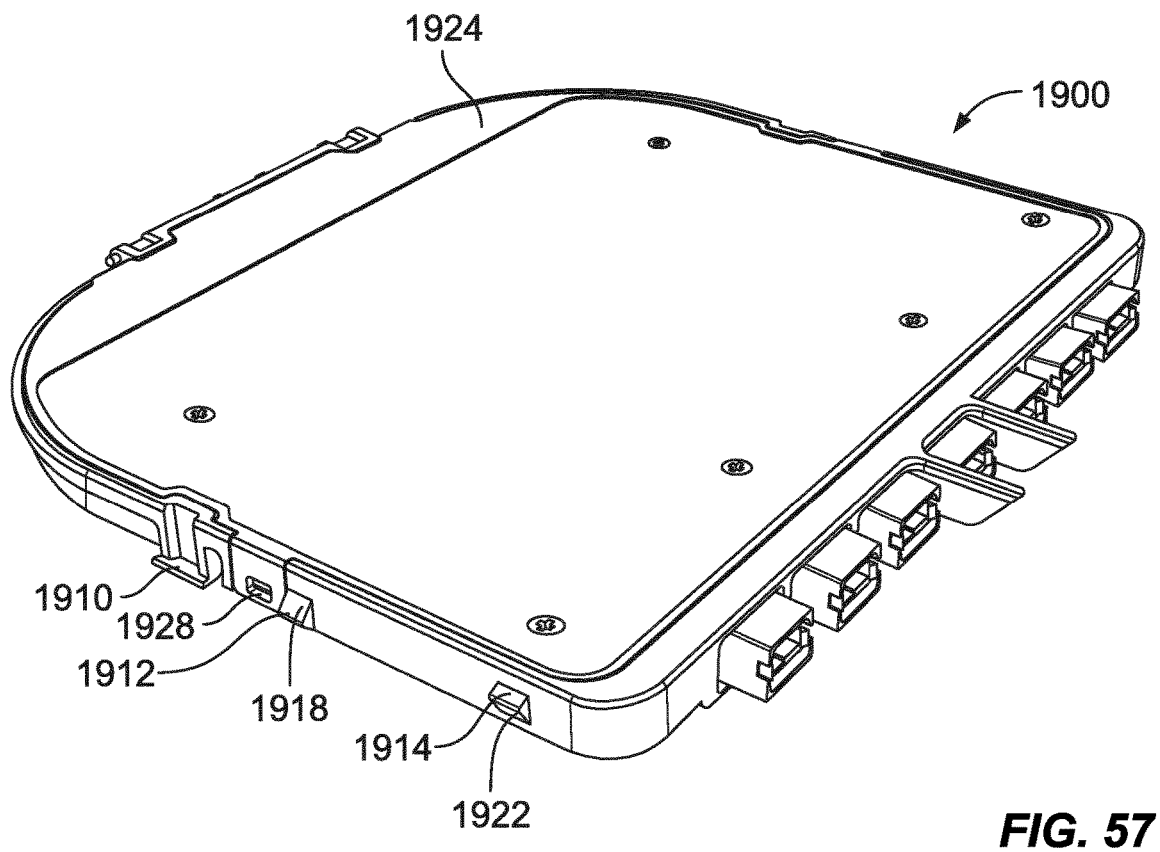
FIG. 57 is another front, right side perspective view of the module of FIG. 55.
Figure 62:
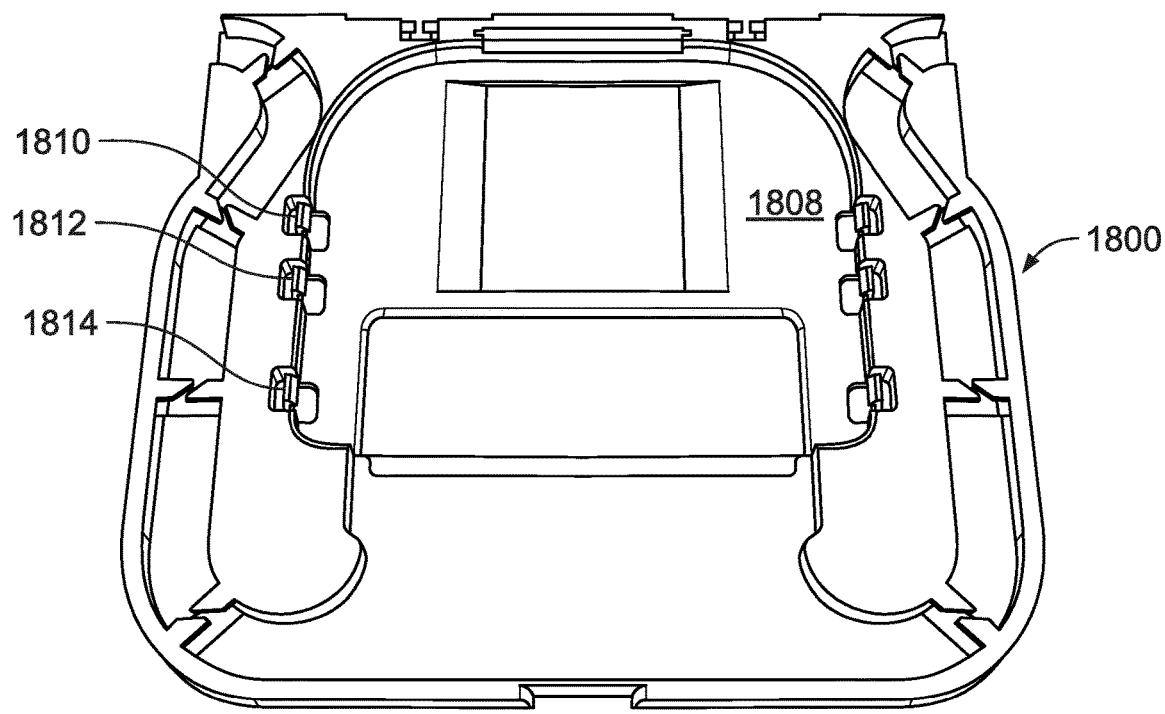
FIG. 62 illustrates the pivot tray of FIGS. 51-54 in isolation, with the module removed therefrom to illustrate the internal features.
Figure 63:
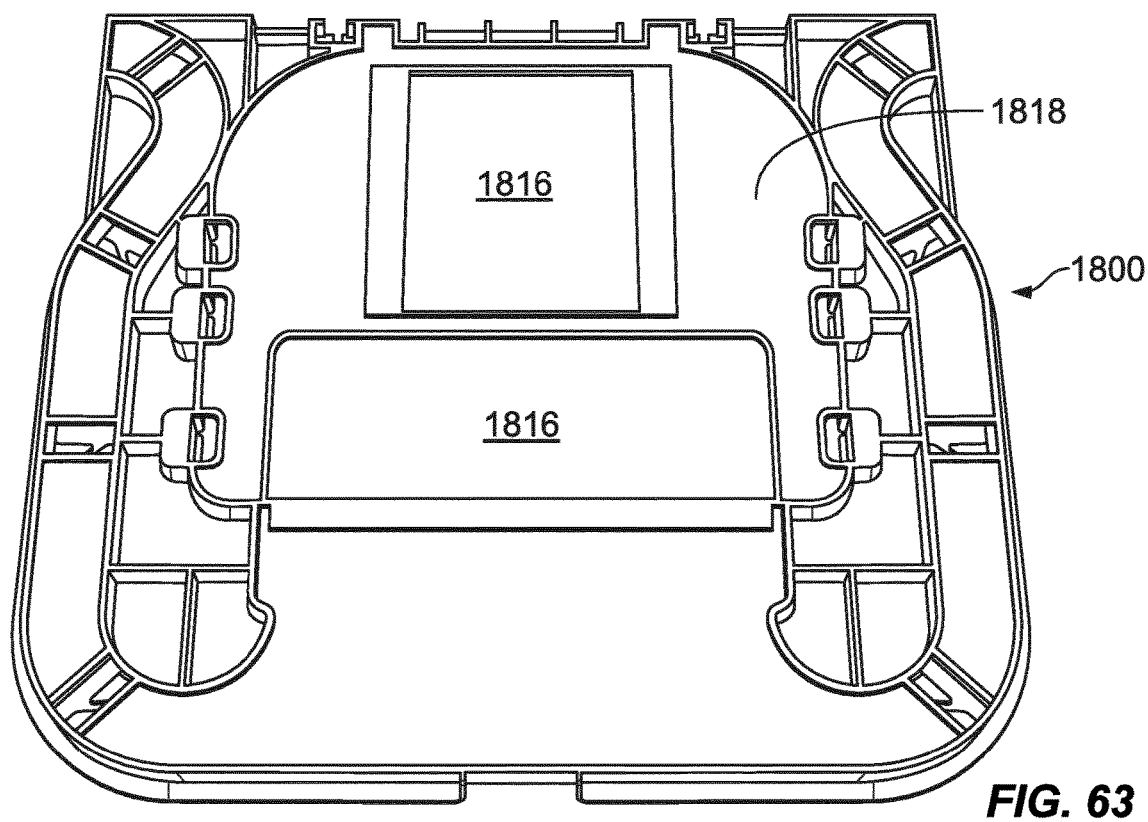
FIG. 63 is a bottom perspective view of the empty tray of FIG. 62.
Figure 64:
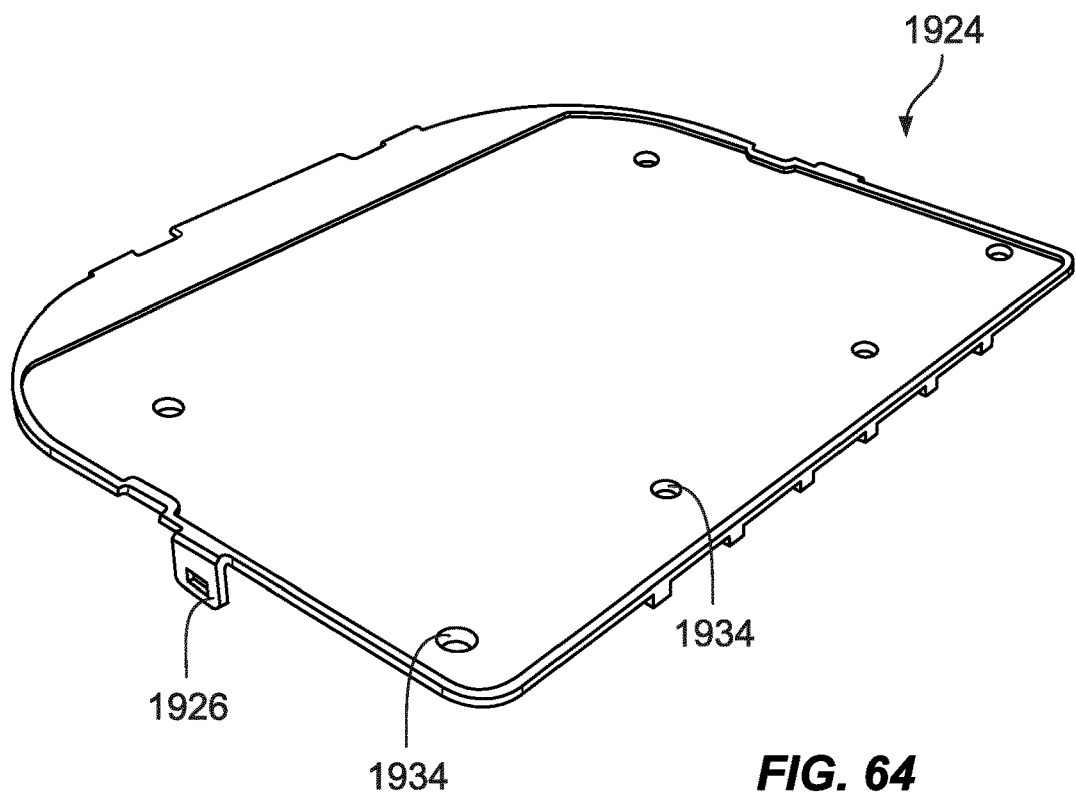
FIG. 64 is a top perspective view of the cover of the module of FIGS. 51-57 in isolation.
Figure 65:
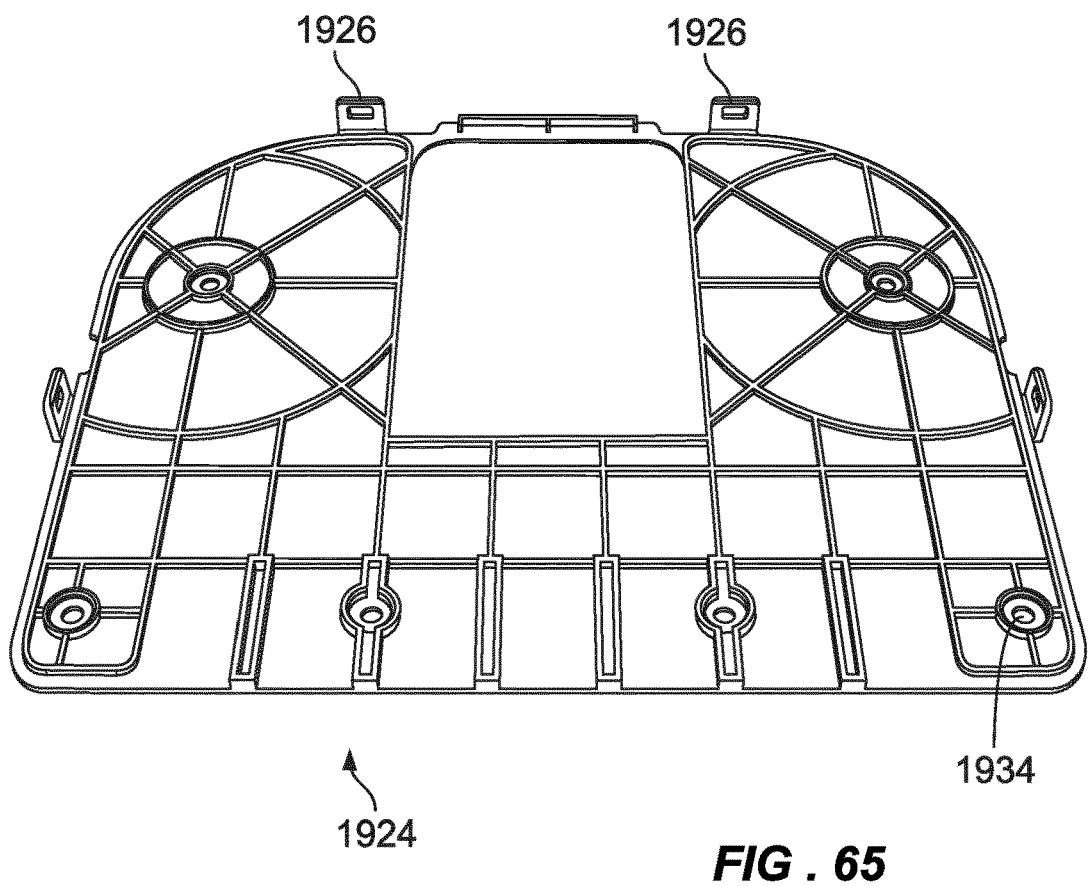
FIG. 65 is a bottom perspective view of the cover of FIG. 64.
Figure 66:
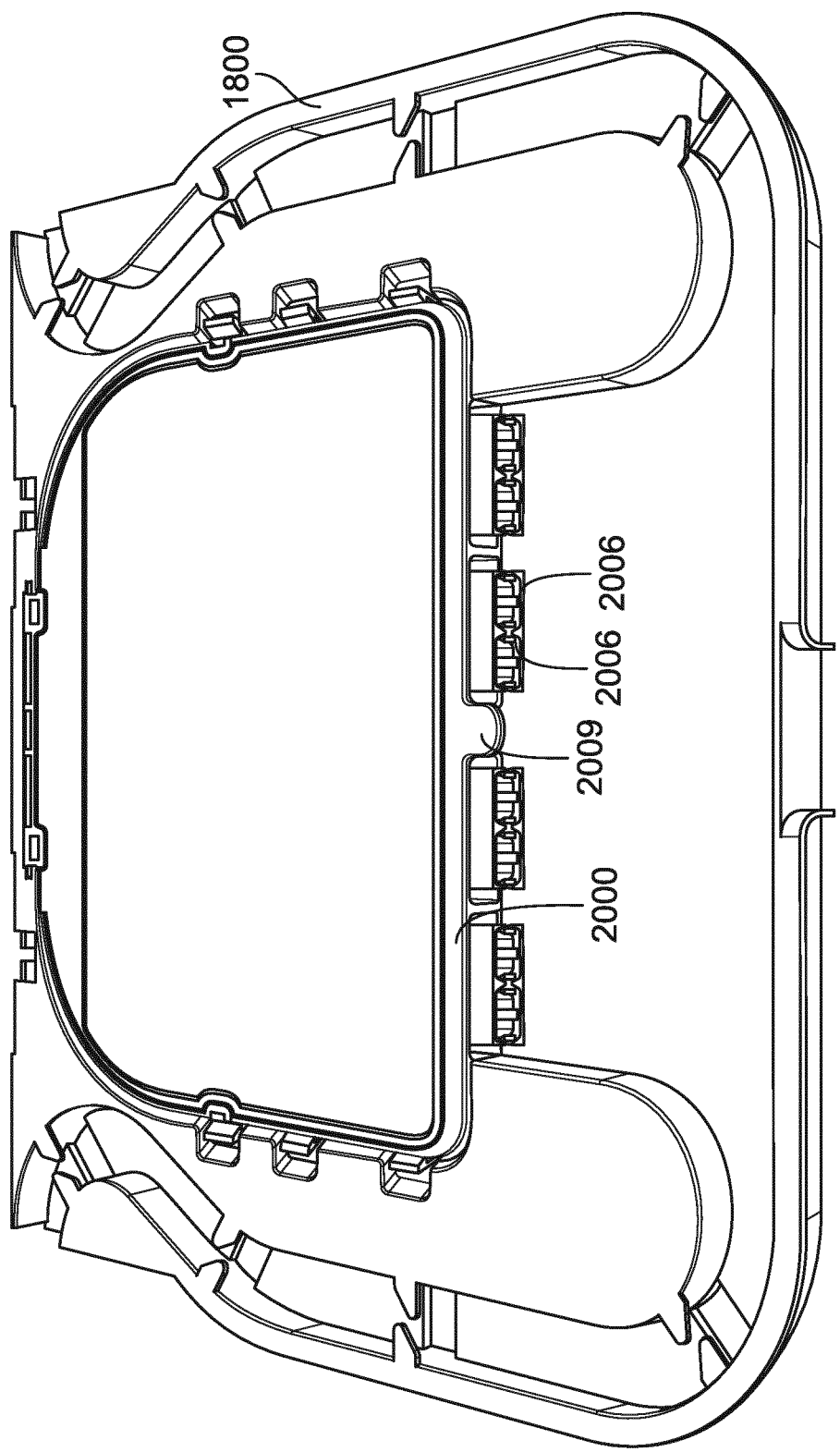
FIG. 66 illustrates another example of a pivot tray that can be mounted within a fiber distribution element such as the element shown in FIG. 51, the pivot tray including another example of a telecommunications module removably mounted within the tray, the depicted pivot tray and telecommunications module arrangement including features similar to those illustrated in FIGS. 51-65 that allow pivotal access to the module for cleaning.
Figure 67:
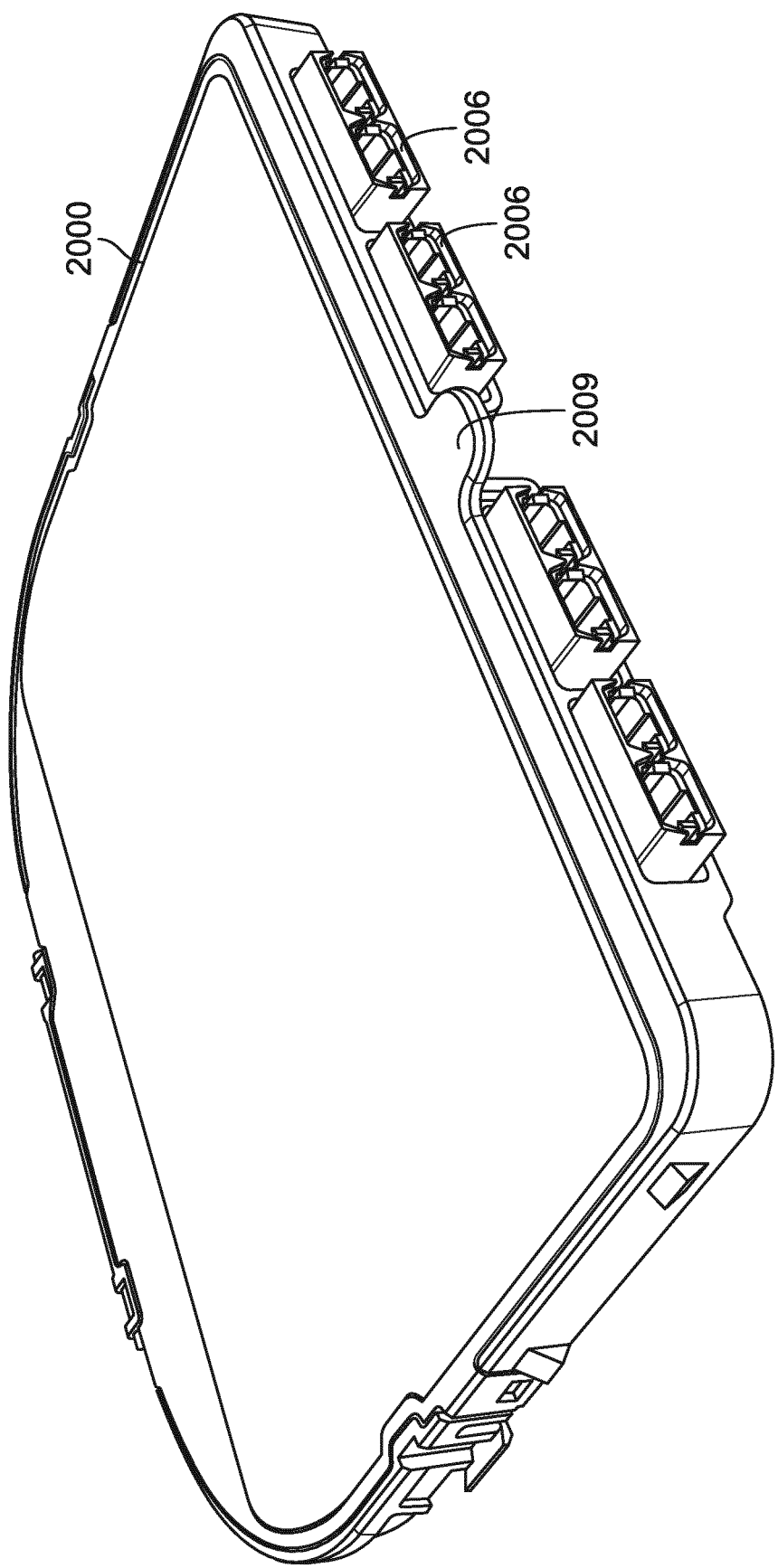
FIG. 67 illustrates the module of FIG. 66 removed from the pivot tray, in isolation.
Figure 68:
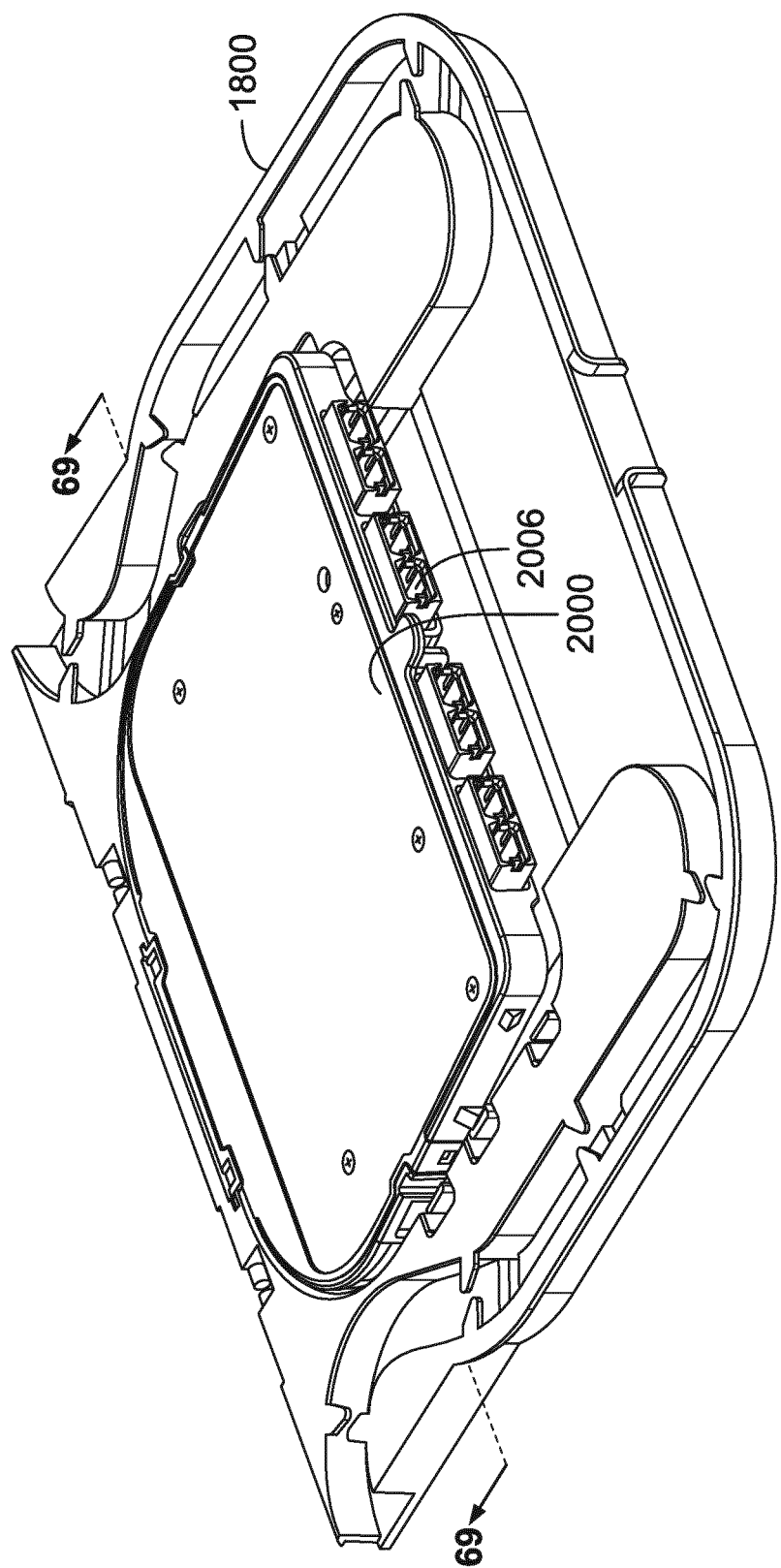
FIG. 68 illustrates the pivot tray of FIG. 66, with the module in a pivoted position for cleaning access.

Regarding the pivotal arrangement of the module 1900 and the tray 1800, FIGS. 55-57 illustrate the module 1900 in isolation removed from the tray 1800, and FIGS. 62-63 illustrate the tray 1800 in isolation in an empty configuration.

Regarding the pivotal arrangement between the module 1900 and the tray 1800, FIGS. 55-57 and 62-63 will generally be referred to. Referring specifically now to FIGS. 62-63, tray 1800 defines on each side of a module pocket 1808 a rear cantilever snap 1810, a center cantilever snap 1812, and a front cantilever snap 1814. All of the cantilever snaps 1810, 1812, 1814 are elastically flexible structures that are configured to deform elastically when cooperating with features of the module 1900 during the pivotal movement of the module 1900 for cleaning access, as will be described in further detail below.

Now referring to FIGS. 55-57, the module 1900, on each side, defines a rear tab 1910, a center tab 1912, and a front tab 1914. As will be described in further detail below, the rear cantilever snap 1810 of the tray 1800 is configured to cooperate with the rear tab 1910 of the module 1900 to snap-lock the module 1900 to the tray 1800 while allowing a limited amount of travel as noted above. The center cantilever snap 1812 of the tray 1800 is configured to cooperate with the center tab 1912 of the module 1900 to temporarily lock the module 1900 in a lifted position. And, the front cantilever snap 1814 of the tray 1800 is configured to cooperate with the front tab 1914 of the module 1900 to temporarily lock the module 1900 in a horizontal flush position.

Figure 69:
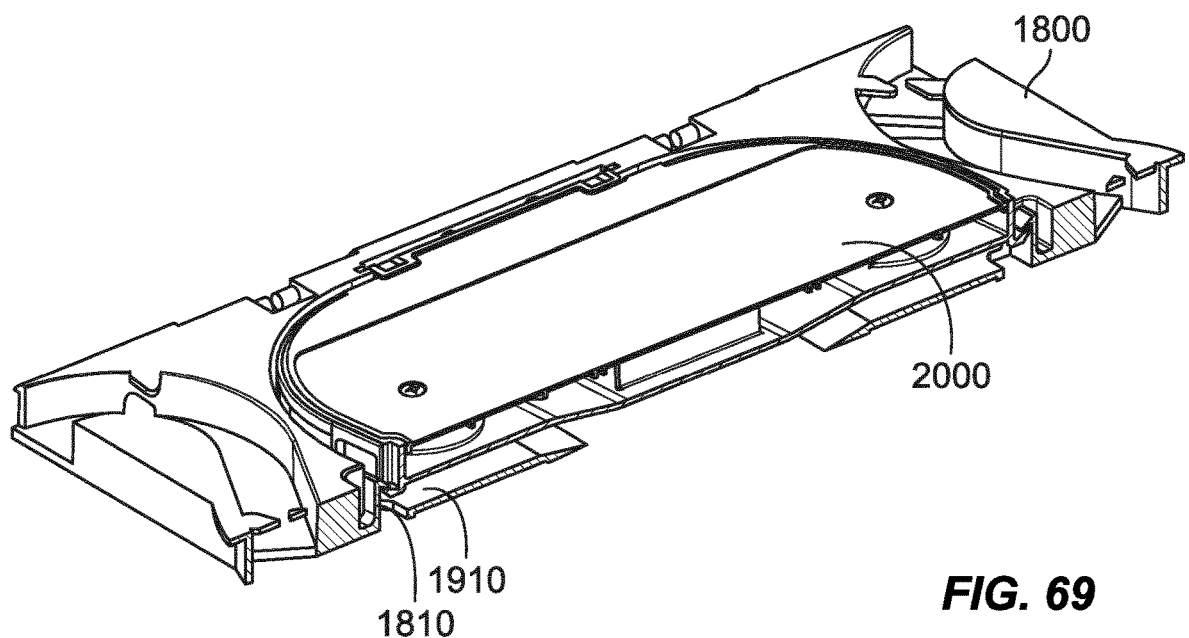
FIG. 69 is a cross-sectional view taken along line 69-69 of FIG. 68.
Figure 70:
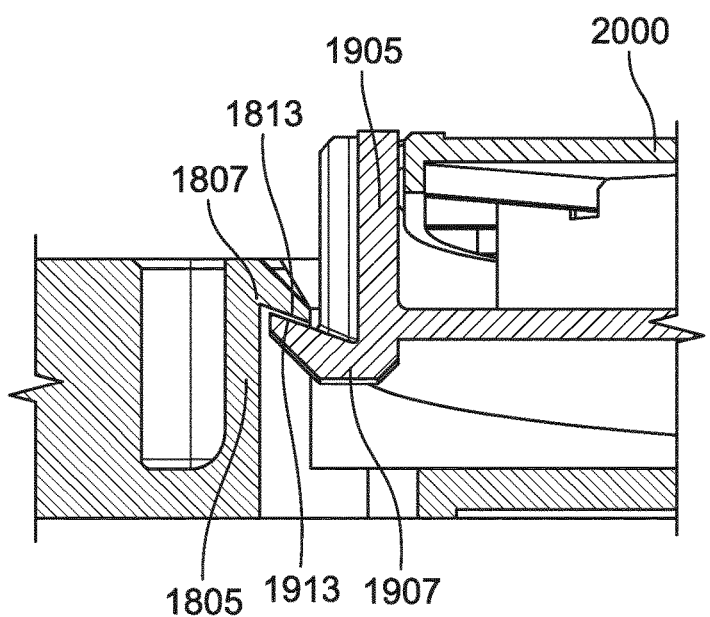
FIG. 70 is a partial front view of the module of FIG. 69.

Regarding the interaction between the rear cantilever snap 1810 of the tray 1800 and the rear tab 1910 of the module 1900, a pair of cross-sectional views provided in FIGS. 69-70 illustrate that the rear cantilever snap 1810 of the tray 1800 and the rear tab 1910 of the module 1910 define opposing, angled, intergripping hook structures 1807, 1907, respectively. As shown, the angle of the hook structures 1807, 1907 may be between 20-45 degrees from the horizontal. The hook structures 1807, 1907 prevent or limit removal of the module 1900 from the tray 1800 even if a lifting force is applied to the module 1900 when the module 1900 is at its uppermost position on the tray 1800. Opposing angled surfaces 1813, 1913, respectively defined by the hook structures 1807, 1907, limit any transverse deflection of the rear cantilever snap 1810 of the tray 1800 and the rear tab 1910 of the module 1900 when the module 1900 is forced upward beyond its highest pivoted point. As shown in FIGS. 69-70, while the surfaces that are on the opposing side from the angled "hook" surfaces 1813, 1913 facilitate initial mounting of the module 1900 into the tray 1800 due to the cooperating angles of those surfaces, the angled "hook" surfaces 1813, 1913 prevent or limit removal of the module unless a tool is used to deflect the rear cantilever snap 1810 of the tray 1800 sideways in order to clear the hook structure 1907 of the module 1900 from the hook structure 1807 of the tray 1800.

As also illustrated in FIGS. 69-70, both the rear cantilever snap 1810 of the tray 1800 and the rear tab 1910 of the module 1900 define elongate portions 1805, 1905, respectively, that allow limited amount of pivotal travel for the module 1900 with respect to the tray 1800. However, once the angled "hook" surfaces 1813, 1913 contact each other at the top end of the module travel, the module 1900 cannot be removed from the tray 1800 (even with the application of further lifting forces) without using a tool to deflect the rear cantilever snap 1810 in a sideways direction as noted above.

Regarding the interaction between the center cantilever snap 1812 of the tray 1800 and the center tab 1912 of the module 1900, as noted above, these two structures cooperate to at least temporarily lock the module 1900 in a lifted position with respect to the tray 1800. As shown for the module 1900 in FIGS. 55-57, the center tab 1912 of the module 1900 defines a sharper angled lower ramp surface 1916 (relative to the vertical) and a shallower angled upper ramp surface 1918 (relative to the vertical). According to certain embodiments, the angled lower ramp surface 1916 may be about 30 degrees from the horizontal while the angled upper ramp surface 1918 may be about 60 degrees from the horizontal.

The shallower-angled upper ramp surface 1918 allows for easier deflection of the center cantilever snap 1812 of the tray 1800 when lifting the module 1900. And, when the module 1900 has been lifted to its upper position (to the point where the angled "hook" surfaces 1813, 1913 of the rear cantilever snap 1810 of the tray 1800 and the rear tab 1910 of the module 1900 contact each other), the center tab 1912 will be at a position where the center tab 1912 has cleared the center cantilever snap 1812 of the tray 1800. At this lifted position, the sharper-angled lower ramp surface 1916 makes it more difficult to deflect the center cantilever snap 1812 of the tray 1800 if the module 1900 is once again pushed down. In this manner, the module 1900 is at least temporarily locked in the upper position. Since the lower ramp surface 1916 is not a "hook" surface and is still an angled ramped surface, if the module 1900 is pushed hard enough downwardly, the ramped surface 1916 will start deflecting the center cantilever snap 1812 of the tray 1800 sideways to start allowing movement of the module 1900 downwardly. The differences of the angles between the upper ramp surface 1918 and the lower ramp surface 1916 simply allow easier deflection during upward movement versus the downward movement.

Regarding the interaction between the front cantilever snap 1814 of the tray 1800 and the front tab 1914 of the module 1900, these two structures cooperate to perform the opposite function as that of the center cantilever snap 1812 and the center tab 1912. The front cantilever snap 1814 of the tray 1800 and the front tab 1914 of the module 1900 cooperate to at least temporarily lock the module 1900 in a horizontal flush position with respect to the tray 1800. As will be described below, the angles of the ramped surfaces of the front tab 1914 of the module 1900 are reversed with respect to the angles of the ramped surfaces of the center tab 1912 of the module 1900 since the main function of the front tab 1914 of the module 1900 is to keep the module 1900 in a flush horizontal position.

As shown in FIGS. 55-57, the front tab 1914 of the module 1900 defines a shallower angled lower ramp surface 1920 (relative to the vertical) and a sharper angled upper ramp surface 1922 (relative to the vertical). According to certain embodiments, the angled lower ramp surface 1920 may be about 60 degrees from the horizontal while the angled upper ramp surface 1922 may be about 30 degrees from the horizontal.

The shallower-angled lower ramp surface 1920 allows for easier deflection of the front cantilever snap 1814 of the tray 1800 when pushing the module 1900 down to a flat position. And, when the module 1900 has been pushed down flush with the tray 1800, the front tab 1914 will be at a position where the front tab 1914 has cleared and is positioned below a cooperating surface of the front cantilever snap 1814 of the tray 1800. At this flush position, the sharper-angled upper ramp surface 1922 makes it more difficult to deflect the front cantilever snap 1814 of the tray 1800 if the module 1900 is once again lifted up. In this manner, the module 1900 is at least temporarily locked in the horizontal position. Since the upper ramp surface 1922 is not a "hook" surface and is still an angled ramped surface, if the module 1900 is pulled hard enough upwardly (via the front finger tabs 1909), the ramped surface 1922 will start deflecting the front cantilever snap 1814 of the tray 1800 sideways to start allowing movement of the module 1900 upwardly. The differences of the angles between the lower ramp surface 1920 and the upper ramp surface 1922 simply allow easier deflection during the downward movement versus the upward movement.

Another difference between the embodiment of the module 1900 shown in FIGS. 51-65 and the module 700 shown in FIGS. 10-19 is that, as noted above, the connection locations 1902, defined by fiber optic adapters 1906, are front facing, as opposed to side facing. In the embodiment of the module 1900 shown in FIGS. 51-65, the depicted fiber optic adapters 1906 are multi-fiber adapters in an MPO format. In the illustrated example, seven MPO adapters 1906 are provided, although other numbers are certainly possible.

The front finger tabs 1909 that can be used for pivoting the module 1900 upwardly or downwardly are shown as being positioned on both sides of a center MPO adapter 1906.

FIGS. 66-70 illustrate a module 2000 that is a variation on the module 1900 of FIGS. 51-65 that includes four duplex adapters 2006 at the patching side. The four duplex adapters 2006 are in the form of duplex MPO adapters and are provided in the front of the module 2000 with a finger tab 2009 that is used for lifting the module 2000 positioned at the center of the four duplex adapters 2006.

It should be noted that all of the features discussed above and that will also be discussed below with respect to the module 1900 of FIGS. 51-65, including features of pivotal movement, are fully applicable to and can be used on the module 2000 illustrated in FIGS. 66-70.

Referring now to FIGS. 56 and 57, as shown, the module 1900 (as well as the module 2000 of FIGS. 66-70) may include a snap-fit cover 1924. The cover 1924 is shown in isolation in FIGS. 64 and 65. As shown, cover 1924 may define downwardly extending snap tabs 1926 that are configured to cooperate with snap hooks 1928 provided around the periphery of a module main body 1930. The snap hooks 1928 are provided at notched portions 1932 around the periphery of the module main body 1930 such that when the cover 1924 is snap-fit onto the module 1900, the snap tabs 1926 lie flush against the sidewalls of the module main body 1930 to retain the width and length of the module 1900. The cover 1924 also includes fastener openings 1934 that cooperate with bosses 1936 provided within the module main body 1930 for fastening the cover 1924 down to the module 1900.

Figure 58:
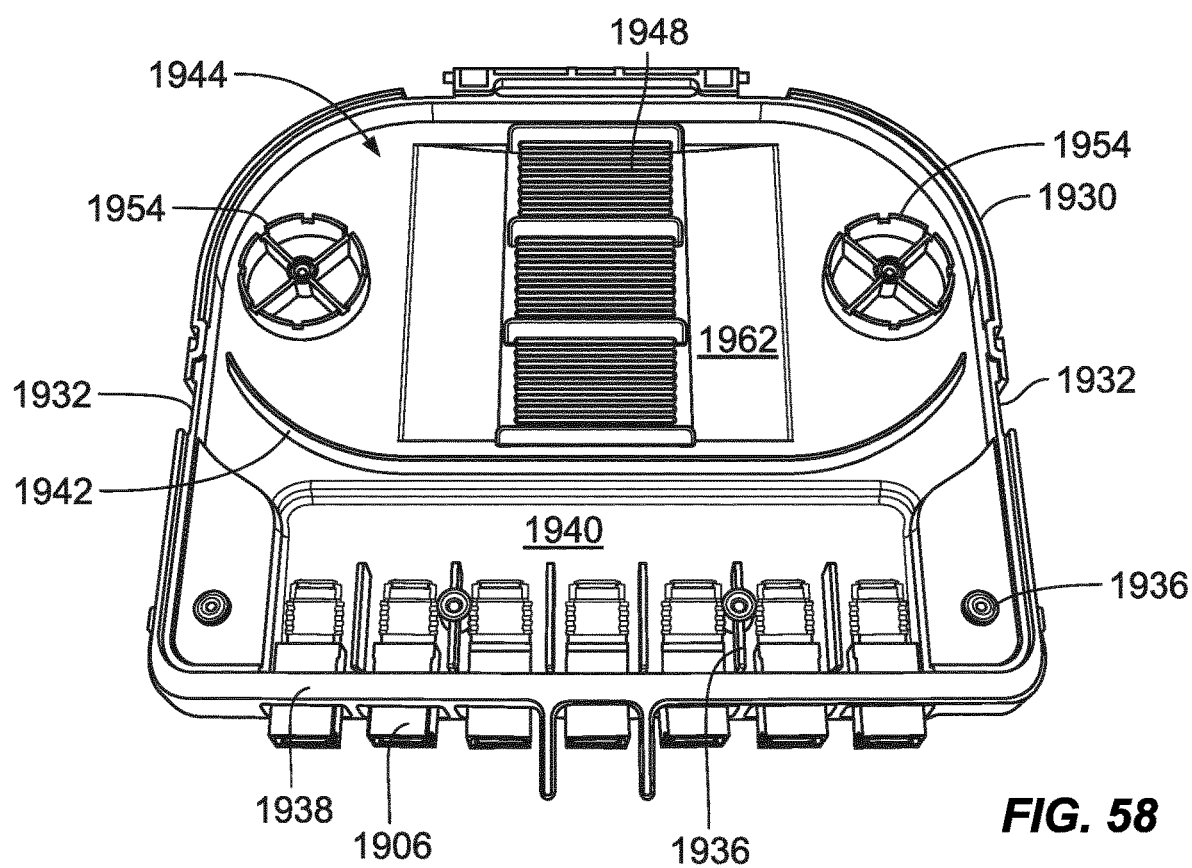
FIG. 58 shows a front perspective view of the module of FIGS. 51-57 with the cover removed to illustrates the internal features thereof.
Figure 59:
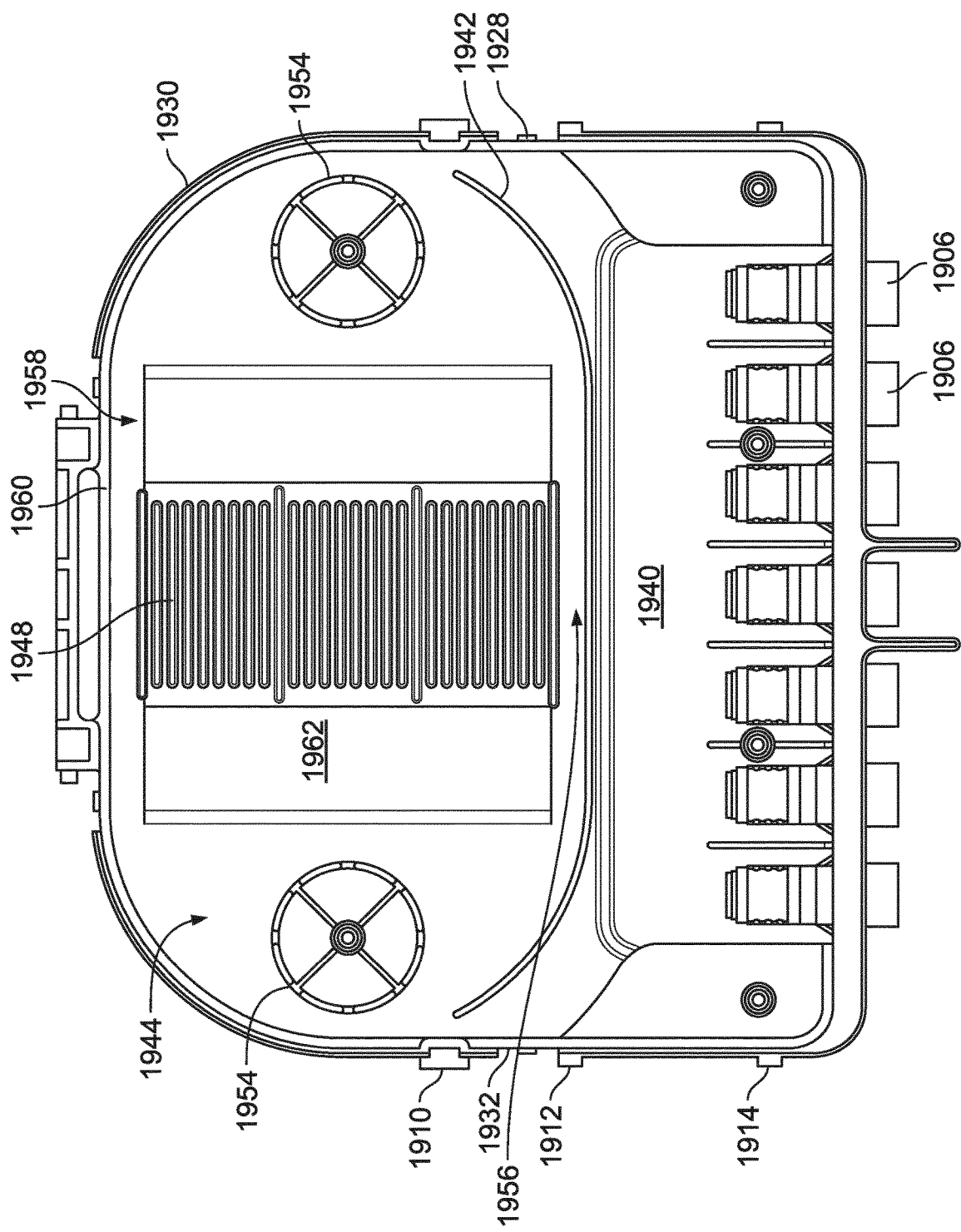
FIG. 59 is a top view of the module of FIG. 58, with the cover removed.
Figure 60:
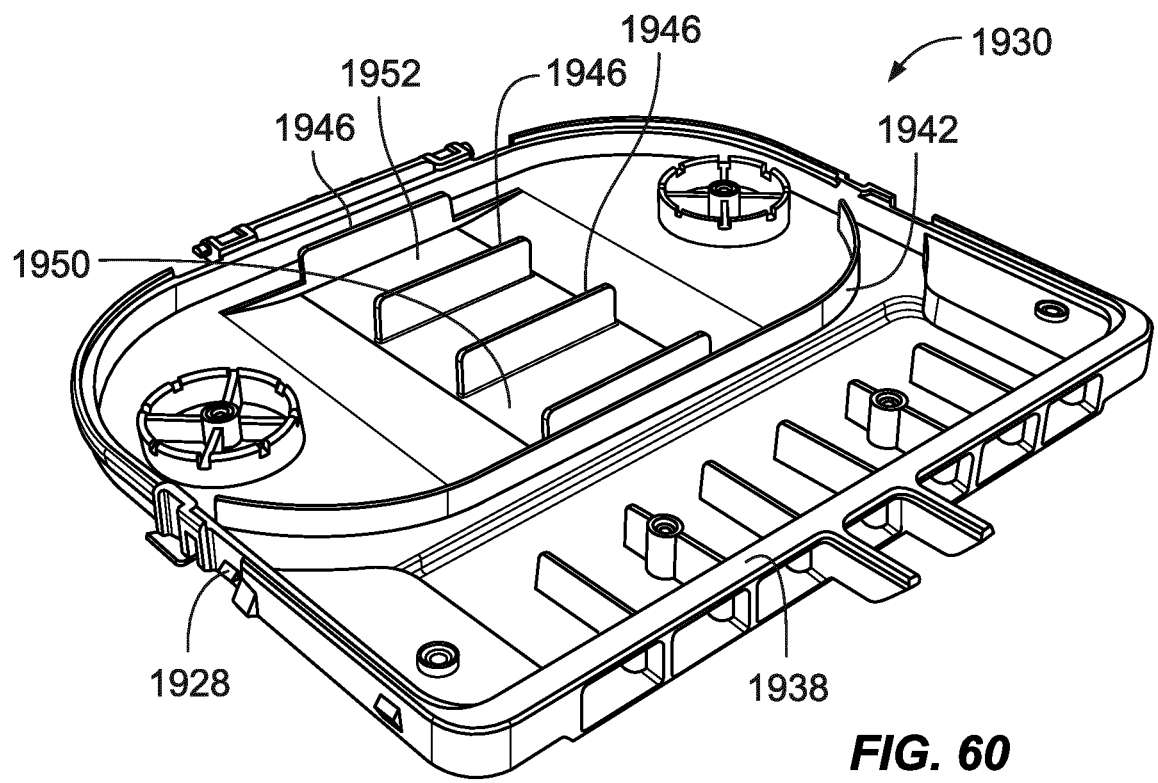
FIG. 60 illustrates the module of FIGS. 58-59 in an empty configuration with the front adapters and the fiber optic equipment removed therefrom.
Figure 61:
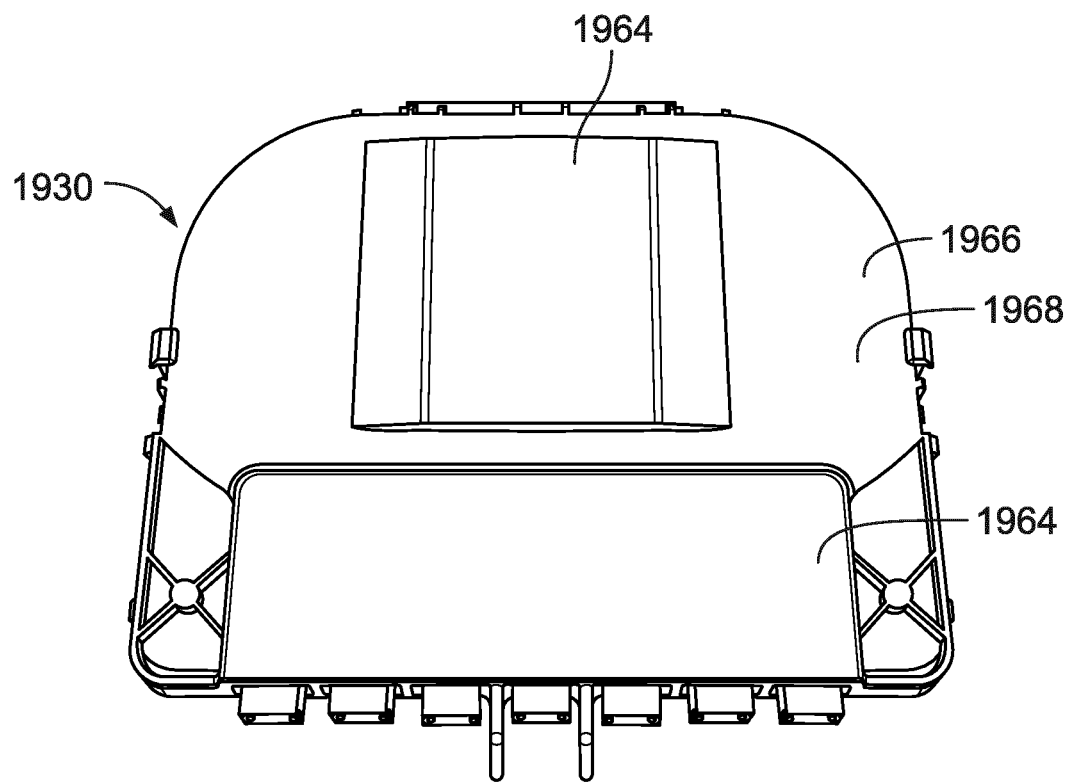
FIG. 61 is a bottom perspective view of the empty module of FIG. 60.

In FIGS. 58-59, the module 1900 is shown with the cover 1924 removed to illustrate the internal features thereof. And, FIG. 60 illustrates the module 1900 in an empty configuration with the front adapters 1906 and the fiber optic equipment removed therefrom, with FIG. 61 illustrating the bottom view of the empty module main body 1930.

As shown in FIGS. 58-61, the adapters 1906 are mounted to a front wall 1938 of the module 1900. The rear ends of the adapters 1906 that are positioned within the module 1900 are provided within a pocket 1940 that allows easier finger access to internal connectors that may be coupled to the rear ends of the adapters 1906. A curved wall 1942 separates the internal connectors from a rear cable spooling area 1944. The rear cable area 1944 defines a number of parallel compartment divider walls 1946 to facilitate splitting and the grouping of a large number of fiber optic equipment such as filters 1948 that may be provided within the module 1900.

The divider walls 1946 that define smaller compartments 1950 within the rear area 1944 may provide extra support for the large number of filters 1948 that can be stacked within the module 1900 (as shown in FIGS. 58-59) and prevent or limit the amount of filters 1948 that may become loose during shock or vibration to the module 1900. According to certain embodiments, other equipment such as splices may be mounted on top of the filters 1948 within the compartments 1950 before being captured by the cover 1924. Even though the module 1900 is shown with fiber optic equipment such as filters 1948 within the rear area 1944 of the module 1900, it should be noted that other types of equipment may be provided depending on the desired circuitry for the module 1900.

Surfaces 1952 provided in between the compartment divider walls 1946 may include rough texturing for improved glue adhesion when populating the module 1900 with equipment such as filters 1948.

As shown, two radius limiters 1954 are provided adjacent the right and left sides of the module main body 1930 to provide various cable routing configurations for cables extending between the front connection locations 1902 and the fiber optic equipment provided within the module 1900.

The rear cabling area 1944 of the module 1900 also includes a front cable passage 1956 between the curved wall 1942 and the front compartment divider wall 1946 and a rear cable passage 1958 between a rear wall 1960 of the module main body 1930 and the rear compartment divider wall 1946. The front and rear cable passages 1956, 1958 allow cabling to pass between the right and left sides of the module 1900 while the radius limiters 1954 provide for bending protection.

As provided for the front adapters 1906, the fiber optic equipment may also be provided within a rear pocket 1962 that increases the overall height of the compartment for housing such equipment. As shown in the bottom view in FIG. 61, such pockets 1962 may define bumps 1964 at a bottom wall 1966 of the module main body 1930 that protrude past a first horizontal surface 1968 defined by the bottom wall 1966 of the module main body 1930. The bumps 1964 may fit within cutouts 1816 defined by a bottom wall 1818 of the pivot tray 1800 such that the overall height of the combination of the pivot tray 1800 and a mounted module 1900 is not increased when the module 1900 is mounted within the tray 1800.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A telecommunications tray configured for mounting to a telecommunications fixture, the tray comprising:

a removably mounted telecommunications module that defines a body that is enclosed by a cover to define an interior, the telecommunications module including radius limiters within the interior for managing cables and defining connection locations for inputting and/or outputting signals via cables for processing within the module, the telecommunications module movably mounted to the tray, wherein the tray includes a first tray hinge for pivotal mounting to the telecommunications fixture, and wherein the telecommunications module defines a module hinge that is configured to mate with a cooperating second tray hinge for allowing pivotal movement of the body of the telecommunications module relative to the tray, wherein all of the first tray hinge, the module hinge, and the second tray hinge that cooperates with the module hinge are positioned along generally the same plane.

2. A telecommunications tray according to claim 1, wherein the connection locations are defined by fiber optic adapters that are removably mounted to the body of the telecommunications module.

3. A telecommunications tray according to claim 1, wherein the pivotal movement is limited to between 1 and 10 degrees from a flat horizontal position.

4. A telecommunications tray according to claim 1, wherein the telecommunications module has a locking tab for intermating with a tab positioned on the tray for locking the module in a flat horizontal position, and wherein the telecommunications module further includes a stop tab that is positioned underneath the locking tab for intermating with the tab positioned on the tray to act as a pivot stop during pivotal movement of the module.

5. A telecommunications tray according to claim 1, wherein a bottom wall of the tray defines a notched area for receiving a portion of the telecommunications module such that a height defined by the combination of the tray and the telecommunications module is not greater than a maximum module height.

6. A telecommunications tray according to claim 1, wherein the tray includes the first tray hinge for pivotal mounting to the telecommunications fixture, and wherein the second tray hinge is positioned adjacent the first tray hinge of the tray.

7. A telecommunications tray according to claim 2, wherein the telecommunications module defines at least one tab protruding away from the body of the telecommunications module, the at least one tab being positioned between two of the fiber optic adapters defining the connection locations.

8. A telecommunications tray according to claim 7, wherein the telecommunications module defines a plurality of tabs protruding away from the body of the telecommunications module, each tab being positioned between two of the fiber optic adapters defining the connection locations.

9. A telecommunications tray according to claim 1, wherein the telecommunications module includes fiber optic equipment within the body for processing signals input via cables into the body of the telecommunications module.

10. A telecommunications tray according to claim 9, wherein the fiber optic equipment is positioned within a compartment flanked by two radius limiters in the form of spools.

11. A telecommunications tray according to claim 1, wherein the tray includes a plurality of cable management structures adjacent the first tray hinge that is for pivotal mounting to the telecommunications fixture.

12. A telecommunications tray configured for mounting to a telecommunications fixture, the tray comprising:
a plurality of connection locations defined by fiber optic adapters for inputting and/or outputting signals via cables for processing;
a cable overlength chamber including at least one radius limiter for managing cables therewithin, the cable overlength chamber enclosed by a cover to retain the cables within the overlength chamber;
a plurality of radius limiters positioned outside of the cable overlength chamber for managing cables exiting from the fiber optic adapters to an exterior of the tray; and
a tray hinge for removably and pivotally mounting the tray to the telecommunications fixture, wherein all of the fiber optic adapters, the cable overlength chamber, the radius limiters positioned outside of the cable overlength chamber, and the tray hinge are positioned along generally the same plane on the telecommunications tray.

13. A telecommunications tray according to claim 12, further comprising a signal entry location that is in addition to the fiber optic adapters, the signal entry location defined by a cable including a cable crimp that is mounted to the tray.

14. A telecommunications tray according to claim 13, wherein the cable including the cable crimp is provided as part of a cable termination block that is removably mounted to the tray in place of one of the fiber optic adapters, wherein the cable termination block defines a height and a width that is similar in cross-dimension to that defined by one of the fiber optic adapters.

* * * * *